US012576714B2

(12) United States Patent
Watanabe et al.

(10) Patent No.: US 12,576,714 B2
(45) Date of Patent: Mar. 17, 2026

(54) GLASS ARTICLE AND ONBOARD DISPLAY DEVICE

(71) Applicant: AGC Inc., Tokyo (JP)

(72) Inventors: Toshinari Watanabe, Tokyo (JP); Yasuhiro Inoue, Tokyo (JP); Atsushi Inoue, Tokyo (JP); Ryou Hokari, Tokyo (JP); Junichi Kakuta, Tokyo (JP)

(73) Assignee: AGC Inc., Tokyo (JP)

( * ) Notice: Subject to any disclaimer, the term of this patent is extended or adjusted under 35 U.S.C. 154(b) by 211 days.

(21) Appl. No.: 18/585,364

(22) Filed: Feb. 23, 2024

(65) Prior Publication Data

US 2024/0190248 A1 Jun. 13, 2024

Related U.S. Application Data

(63) Continuation of application No. PCT/JP2022/032462, filed on Aug. 29, 2022.

(30) Foreign Application Priority Data

Aug. 30, 2021 (JP) ................................. 2021-139604
Apr. 26, 2022 (JP) ................................. 2022-072684

(51) Int. Cl.
*B60K 35/22* (2024.01)

(52) U.S. Cl.
CPC ........ *B60K 35/22* (2024.01); *B60K 2360/688* (2024.01); *B60K 2360/692* (2024.01); *B60K 2360/693* (2024.01)

(58) Field of Classification Search
CPC ..................................................... B60K 35/22
USPC ........................................................ 428/215
See application file for complete search history.

(56) References Cited

U.S. PATENT DOCUMENTS

| | | | |
|---|---|---|---|
| 2017/0197561 A1 | 7/2017 | Mcfarland | |
| 2021/0008846 A1* | 1/2021 | Kumar | .................... B60R 13/02 |
| 2023/0021473 A1* | 1/2023 | Umada | .................... C03C 3/089 |
| 2024/0345432 A1* | 10/2024 | Imoto | ............... G02F 1/133331 |

FOREIGN PATENT DOCUMENTS

| | | |
|---|---|---|
| JP | 2017-532233 A | 11/2017 |
| WO | WO 2020/081930 A1 | 4/2020 |
| WO | WO 2020/112435 A1 | 6/2020 |

* cited by examiner

*Primary Examiner* — Tahseen Khan
(74) *Attorney, Agent, or Firm* — Oblon, McClelland, Maier & Neustadt, L.L.P.

(57) ABSTRACT

The present invention relates to a glass article (10) that includes cover glass (12) and a frame (14) that is bonded to a principal surface (12B) side of the cover glass (12) via an adhesive layer (16). The cover glass is provided with a curved part that protrudes toward principal surface (12B). The adhesive layer (16) includes at least one of a first adhesive layer and a second adhesive layer. The thickness, Young's modulus, and perimeter of the cover glass, the radius of curvature of the curved part, and the area of the adhesive layer have a specific relationship.

20 Claims, 22 Drawing Sheets

GLASS ARTICLE AND ONBOARD DISPLAY DEVICE

CROSS-REFERENCE TO RELATED APPLICATIONS

This is a continuation of International Application No. PCT/JP2022/032462 filed on Aug. 29, 2022, and claims priority from Japanese Patent Application (No. 2021-139604) filed on Aug. 30, 2021 and Japanese Patent Application (No. 2022-072684) filed on Apr. 26, 2022, the entire content of which is incorporated herein by reference.

TECHNICAL FIELD

The present invention relates to a glass article and an on-vehicle display device.

BACKGROUND ART

A liquid crystal display or an organic EL display may be used in an on-vehicle display device or the like that displays information or the like necessary for driving. In such a display, a cover glass may be disposed to protect a front surface. In recent years, an interior of a vehicle is required to have high designability, and a cover glass having a curved surface shape is required. As one of methods for bending a cover glass, for example, a cold forming method as disclosed in Patent Literature 1 is known.

CITATION LIST

Patent Literature

Patent Literature 1: JP2017-532233A

SUMMARY OF INVENTION

Technical Problem

However, the cover glass bent by, for example, a cold forming method maintains its curved shape by fixing the cover glass to a frame with an adhesive, and therefore, the cover glass may be peeled off from the frame by springback.

The present invention has been made in view of the above problem, and an object thereof is to provide a glass article and an on-vehicle display device capable of suppressing peeling of a cover glass from a frame.

Solution to Problem

In order to solve the above problem and implement the object, a glass article according to the present disclosure includes: a cover glass including a first main surface and a second main surface; and a frame adhered to a second main surface side of the cover glass via an adhesive layer, in which the cover glass is provided with a curved portion having a convex shape toward a direction of the second main surface, the adhesive layer includes at least one of a first adhesive layer having an elastic modulus of 5 MPa or more in an indentation elastic modulus test and a second adhesive layer having an elastic modulus of less than 5 MPa in the indentation elastic modulus test, and when R' is represented by the following formula (1) and $C_1$ is represented by the following formula (2), the curved portion satisfies the following formula (3) in a case of $C_1 > 0$ and satisfies the following formula (4) in a case of $C_1 \leq 0$.

Here, in the following formulae, R indicates a curvature radius (mm) of the curved portion, F indicates a length of a flat region having a flat shape in a first direction orthogonal to a bending axis of the curved portion when the cover glass is provided with the flat region adjacent to the curved portion in the first direction, t indicates a thickness (mm) of the cover glass, $A_1$ indicates an area (mm$^2$) of the first adhesive layer in the curved portion, $A_2$ indicates an area (mm$^2$) of the second adhesive layer in the curved portion, E indicates a Young's modulus (GPa) of the cover glass, and L indicates a length (mm) of the curved portion in the first direction.

[Math. 1]
$$R' = R + F(5t - 0.4) \tag{1}$$

[Math. 2]
$$C_1 = 1000/R' - 7.76t^2 + 19.5t - 12.7 + (1 - 0.90t^{0.5})(A_2/(A_1 + A_2)) \tag{2}$$

[Math. 3]
$$0.2 - \frac{(0.45Et^2 + 280E(t/R') - 45.36)^2}{\frac{245.6}{L}(2.44A_1 + A_2) + 9.41} \tag{3}$$

[Math. 4]
$$(A_1 + A_2)/L > 2.4 \tag{4}$$

In order to solve the above problem and implement the object, a glass article according to the present disclosure includes: a cover glass including a first main surface and a second main surface; and a frame adhered to a second main surface side of the cover glass via an adhesive layer, in which the cover glass is provided with a curved portion having a convex shape toward a direction of the first main surface, the adhesive layer includes at least one of a first adhesive layer having an elastic modulus of 5 MPa or more in an indentation elastic modulus test and a second adhesive layer having an elastic modulus of less than 5 MPa in the indentation elastic modulus test, and when R' is represented by the following formula (1) and $C_2$ is represented by the following formula (5), the curved portion satisfies the following formula (6) in a case of $C_2 > 0$ and satisfies the following formula (7) in a case of $C_2 \leq 0$.

Here, in the following formulae, R indicates a curvature radius (mm) of the curved portion, F indicates a length of a flat region having a flat shape in a first direction orthogonal to a bending axis of the curved portion when the cover glass is provided with the flat region adjacent to the curved portion in the first direction, t indicates a thickness (mm) of the cover glass, $A_1$ indicates an area (mm$^2$) of the first adhesive layer in the curved portion, $A_2$ indicates an area (mm$^2$) of the second adhesive layer in the curved portion, E indicates a Young's modulus (GPa) of the cover glass, and L indicates a length (mm) of the curved portion in the first direction.

[Math. 5]
$$R' = R + F(5t - 0.4) \tag{1}$$

[Math. 6]
$$C_2 = \frac{}{1000/R' - 4.54t^2 + 11.37t - 7.58 + (0.586 - 0.44t^{0.5})(A_2/(A_1 + A_2))} \tag{5}$$

3

-continued

[Math. 7]

$$0.2 - \frac{\left(0.659Et^2 + 705.5E(t/R') - \frac{0.3869}{L}(2.44A_1 + A_2) - 72.05\right)^2}{\frac{245.6}{L}(2.44A_1 + A_2) + 9.41} > 0 \quad (6)$$

[Math. 8]

$$(A_1 + A_2)/L > 2.4 \quad (7)$$

In order to solve the above problem and implement the object, an on-vehicle display device according to the present disclosure includes a display and the glass article provided on a surface of the display.

Advantageous Effects of Invention

According to the present invention, peeling of a cover glass from a frame can be suppressed.

4

Figures 23, 24:
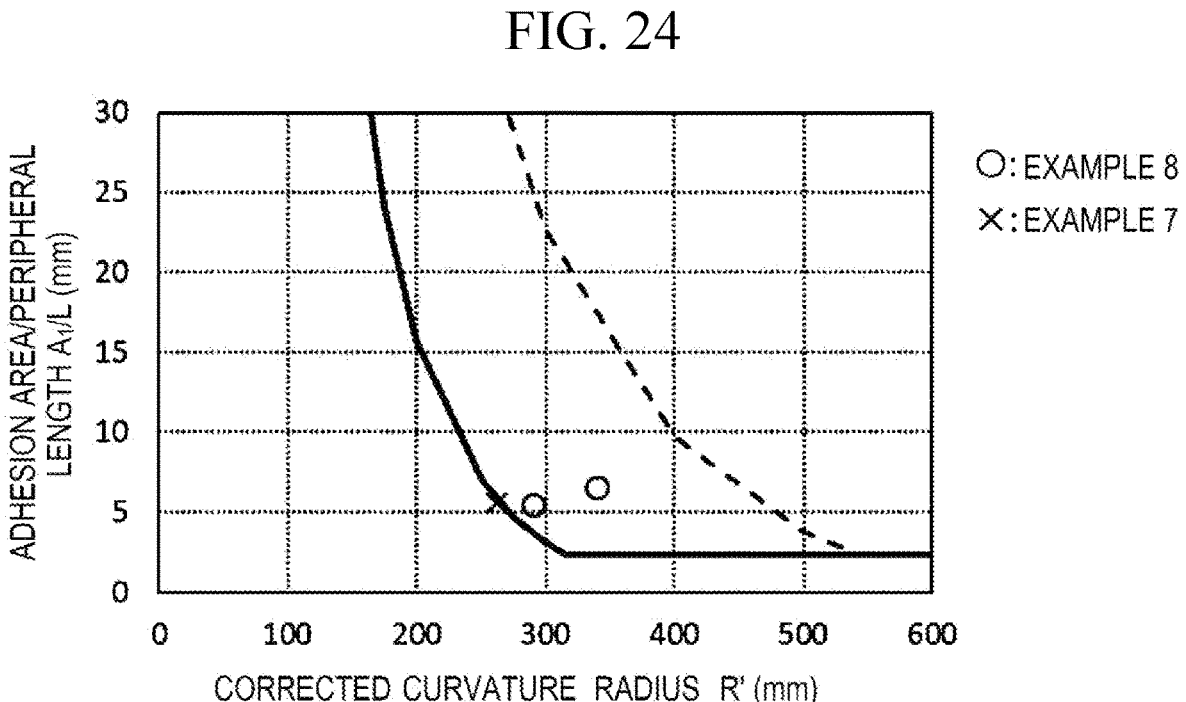

FIG. 23 is a graph showing evaluation results of cover glasses according to Examples 5 and 6.

FIG. 24 is a graph showing evaluation results of cover glasses according to Examples 7 and 8.

Figure 25:
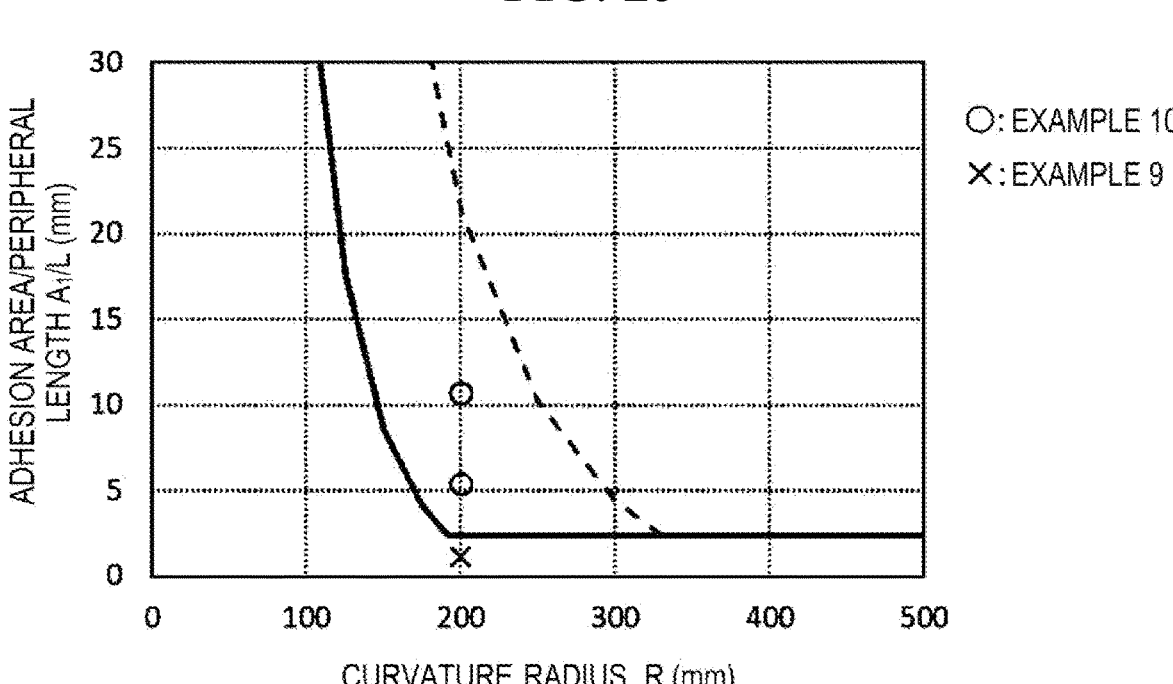

FIG. 25 is a graph showing evaluation results of cover glasses according to Examples 9 and 10.

Figure 26:
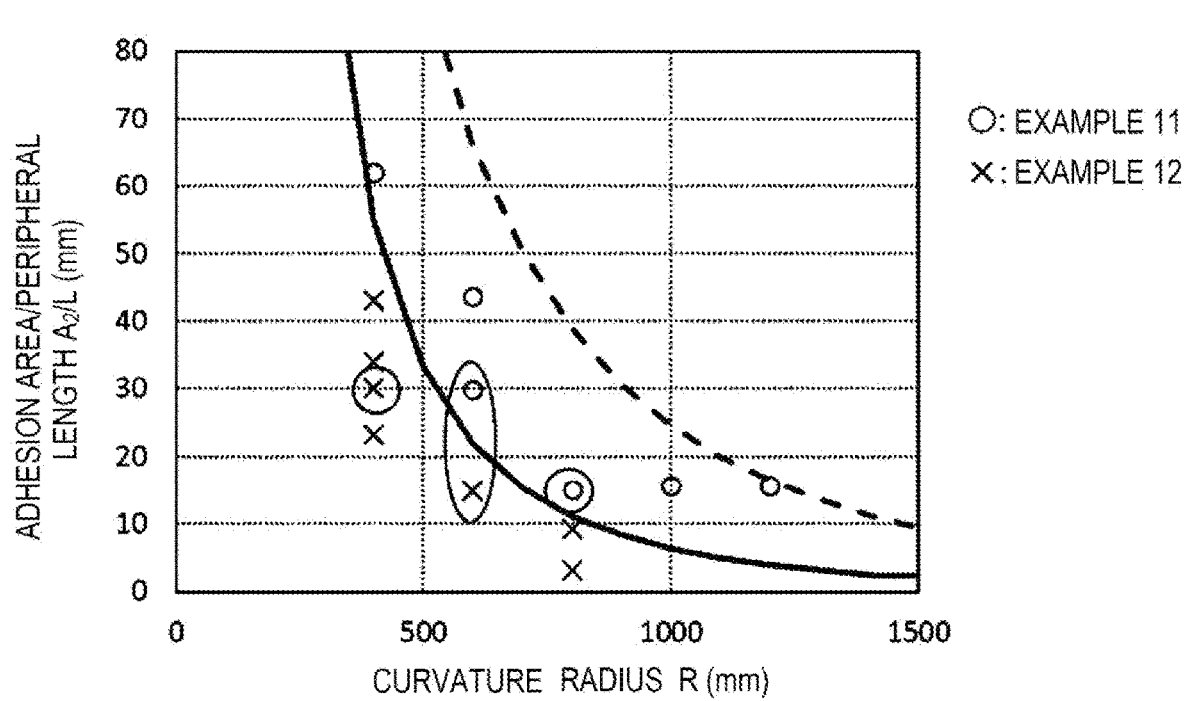

FIG. 26 is a graph showing evaluation results of cover glasses according to Examples 11 and 12.

Figures 27, 28:
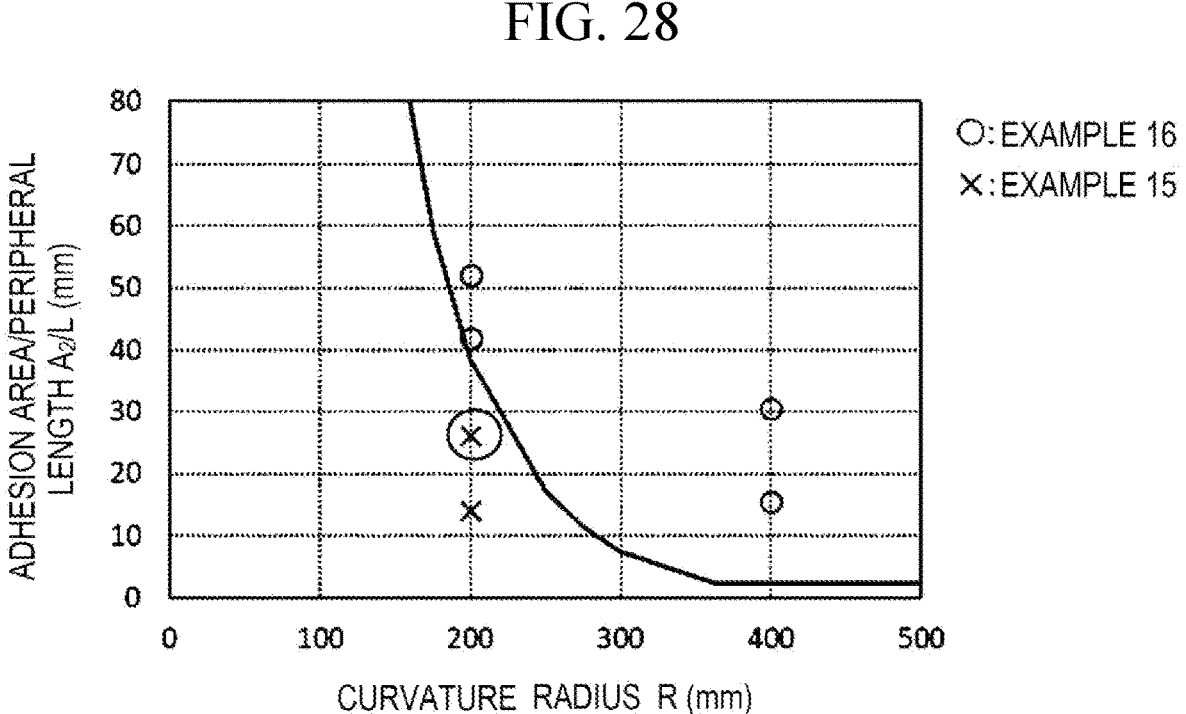

FIG. 27 is a graph showing evaluation results of cover glasses according to Examples 13 and 14.

FIG. 28 is a graph showing evaluation results of cover glasses according to Examples 15 and 16.

Figures 29, 30:
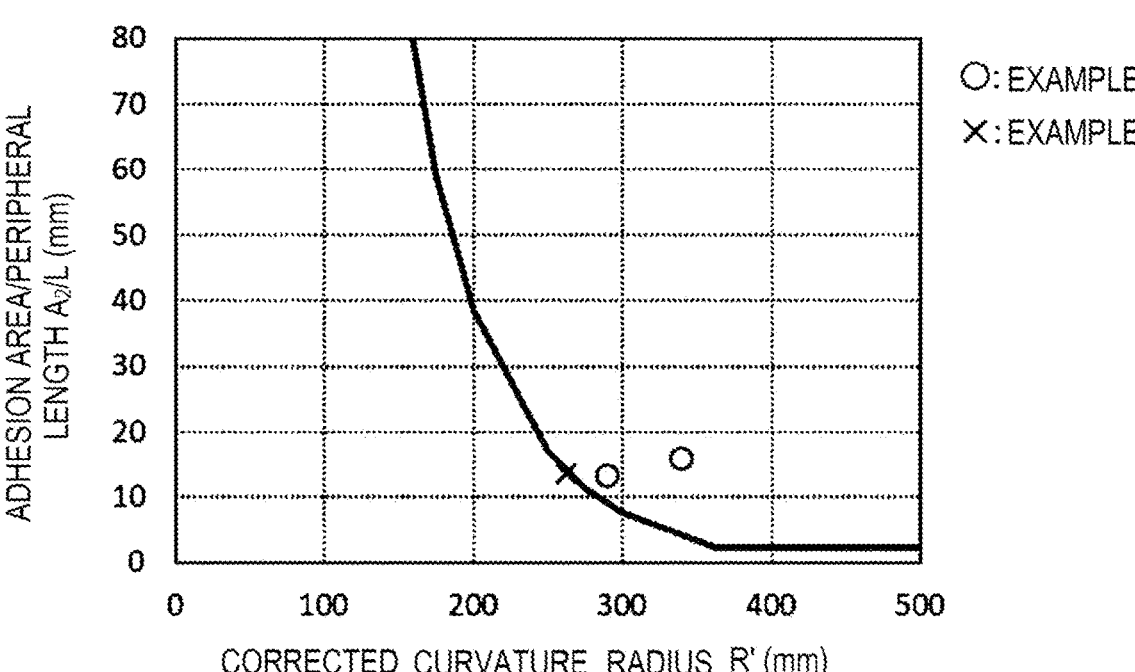

FIG. 29 is a graph showing evaluation results of cover glasses according to Examples 17 and 18.

FIG. 30 is a graph showing evaluation results of cover glasses according to Examples 19 and 20.

Figure 31:
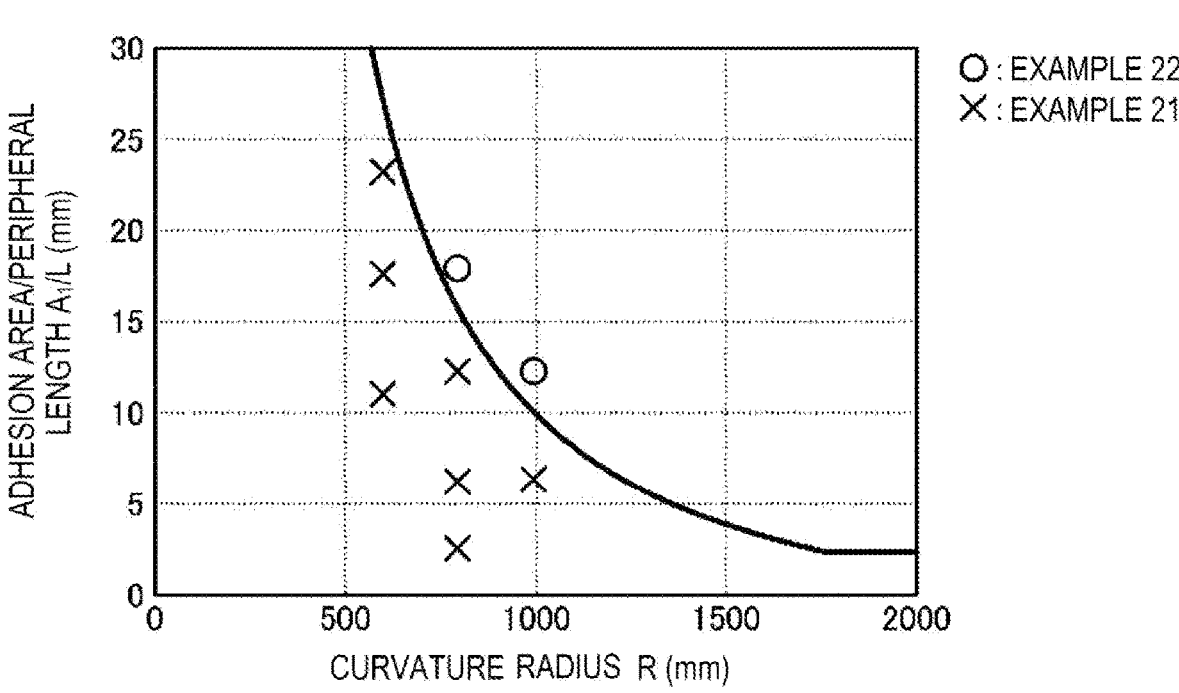

FIG. 31 is a graph showing evaluation results of cover glasses according to Examples 21 and 22.

Figure 32:
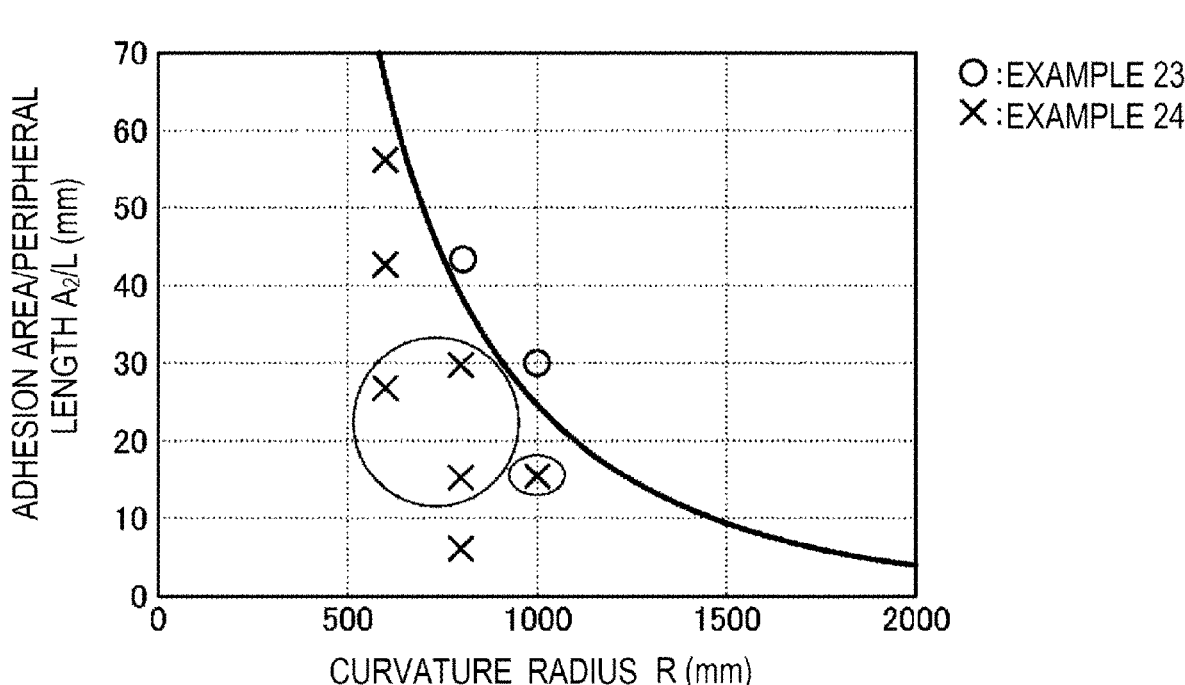

FIG. 32 is a graph showing evaluation results of cover glasses according to Examples 23 and 24.

Figure 33:
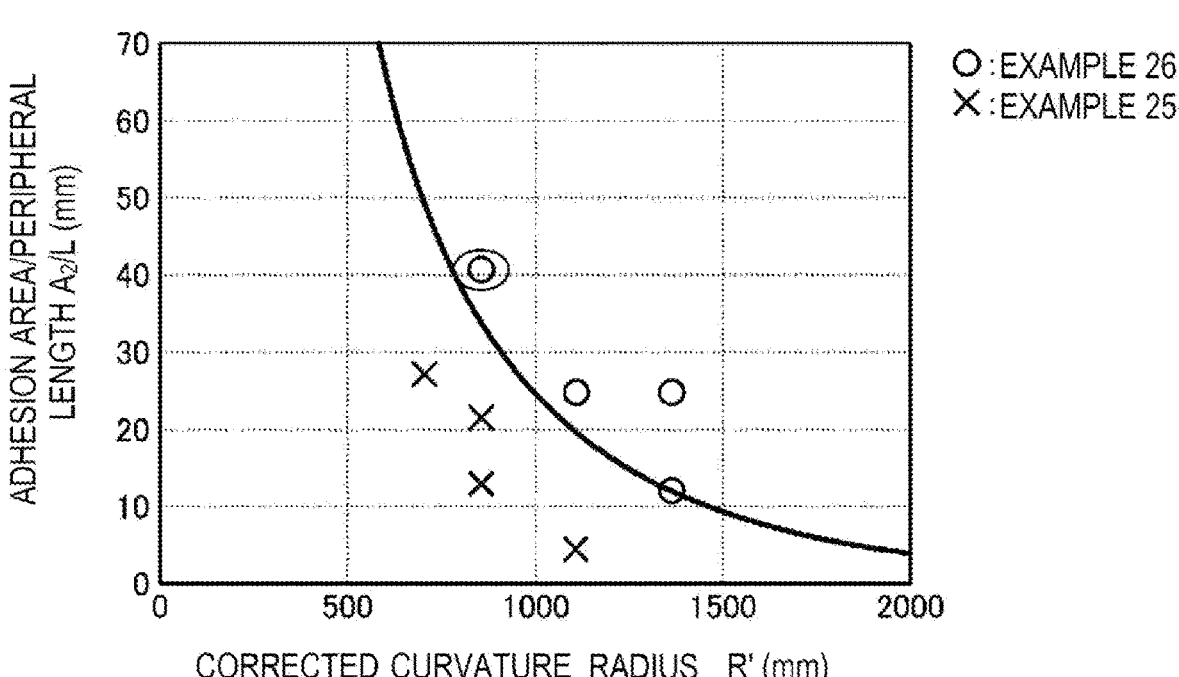

FIG. 33 is a graph showing evaluation results of cover glasses according to Examples 25 and 26.

Figure 34:
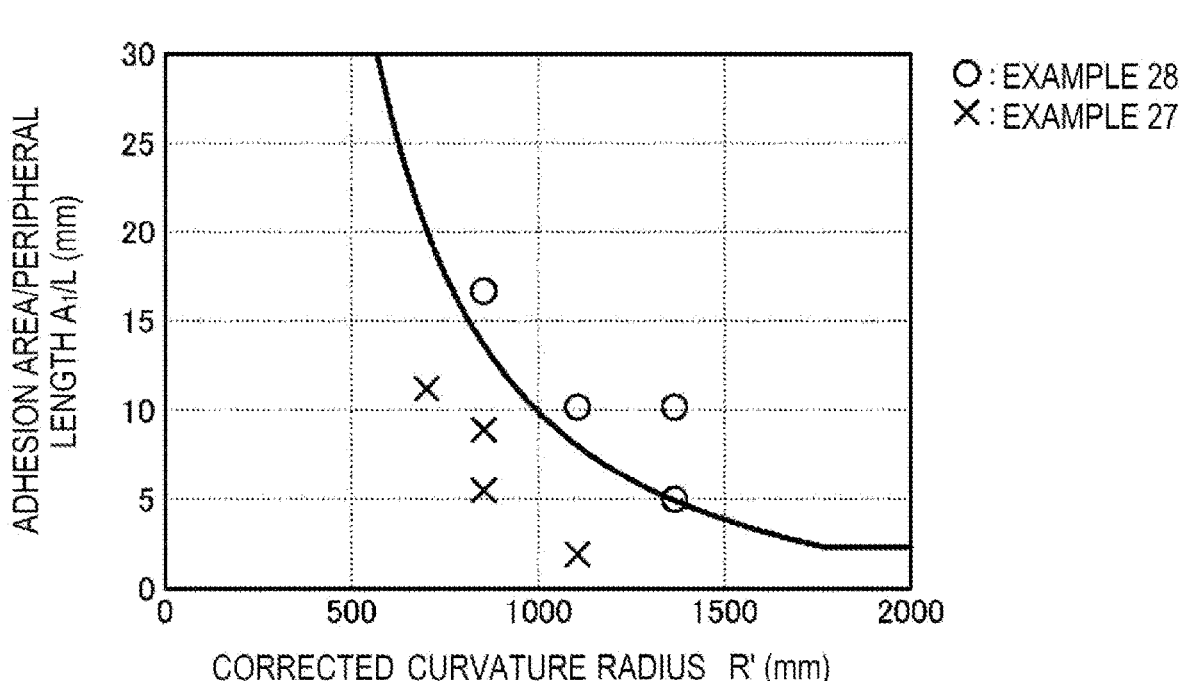

FIG. 34 is a graph showing evaluation results of cover glasses according to Examples 27 and 28.

Figure 35:
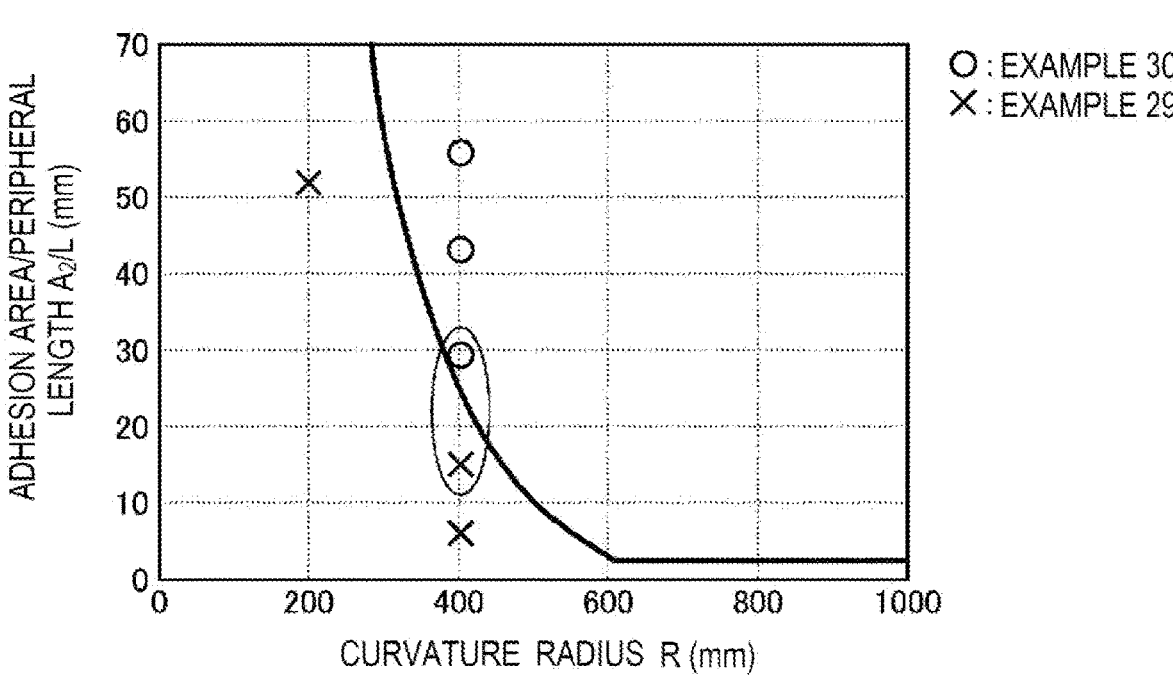

FIG. 35 is a graph showing evaluation results of cover glasses according to Examples 29 and 30.

Figure 36:
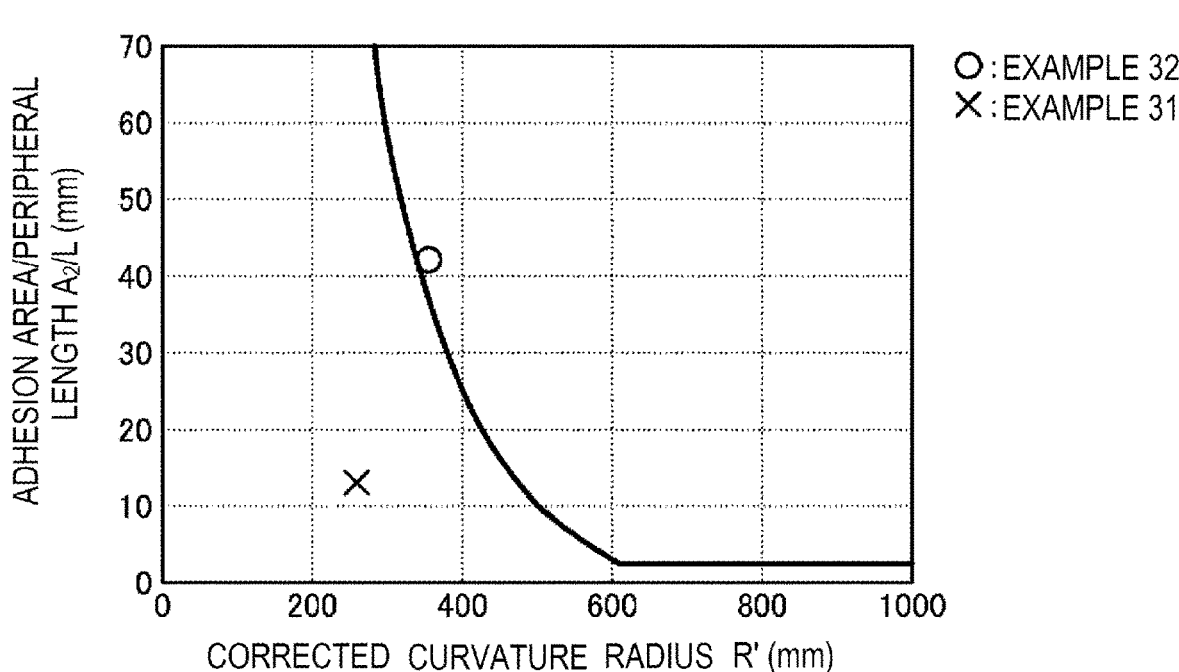

FIG. 36 is a graph showing evaluation results of cover glasses according to Examples 31 and 32.

Figure 37:
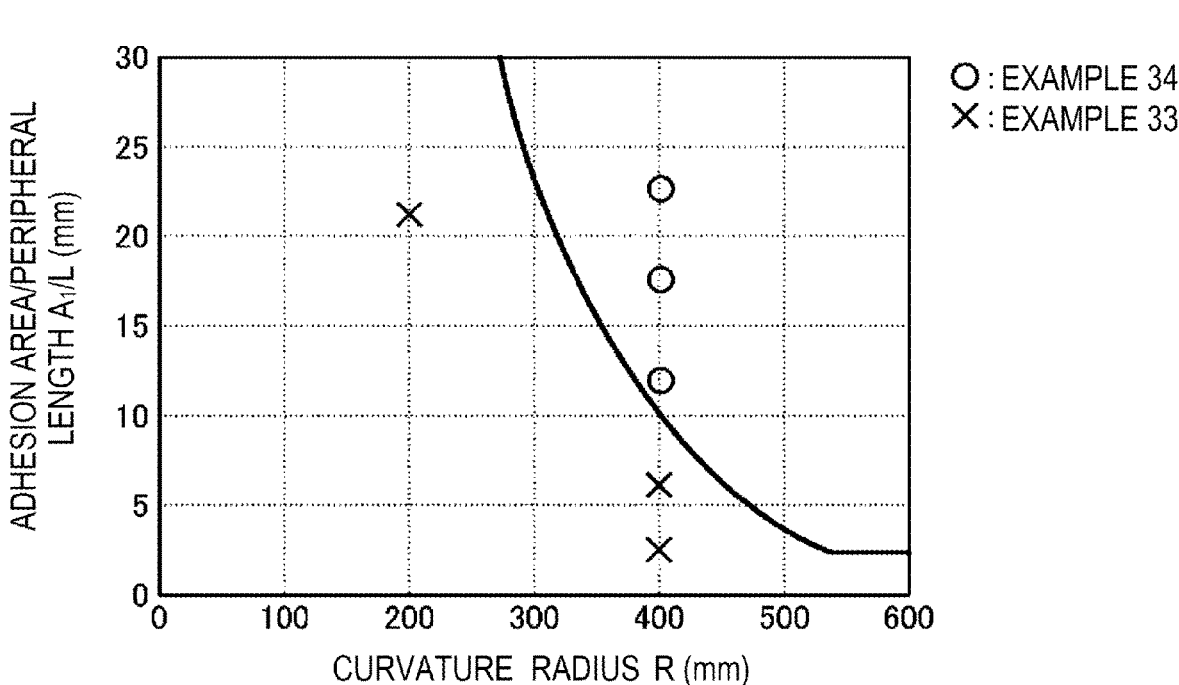

FIG. 37 is a graph showing evaluation results of cover glasses according to Examples 33 and 34.

Figure 38:
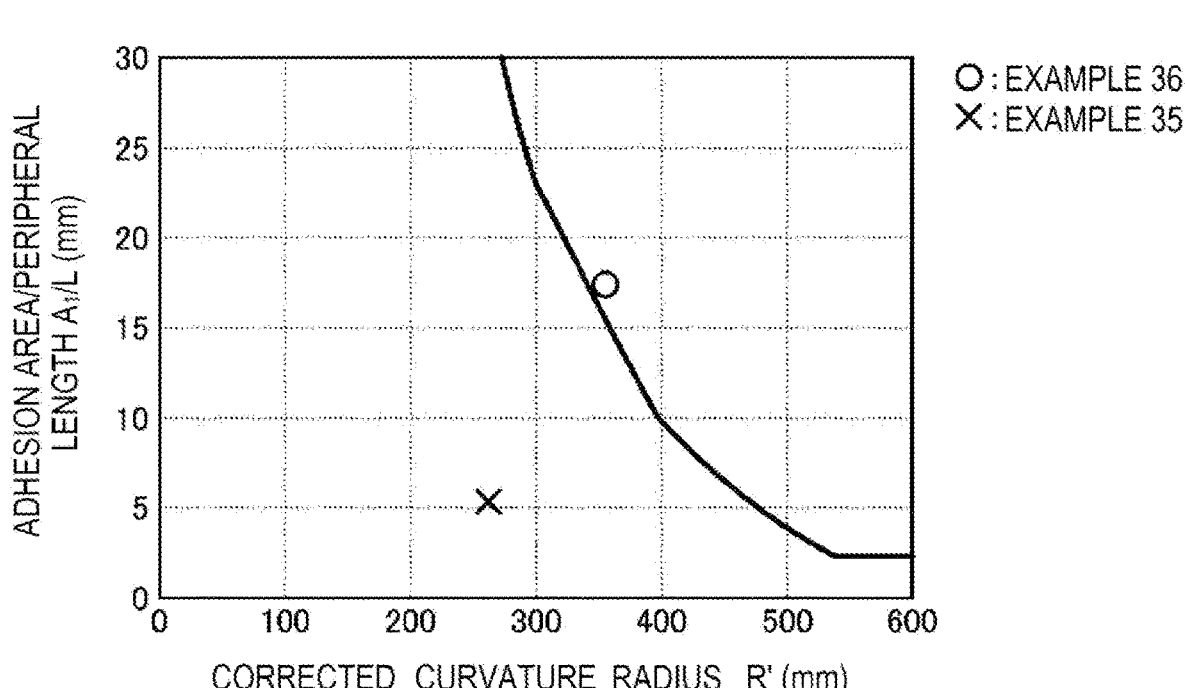

FIG. 38 is a graph showing evaluation results of cover glasses according to Examples 35 and 36.

Figure 39:
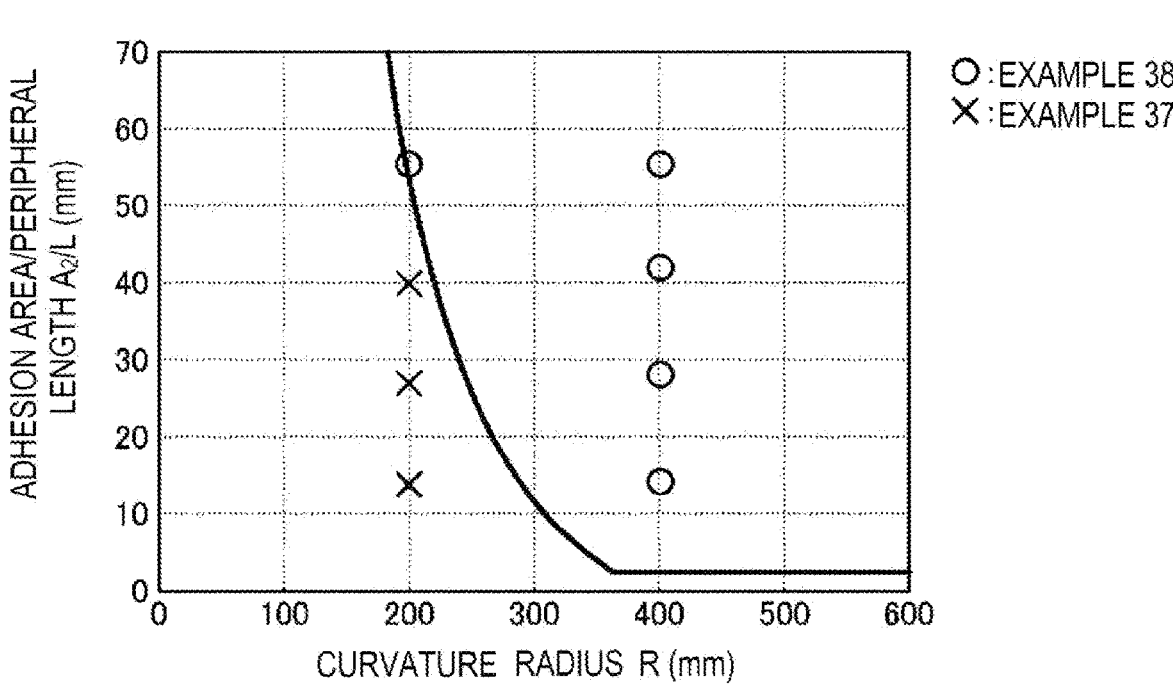

FIG. 39 is a graph showing evaluation results of cover glasses according to Examples 37 and 38.

Figure 40:
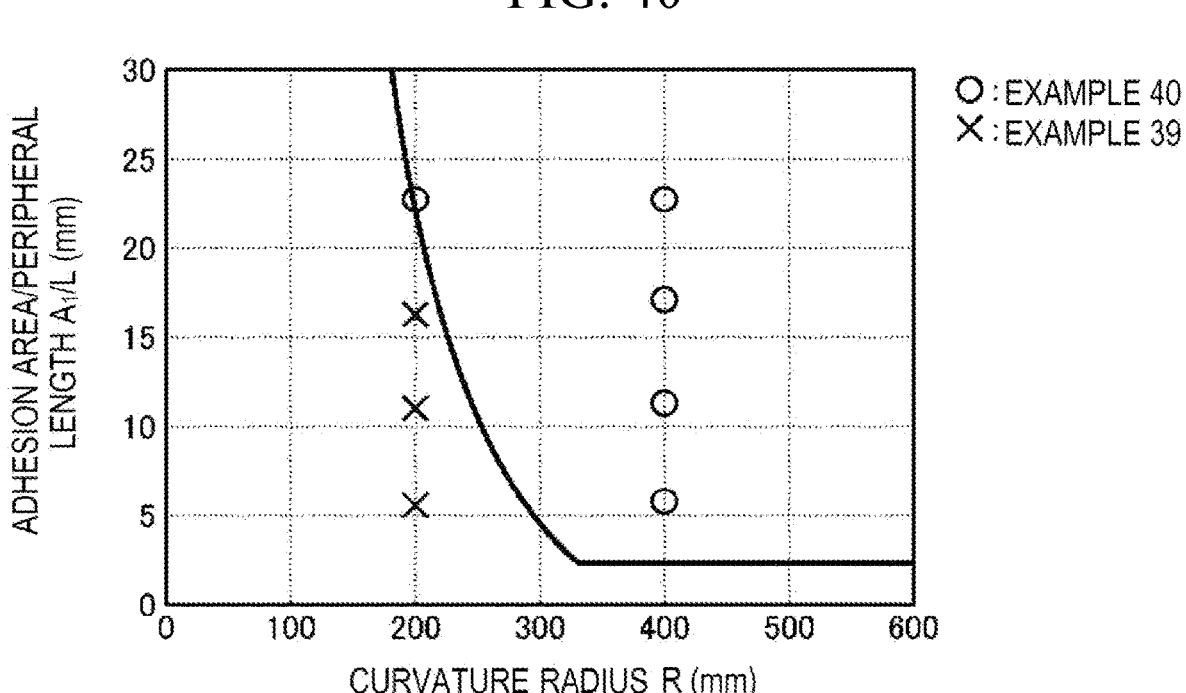

FIG. 40 is a graph showing evaluation results of cover glasses according to Examples 39 and 40.

Figure 41:
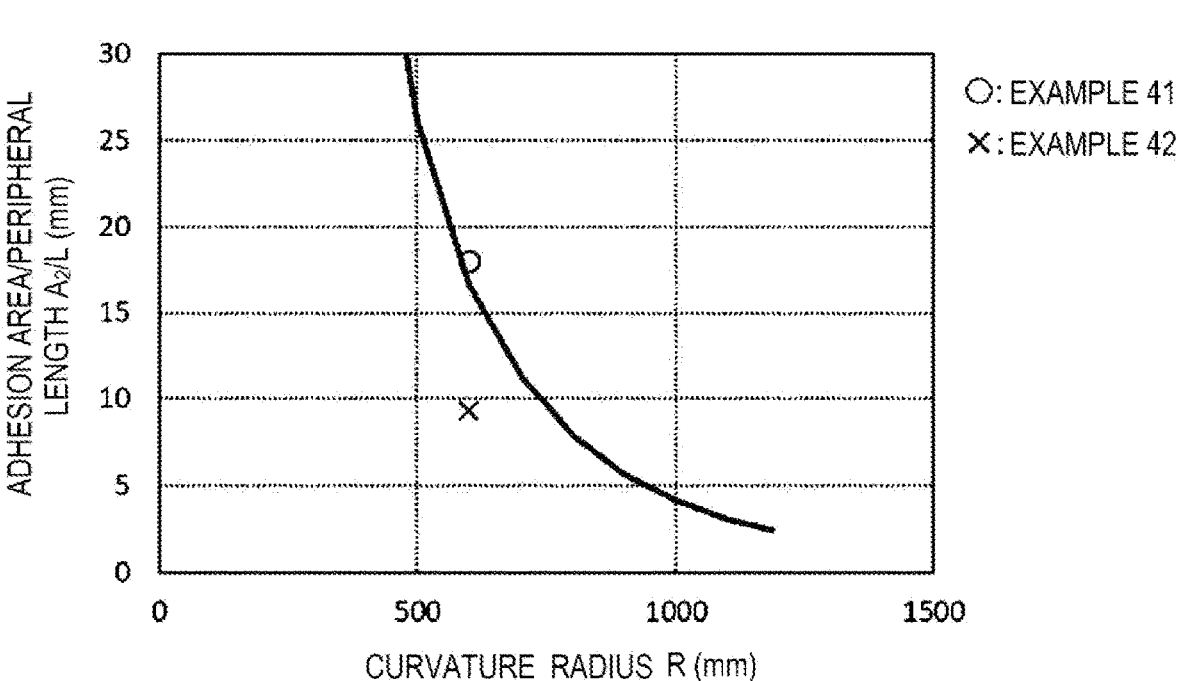

FIG. 41 is a graph showing evaluation results of cover glasses according to Examples 41 and 42.

Figure 42:
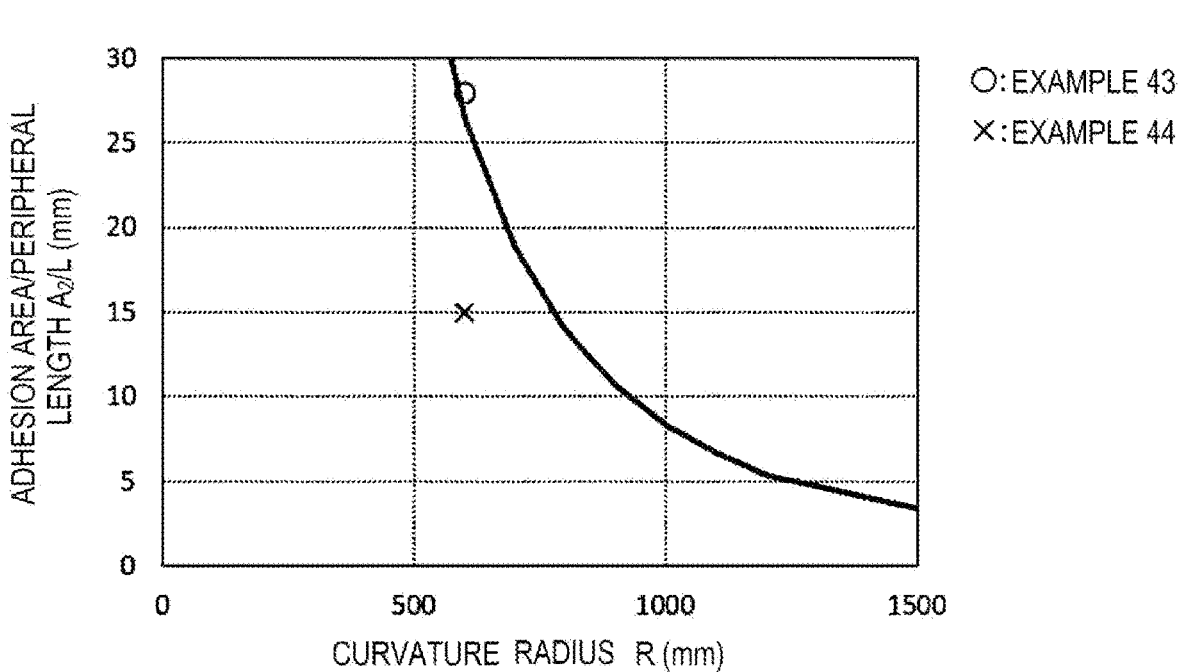

FIG. 42 is a graph showing evaluation results of cover glasses according to Examples 43 and 44.

DESCRIPTION OF EMBODIMENTS

Preferred embodiments of the present invention will be described below in detail with reference to the accompanying drawings. The present invention is not limited to these embodiments and in the case where there are a plurality of embodiments, also includes a combination of the embodiments. In addition, rounding ranges are included for numerical values.

(On-Vehicle Display Device)

Figure 1:
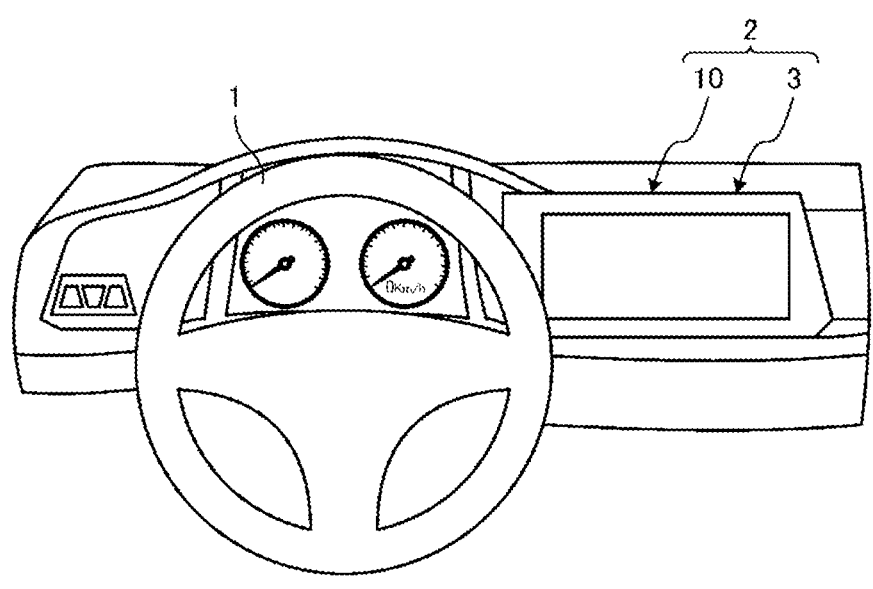
FIG. 1 is a schematic diagram illustrating an on-vehicle display device according to the present embodiment.

FIG. 1 is a schematic diagram illustrating an on-vehicle display device according to the present embodiment. As illustrated in FIG. 1, a glass article 10 according to the present embodiment is provided in an on-vehicle display device 2, and is used as a cover member for a surface (front surface) of a display 3 on which an image is displayed.

The on-vehicle display device 2 is a display device provided in a vehicle, and is provided on a front side of a steering shaft 1 in the vehicle, for example. The display 3 displays a car navigation screen, various meters such as a speed meter, a start button, and the like. However, the configuration of FIG. 1 is an example, and the on-vehicle display device 2 to which the glass article 10 is applied may have any configuration. In addition, the glass article 10 is not limited to being used as a cover member for a surface of the on-vehicle display device 2, and may be used for any application.

(Glass Article)

Figure 2:
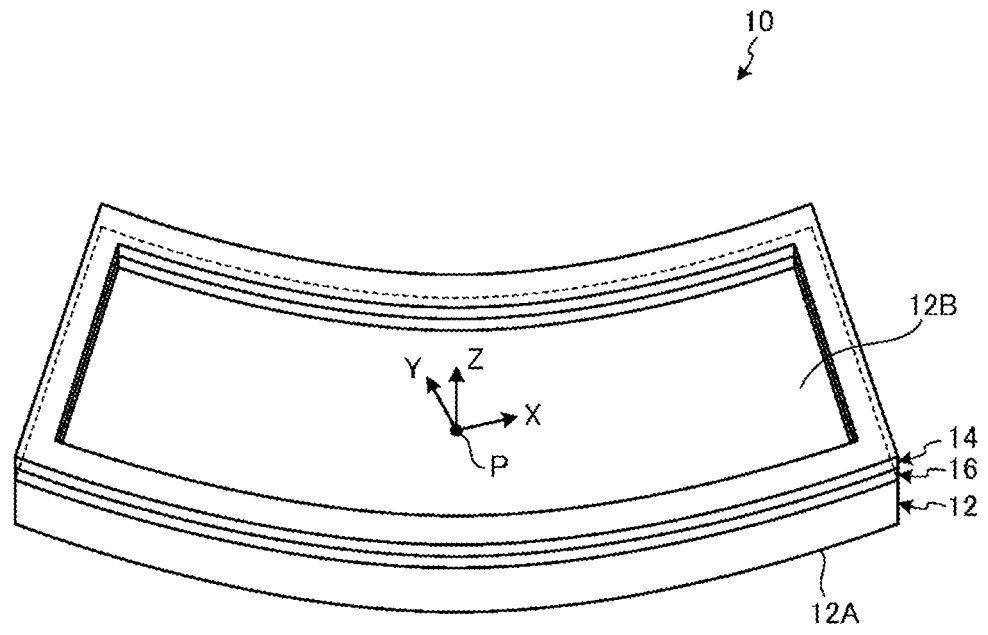
FIG. 2 is a schematic diagram of a glass article according to the present embodiment.

FIG. 2 is a schematic diagram of the glass article according to the present embodiment. As illustrated in FIG. 2, the glass article 10 includes a cover glass 12, a frame 14, and an adhesive layer 16. The cover glass 12 is a transparent plate-shaped glass member and includes a main surface 12A (first main surface) which is a main surface on one side and a main surface 12B (second main surface) which is a main surface on a side opposite to the main surface 12A. When the glass article 10 is mounted on an object to be mounted such as the on-vehicle display device 2, the main surface 12A of the cover glass 12 becomes a side exposed to the outside, and the main surface 12B becomes a side facing the object to be mounted (here, the display 3). The term "transparent" as used herein indicates allowing visible light to be transmitted.

The frame 14 is a frame-like member attached to the main surface 12B of the cover glass 12. The frame 14 is made of, for example, a resin or a metal, but is not limited thereto, and may be formed of any material. Since the cover glass 12 is curved in an X direction (first direction) as described later, the frame 14 is also curved in the X direction along the cover glass 12. The frame 14 is attached to a peripheral edge portion of the main surface 12B of the cover glass 12.

In the example of FIG. 2, the frame 14 is provided over an entire section of the peripheral edge portion of the main surface 12B of the cover glass 12 in a peripheral direction. However, the frame 14 is not limited thereto, and may be provided discontinuously at a part of the section. In addition, in the example of FIG. 2, an end portion of the cover glass 12 on a peripheral edge side does not protrude from the frame 14, but without being limited thereto, the end portion of the cover glass 12 on the peripheral edge side may protrude from the frame 14.

In the example of FIG. 2, the frame 14 is provided on a peripheral edge of the cover glass 12 and has a frame shape in which an inner side thereof is opened, but the frame 14 may have a box shape with no opening. That is, a plate-shaped member that covers the opening may be provided on a Z-direction side of the frame 14 in FIG. 2. In this manner, the shape of the frame 14 and the attachment position on the main surface 12B are not limited to the above description, and may be any shape and any position.

The frame 14 is fixed (adhered) to the main surface 12B of the cover glass 12 via the adhesive layer 16. That is, the adhesive layer 16 is provided between the frame 14 and the main surface 12B of the cover glass 12, and adheres a surface of the frame 14 on a cover glass 12 side and the main surface 12B of the cover glass 12. The adhesive layer 16 may be formed of any adhesive member capable of adhering the frame 14 and the cover glass 12, such as a double-sided tape or an adhesive.

The glass article 10 includes at least one of a first adhesive layer and a second adhesive layer as the adhesive layer 16. The first adhesive layer indicates an adhesive layer having an elastic modulus of 5 MPa or more in an indentation elastic modulus test, and the second adhesive layer indicates an adhesive layer having an elastic modulus of less than 5 MPa in the indentation elastic modulus test. That is, an indentation elastic modulus of the first adhesive layer is higher than the indentation elastic modulus of the second adhesive layer. The elastic modulus of the first adhesive layer in the indentation elastic modulus test is preferably less than 100 MPa, and more preferably less than 30 MPa. Here, the elastic modulus of the first adhesive layer in the indentation elastic modulus test is preferably 5 MPa or more and less than 100 MPa, and more preferably 5 MPa or more and less than 30 MPa. The elastic modulus of the second adhesive layer in the indentation elastic modulus test is preferably 0.2 MPa or more, and more preferably 0.5 MPa or more. Here, the elastic modulus of the second adhesive layer in the indentation elastic modulus test is preferably 0.2 MPa or more and less than 5 MPa, and more preferably 0.5 MPa or more and less than 5 MPa.

The first adhesive layer and the second adhesive layer are composed of different adhesive members. It can be said that the adhesive member constituting the first adhesive layer has a higher adhesive strength than the adhesive member constituting the second adhesive layer. The adhesive layer 16 may include three or more types of adhesive members.

The indentation elastic modulus test in the present embodiment is performed by the following method.

The adhesive layer 16 adhered to the main surface 12B of the cover glass 12 and the frame 14 is exposed toward an upper side in a vertical direction and is disposed on a creep meter (for example, model number RE2-33005C, manufactured by Yamaden Co., Ltd.), and a plunger (for example, a cylindrical plunger, model number P-61, φ1.5, H40, manufactured by Yamaden Co., Ltd.) is indented on the adhesive layer 16 at an indentation speed of 0.05 mm/sec in an environment of room temperature, for example, 20° C., and a relative humidity of 50%, until an indentation depth becomes 5% to 10% of the thickness of the adhesive layer 16.

A method of exposing the adhesive layer is not particularly limited, but a method in which the adhesive is not denatured is preferable. Examples thereof include a method of inserting a metal thin plate or the like between the first adhesive layer and the cover glass 12 or the frame 14, which is an object to be adhered, and physically peeling off the above members. In the case where the adhesive layer is broken in the middle of a thickness direction during peeling, it is preferable to measure the elastic modulus of the adhesive layer which remains thicker.

It addition, it is also preferable to measure the elastic modulus using the adhesive layer remaining on a member with a higher Young's modulus in the frame 14 and the cover glass 12. That is, it is preferable to measure the elastic modulus by causing the adhesive layer to remain on a frame side in the case where the frame is made of a metal, and causing the adhesive layer to remain on a cover glass side in the case where the frame is made of a resin having a low Young's modulus.

Next, a load acting on the plunger when the plunger is indented and a displacement amount in the indentation direction of the plunger are sequentially measured, the load and the displacement amount are plotted for each time, and a slope of an approximate line of each plotted point is calculated as the elastic modulus of the adhesive layer 16. This indentation elastic modulus test is performed for each position of the adhesive layer 16, and a region where the elastic modulus is 5 MPa or more is defined as the first adhesive layer, and a region where the elastic modulus is less than 5 MPa is defined as the second adhesive layer. It is preferable to perform the indentation elastic modulus test twice at the same position by plotting every 0.04 seconds. A position where the elastic modulus is 5 MPa or more in both of two measurements may be defined as the first adhesive layer, and a position where the elastic modulus is less than 5 MPa in both of the two measurements may be defined as the second adhesive layer.

Here, a meaning of the indentation elastic modulus test in the present invention will be described. In the glass article, the adhesive adheres a glass surface or a printing surface on the glass surface with the frame made of a metal or a resin. A material of the adhesive is generally designed so that the glass surface and the object to be adhered are peeled by the adhesive being broken when the adhered glass surface and the object to be adhered are to be peeled. Further, it is known that the adhesive strength when the adhesive is broken depends on a tensile elastic modulus of the adhesive. However, it is difficult to perform measurement in a glass article in a state where a cover glass and a frame are adhered to each other, by a cross-shaped adhesive strength test, an H-type adhesive strength test, or the like, which is known as an existing adhesive strength test. In the present invention, an indentation elastic modulus test capable of being verified from a glass article in a state where a cover glass and a frame are adhered to each other is adopted as an evaluation method in place of the existing adhesive strength test. In the present invention, since the adhesive is broken when the frame is peeled off from the glass article, and it is known that there is generally a positive correlation between the tensile elastic modulus and the indentation elastic modulus, it is presumed that there is also a correlation between the adhesive strength and the elastic modulus in the indentation test.

(Cover Glass)

The cover glass 12 is attached to the frame 14 while being curved. In the present embodiment, the cover glass 12 is attached to the frame 14 by bending a flat plate-shaped glass plate by a cold forming method. That is, the cover glass 12 is attached to the frame 14 in a state where bending stress is applied. Hereinafter, the cover glass 12 will be described more specifically. The term "cold forming" as used herein indicates a method of bending the glass into a desired shape without increasing the temperature thereof to a softening point.

(Shape of Cover Glass)

Figure 3:
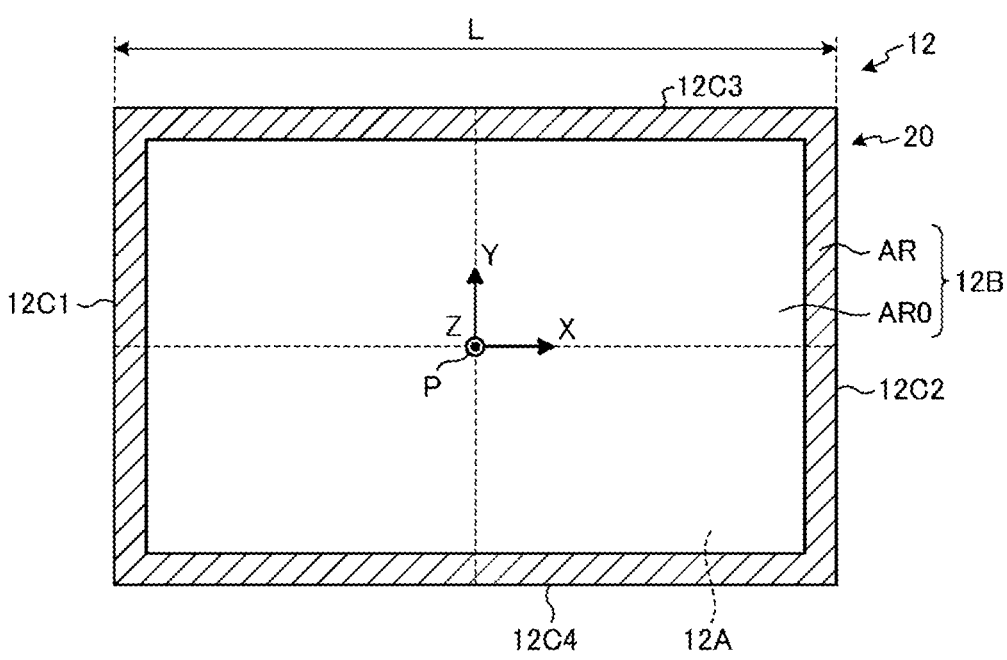
FIG. 3 is a top view of a cover glass.
Figure 4:
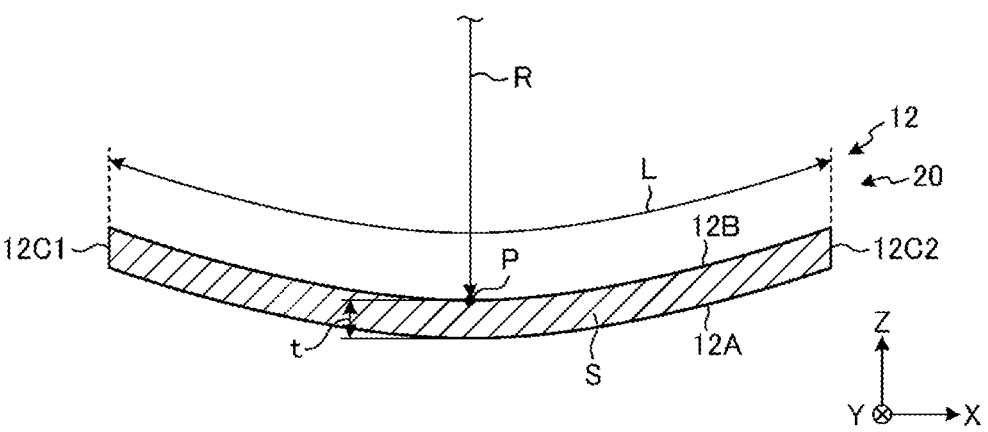
FIG. 4 is a cross-sectional view of the cover glass.

FIG. 3 is a top view of the cover glass, and FIG. 4 is a cross-sectional view of the cover glass. In the example of FIG. 3, the cover glass 12 has a shape in which a rectangular flat plate-shaped glass plate is curved. Hereinafter, one side surface (end surface) of the cover glass 12 is defined as a side surface 12C1, a side surface facing the side surface 12C1 is defined as a side surface 12C2, another side surface of the cover glass 12 is defined as a side surface 12C3, and a side surface facing the side surface 12C3 is defined as a side surface 12C4.

In the example of FIG. 3, the side surfaces 12C1 and 12C2 are short sides of the rectangle, and the side surfaces 12C3 and 12C4 are long sides of the rectangle. The cover glass 12 is not limited to a shape in which a rectangular flat plate-shaped glass plate is curved, and may be a shape in which a glass plate having any shape is curved. For example, the cover glass 12 may have a shape in which a polygonal, circular, or elliptical flat plate-shaped glass plate is curved.

(Bending of Cover Glass)

FIG. 3 is a view when the cover glass 12 is viewed from a normal direction (Z direction) of a position P on the main surface 12B of the cover glass 12, and FIG. 4 illustrates a cross section S of the cover glass 12 along the X direction.

Here, a tangential direction selected so as to satisfy the following conditions among tangential directions of the main surface 12B at an arbitrary point P of the main surface 12B of the cover glass 12 is defined as an X direction (first direction), a direction orthogonal to the X direction among the tangential directions of the main surface 12B at the point P is defined as a Y direction, and a direction orthogonal to the X direction and the Y direction, that is, a normal direction (thickness direction) of the position P is defined as a Z direction. Here, the X direction indicates a direction in which, among the tangential directions of the main surface 12B at the arbitrary point P of the main surface 12B of the cover glass 12, a curvature radius of a line formed by intersection of the main surface 12B and a plane including the tangential direction and the normal direction becomes minimum.

Since the cover glass 12 according to the present embodiment is uniaxially bent, the X direction can be unambiguously defined even when the position P is set to any point. However, as in another example described later, a plurality of curved portions 20 may be provided, and bending directions of the respective curved portions 20 may intersect with one another. In this case, the X direction may be defined for each curved portion 20. That is, among tangential directions of the position P on one curved portion 20, a direction in which a curvature radius of a line formed by intersection of the main surface 12B and a plane including a tangential direction and a normal direction is minimum may be defined as the X direction of this curved portion 20, and the X direction may be defined in the same manner for each curved portion 20.

In the case where there are a plurality of tangential directions in which a curvature radius of a line formed by intersection of the main surface 12B and a plane including a tangential direction and a normal direction is minimum, at least one direction of the tangential directions may be defined as the X direction. Hereinafter, a curvature radius of a line formed by intersection of the main surface 12B and a plane including the X direction and the Z direction is referred to as a curvature radius R1.

It can be said that the cover glass 12 is curved with a curvature radius R with the Y direction as a bending axis and the X direction as a direction orthogonal to the bending axis. The curvature radius R of the cover glass 12 (curvature radius of bending with the Y direction as the bending axis) is preferably 50 mm or more and 10,000 mm or less, more preferably 100 mm or more and 5,000 mm or less, and still more preferably 200 mm or more and 3,000 mm or less. In the case where the curvature radius R falls within this range, peeling from the frame can be suppressed while improving designability. Further, the curvature radius may be, for example, 2,000 mm or less, 1,750 mm or less, 1,500 mm or less, 1,250 mm or less, and 1,000 mm or less. In the case where the curvature radius is within this range, peeling from the frame is likely to occur in the related art, but peeling can be significantly suppressed by satisfying the formula of the present invention.

The cover glass 12 is preferably not bent in a direction other than a bending direction with the Y direction as a bending axis. The cover glass 12 preferably does not have bending with the X direction as a bending axis, in other words, a trajectory on the main surface 12B of the cover glass 12 along the Y direction is preferably linear. The term "not have bending" is not limited to the case where the curvature radius is infinite, and may include the case where the curvature radius is larger than 10,000 mm. In the case where the cover glass 12 is not bent in a direction other than a direction with the Y direction as a bending axis in this manner, the cover glass 12 can be developed in a plane and cold forming can be appropriately performed.

Hereinafter, a portion of the cover glass 12 that is bent with the Y direction as a bending axis is referred to as the curved portion 20. The curved portion 20 indicates a region of the cover glass 12 that is bent with the same curvature radius R with the Y direction as a bending axis. That is, it can be said that the curved portion 20 of the cover glass 12 is bent with the curvature radius R with the Y direction as a bending axis. In the example of FIG. 4, since the entire cover glass 12 is bent with the same curvature radius R in the X direction, it can be said that the entire cover glass 12 is the curved portion 20.

The expression "the curvature radius R is the same" as used herein is not limited to the case where the curvature radius R is strictly the same for each position. For example, in the case where the change in the measured curvature radius R is 5% or less at each position from an end point on one side to an end point on the other side in the X direction of a region bent with the Y direction as a bending axis on the main surface 12B of the cover glass 12, that is, in the case where a difference between a maximum value and a minimum value of the curvature radius R at each position is 5% or less of the maximum value of the curvature radius R at each position, the region is regarded as a region having the same curvature radius and is treated as one curved portion 20. An average value of the curvature radius R at each position of the curved portion 20 may be treated as the curvature radius R of the curved portion 20.

Examples of a method of measuring the curvature radius R of the cover glass 12 include a method of measuring a shape by using a contact type or non-contact type three-dimensional measuring machine and obtaining the curvature radius R based on shape data, and a method of pressing an R ruler against the cover glass 12 and measuring the curvature radius R.

In the present embodiment, the curved portion 20 is bent to be convex toward a main surface 12A side. However, the curved portion 20 is not limited to being bent to be convex toward the main surface 12A side, and may be bent to be convex toward a main surface 12B side.

The arbitrary point P described above is any point in the curved portion 20 of the main surface 12B, and for example, may be a central position of the main surface 12B (for example, a position of a center of gravity of the cover glass 12) in the case where a central region of the main surface 12A is the curved portion 20. That is, the X direction and the Y direction may be tangential directions from the center of the main surface 12B, and the Z direction may be a normal direction at the center of the main surface 12B.

(Length of Curved Portion)

The length of the curved portion 20 in the X direction orthogonal to the bending axis is defined as a peripheral length L. The peripheral length L indicates the length of a line extending in the X direction on the main surface 12B and connecting an end point (position) on one side of the curved portion 20 in the X direction to an end point (position) on the other side of the curved portion 20 in the X direction.

The line extending in the X direction on the main surface 12B indicates a line extending in the X direction along the main surface 12B without shifting in the Y direction. In the example of FIG. 3, the end point on one side of the curved portion 20 in the X direction is a point on the side surface 12C1, the end point on the other side of the curved portion 20 in the X direction is a point on the side surface 12C2, and therefore, the peripheral length L indicates the length of a line extending in the X direction on the main surface 12B from the side surface 12C1 to the side surface 12C2.

The peripheral length L is preferably 100 mm or more and 2,000 mm or less, more preferably 150 mm or more and 700 mm or less, and still more preferably 200 mm or more and 400 mm or less. Here, the peripheral length L is preferably 100 mm or more, more preferably 150 mm or more, and still more preferably 200 mm or more, and is preferably 2,000 mm or less, more preferably 700 mm or less, and still more preferably 400 mm or less. In the case where the peripheral length L falls within this range, peeling from the frame can be suppressed while improving designability.

In the present embodiment, even in a region where the curvature radius R is the same, a region in which the peripheral length L is 5 mm or less (for example, surface unevenness or fine undulation) is not treated as the curved portion 20. That is, a region where the curvature radius R is the same and the peripheral length L is longer than 5 mm is defined as the curved portion 20.

The length of the curved portion 20 in the Y direction as the bending axis is preferably 80 mm or more and 500 mm or less, more preferably 100 mm or more and 400 mm or less, and still more preferably 120 mm or more and 300 mm or less. Here, the length in the Y direction is preferably 80 mm or more, more preferably 100 mm or more, and still more preferably 120 mm or more, and is preferably 500 mm or less, more preferably 400 mm or less, and still more preferably 300 mm or less.

The length of the curved portion 20 in the Y direction indicates the length of a line extending in the Y direction on the main surface 12B and connecting an end point (position) on one side of the curved portion 20 in the Y direction to an end point (position) on the other side of the curved portion 20 in the Y direction.

The line extending in the Y direction on the main surface 12B indicates a line extending in the Y direction along the main surface 12B without shifting in the X direction. In the example of FIG. 3, the respective points are points on the side surfaces 12C3 and 12C4, and therefore, the length of the curved portion 20 in the Y direction indicates the length of a line extending in the Y direction on the main surface 12B from the side surface 12C3 to the side surface 12C4.

(Thickness of Cover Glass)

The thickness t of the cover glass 12 is preferably 0.3 mm or more and 3.0 mm or less, more preferably 0.4 mm or more and 1.5 mm or less, and still more preferably 0.6 mm or more and 1.3 mm or less. Here, the thickness t is preferably 0.3 mm or more, more preferably 0.4 mm or more, and still more preferably 0.6 mm or more, and is preferably 3.0 mm or less, more preferably 1.5 mm or less, and still more preferably 1.3 mm or less. In the case where the thickness t falls within this range, peeling from the frame can be suppressed while improving designability. The thickness t indicates the distance from the main surface 12A to the main surface 12B in the Z direction.

(Young's Modulus of Cover Glass)

The Young's modulus E of the cover glass 12 is preferably 60 GPa or more and 90 GPa or less, more preferably 68 GPa or more and 78 GPa or less, and still more preferably 72 GPa or more and 76 GPa or less. Here, the Young's modulus E is preferably 60 GPa or more, more preferably 68 GPa or more, and still more preferably 72 GPa or more, and is preferably 90 GPa or less, more preferably 78 GPa or less, and still more preferably 76 GPa or less. In the case where the Young's modulus E falls within this range, peeling from the frame can be suppressed while improving designability.

(Material of Cover Glass)

A glass material for the cover glass 12 is any material, and for example, an alkali-free glass, a soda lime glass, a soda lime silicate glass, an aluminosilicate glass, a borosilicate glass, a lithium aluminosilicate glass, and a borosilicate glass can be used. The cover glass 12 is preferably an aluminosilicate glass or a lithium aluminosilicate glass to which a large stress is easily introduced by a tempering treatment even in the case where the thickness is thin and by which a glass with a high strength can be obtained even in the case where the thickness is thin. A chemical tempering treatment is generally performed by immersing a glass in a molten salt containing alkali metals.

The cover glass 12 preferably contains, in terms of mol % based on oxides, 50% to 80% of $SiO_2$, 0.1% to 25% of $Al_2O_3$, 3% to 30% of $Li_2O+Na_2O+K_2O$, 0% to 25% of MgO, 0% to 25% of CaO, and 0% to 5% of $ZrO_2$, but is not particularly limited thereto. Here, "50% to 80%" as used herein indicates 50% or more and 80% or less when mol % of the total amount of the cover glass 12 is defined as 100%, and other numerical ranges are defined in the same manner. In addition, "$Li_2O+Na_2O+K_2O$" indicates the total content of $Li_2O$, $Na_2O$, and $K_2O$. In the case where the cover glass 12 has the following composition, the rigidity can also be appropriately maintained even when the cover glass 12 is curved.

More specifically, a more preferable composition of the glass for the cover glass 12 includes the following glass compositions. For example, "containing 0% to 25% of MgO" means that MgO is not essential but may be contained up to 25%.

Glass of (i) is categorized in the soda lime silicate glass, glass of (ii) and (iii) are categorized in the aluminosilicate glass, and glass of (iv) and (v) are categorized in the lithium aluminosilicate glass.

(i) Glass having a composition containing, in terms of mol %, 63% to 73% of $SiO_2$, 0.1% to 5.2% of $Al_2O_3$, 10% to 16% of $Na_2O$, 0% to 1.5% of $K_2O$, 0% to 5.0% of $Li_2O$, 5% to 18% of MgO, and 1% to 10% of CaO (ii) Glass having a composition containing, in terms of mol %, 50% to 74% of $SiO_2$, 5% to 15% of $Al_2O_3$, 10% to 20% of $Na_2O$, 0% to 8% of $K_2O$, 0% to 5.0% of $Li_2O$, 2% to 15% of MgO, 0% to 6% of CaO, and 0% to 5% of $ZrO_2$, in which the total content of $SiO_2$ and $Al_2O_3$ is 65% to 85%, the total content of $Na_2O$ and $K_2O$ is 12% to 25%, and the total content of MgO and CaO is 1% to 15%

(iii) Glass having a composition containing, in terms of mol %, 68% to 80% of $SiO_2$, 4% to 10% of $Al_2O_3$, 5% to 15% of $Na_2O$, 0% to 1% of $K_2O$, 0% to 5.0% of $Li_2O$, 4% to 15% of MgO, and 0% to 1% of $ZrO_2$ (iv) Glass having a composition containing, in terms of mol %, 67% to 75% of $SiO_2$, 0% to 4% of $Al_2O_3$, 7% to 15% of $Na_2O$, 1% to 9% of $K_2O$, 0% to 5.0% of $Li_2O$, 6% to 14% of MgO, and 0% to 1.5% of $ZrO_2$, in which the total content of $SiO_2$ and $Al_2O_3$ is 71% to 75%, the total content of $Na_2O$ and $K_2O$ is 12% to 20%, and the content of CaO is less than 1% in the case where CaO is contained (v) Glass having a composition containing, in terms of mol %, 50% to 73% of $SiO_2$, 5% to 20% of $Al_2O_3$, 0% to 6% of $B_2O_3$, 0% to 10% of $P_2O_5$, 4% to 12% of $Li_2O$, 3% to 20% of $Na_2O$, 0% to 5% of $K_2O$, 0% to 8% of MgO, 0% to 2% of CaO, 0% to 5% of SrO, 0% to 5% of BaO, 0% to 5% of ZnO, 0% to 2% of $TiO_2$, and 0% to 4% of $ZrO_2$ (Adhesion Region)

In the entire main surface 12B of the curved portion 20, a region overlapping the adhesive layer 16 is defined as an adhesion region AR, and a region not overlapping an adhesive layer 16 is defined as a region AR0. The adhesion region AR is formed on a radially outer side of the region AR0 when an axis passing through a central position of the curved portion 20 along the Z direction is defined as an axial direction.

In the present embodiment, the entire cover glass 12 constitutes the curved portion 20, and therefore, a region overlapping the adhesive layer 16 in the entire main surface 12B of the cover glass 12 is the adhesion region AR. The adhesion region AR may not be continuous, and a plurality of discontinuous or mottled adhesion regions AR may be formed.

In addition, a region overlapping the first adhesive layer having an elastic modulus of 5 MPa or more (region overlapping the first adhesive layer in the adhesion region AR) in the entire main surface 12B of the curved portion 20 is defined as a first adhesion region, and a region overlapping the second adhesive layer having an elastic modulus of less than 5 MPa (region overlapping the second adhesive layer in the adhesion region AR) in the entire main surface 12B of the curved portion 20 is defined as a second adhesion region.

In the present embodiment, the entire cover glass 12 constitutes the curved portion 20, and therefore, a region overlapping the first adhesive layer in the entire main surface 12B of the cover glass 12 is the first adhesion region, and a region overlapping the second adhesive layer in the entire main surface 12B of the cover glass 12 is the second adhesion region.

In this case, the area $A_1$ of the first adhesion region is preferably 8,288 $mm^2$ or less, and the area $A_2$ of the second adhesion region is preferably 20,214 $mm^2$ or less. In addition, a value $((A_1+A_2)/L)$ obtained by dividing, by the peripheral length L, a value obtained by summing the area $A_1$ of the first adhesion region and the area $A_2$ of the second adhesion region (region AR in the present embodiment) is preferably 80 mm or less. The area $A_1$ of the first adhesion region may be referred to as an area of the first adhesive layer in the curved portion, and the area $A_2$ of the second adhesion region may be referred to as an area of the second adhesive layer in the curved portion.

This preferable numerical range can be applied to all of the case where the second adhesion region is not provided and the first adhesion region is provided, the case where the first adhesion region is not provided and the second adhesion region is provided, and the case where both the first adhesion region and the second adhesion region are provided.

In the case where the second adhesion region is not provided and the first adhesion region is provided, the area $A_1$ of the first adhesion region is preferably 350 $mm^2$ or more and 95,000 $mm^2$ or less, more preferably 740 $mm^2$ or more and 25,000 $mm^2$ or less, and still more preferably 1,500 $mm^2$ or more and 8,500 $mm^2$ or less. Here, the area $A_1$ of the first adhesion region is preferably 350 $mm^2$ or more, more preferably 740 $mm^2$ or more, and still more preferably 1,500 $mm^2$ or more, and is preferably 95,000 $mm^2$ or less, more preferably 25,000 $mm^2$ or less, and still more preferably 8,500 $mm^2$ or less.

In this case, a value $(A_1/L)$ obtained by dividing the area $A_1$ of the first adhesion region by the peripheral length L is preferably 50 mm or less, more preferably 35 mm or less, and still more preferably 25 mm or less.

In addition, in the case where the first adhesion region is not provided and the second adhesion region is provided, the area $A_2$ of the second adhesion region is preferably 850 $mm^2$ or more and 230,000 $mm^2$ or less, more preferably 1,700 $mm^2$ or more and 60,000 $mm^2$ or less, and still more preferably 3,800 $mm^2$ or more and 20,000 $mm^2$ or less. Here, the area $A_2$ of the second adhesion region is preferably 850 mm$^2$ or more, more preferably 1,700 mm$^2$ or more, and still more preferably 3,800 mm$^2$ or more, and is preferably 230,000 mm$^2$ or less, more preferably 60,000 mm$^2$ or less, and still more preferably 20,000 mm$^2$ or less.

In addition, in this case, a value $(A_2/L)$ obtained by dividing the area $A_2$ of the second adhesion region by the peripheral length L is preferably 115 mm or less, more preferably 85 mm or less, and still more preferably 50 mm or less.

In addition, in the case where both the first adhesion region and the second adhesion region are provided, the area $A_1$ of the first adhesion region is preferably 170 mm$^2$ or more and 47,000 mm$^2$ or less, more preferably 370 mm$^2$ or more and 12,000 mm$^2$ or less, and still more preferably 790 mm$^2$ or more and 4,200 mm$^2$ or less. In addition, the area $A_2$ of the second adhesion region is preferably 420 mm$^2$ or more and 110,000 mm$^2$ or less, more preferably 880 mm$^2$ or more and 29,000 mm$^2$ or less, and still more preferably 1,900 mm$^2$ or more and 10,000 mm$^2$ or less. Here, the area $A_1$ of the first adhesion region is preferably 170 mm$^2$ or more, more preferably 370 mm$^2$ or more, and still more preferably 790 mm$^2$ or more, and is preferably 47,000 mm$^2$ or less, more preferably 12,000 mm$^2$ or less, and still more preferably 4,200 mm$^2$ or less. In addition, the area $A_2$ of the second adhesion region is preferably 420 mm$^2$ or more, more preferably 880 mm$^2$ or more, and still more preferably 1,900 mm$^2$ or more, and is preferably 110,000 mm$^2$ or less, more preferably 29,000 mm$^2$ or less, and still more preferably 10,000 mm$^2$ or less.

In addition, in this case, the value $((A_1+A_2)/L)$ obtained by dividing, by the peripheral length L, the value obtained by summing the area $A_1$ of the first adhesion region and the area $A_2$ of the second adhesion region (region AR in the present embodiment) is preferably 80 mm or less, more preferably 60 mm or less, and still more preferably 40 mm or less.

In the case where the areas of the first adhesion region and the second adhesion region fall within these ranges, peeling from the frame can be suppressed while suppressing the region AR0 in which the image is displayed from becoming small. For example, a printed layer is formed in the adhesion region AR, and the region AR0 is used as, for example, a displaying portion.

(Relation Among Characteristics of Cover Glass)

Here, in the case where the cover glass is curved and adhered to the frame, the cover glass may be peeled off from the frame by springback, that is, by a force of the cover glass returning to a flat plate shape. As a result of diligent studies, the present inventors have devised that peeling from the frame can be suppressed by setting a relation among the characteristics of the cover glass 12 (in the present embodiment, a relation among the curvature radius R, the thickness t, the Young's modulus E, the peripheral length L, and the areas of the first adhesion region and the second adhesion region) to an appropriate range. Hereinafter, the relation among the characteristics of the cover glass 12 will be described.

Hereinafter, a correction value of the curvature radius R of the curved portion 20 is referred to as a corrected curvature radius R'. The corrected curvature radius R' is represented by the following formula (1). The corrected curvature radius R' is a correction value of the curvature radius R in the case where flat regions (flat portions) that are not bent and are flat are connected to both sides (one direction side and the other direction side in the X direction) of the curved portion 20 in the X direction.

[Math. 9]

$$R'=R+F(5t-0.4) \qquad (1)$$

The length F in the formula (1) is the length in the X direction of the flat portion having a shorter length in the X direction among the flat portions adjacently connected to both sides of the curved portion 20 in the X direction. That is, the length F is the length of the flat portion having a shorter length in the X direction, along a main surface of the flat portion, from an end portion on one side in the X direction (end portion on a side connected to the curved portion 20) to an end portion on the other side in the X direction of the flat portion (end portion on a side not connected to the curved portion 20). In the present embodiment, the flat portion is not provided, and therefore, F is zero, and the corrected curvature radius R' is the same value as the curvature radius R. An example in which a flat portion is provided will be described later.

(Case being Convex Toward Main Surface 12A Side)

The case where the curved portion 20 is curved to be convex toward the main surface 12A side will be described. In the case where the curved portion 20 is curved to be convex toward the main surface 12A side, when $C_2$ is defined to a value represented by the following formula (5), the curved portion 20 satisfies the following formula (6) in the case where $C_2$ is larger than 0 ($C_2>0$), and the curved portion 20 satisfies the following formula (7) in the case where $C_2$ is equal to or smaller than 0 ($C_2≤0$). In the formulae (5) to (7), $A_2$ is zero in the case where the second adhesion region is not provided, and $A_1$ is zero in the case where the first adhesion region is not provided.

[Math. 10]

$$C_2 = \qquad (5)$$
$$1000/R' - 4.54t^2 + 11.37t - 7.58 + (0.586 - 0.44t^{0.5})(A_2/(A_1+A_2))$$

[Math. 11]

$$0.2 - \frac{\left(0.659Et^2 + 705.5E(t/R') - \dfrac{0.3869}{L}(2.44A_1 + A_2) - 72.05\right)^2}{\dfrac{245.6}{L}(2.44A_1 + A_2) + 9.41} > 0 \qquad (6)$$

[Math. 12]

$$(A_1 + A_2)/L > 2.4 \qquad (7)$$

Figure 5:
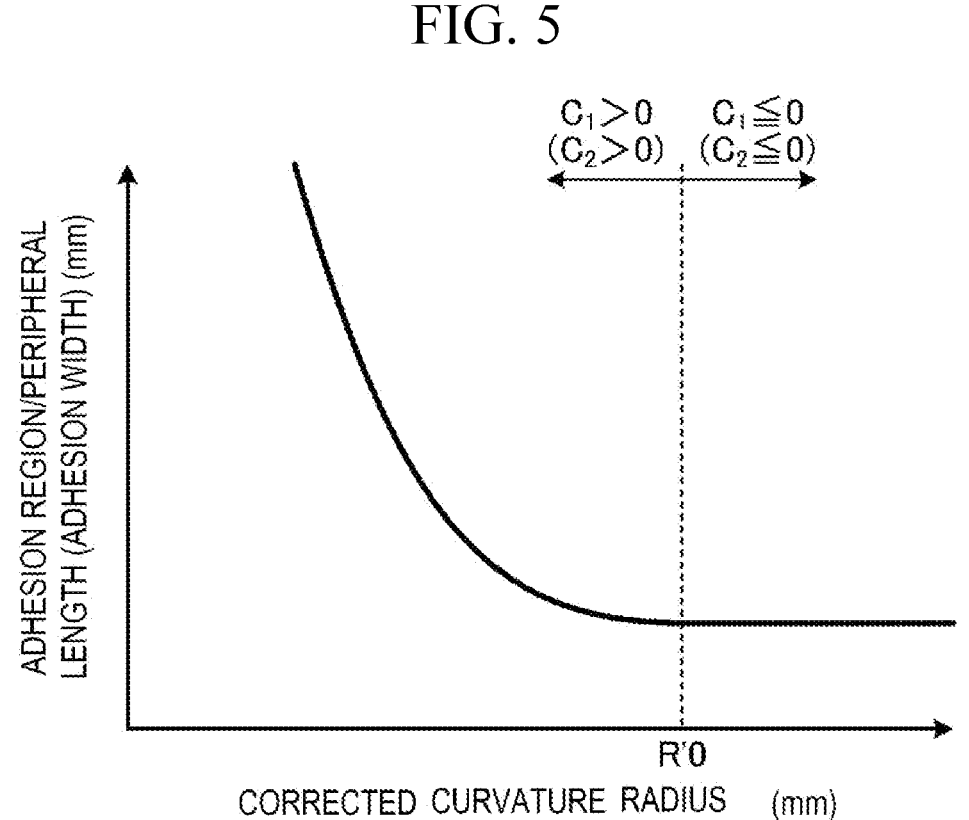
FIG. 5 is an example of a graph for explaining a relation among characteristics of the cover glass.

The formulae (5) to (7) will be described. FIG. 5 is an example of a graph explaining the relation among the characteristics of the cover glass. In FIG. 5, the horizontal axis represents the corrected curvature radius R', and the vertical axis represents a value obtained by dividing the area $(A_1+A_2)$ of the adhesion region AR by the peripheral length L, which is appropriately referred to as an adhesion width hereinafter.

The curve in FIG. 5 shows a value of the adhesion width serving as a boundary at which the frame is peeled off for each corrected curvature radius R' when the thickness t and the Young's modulus E are set to predetermined values. That is, it can be said that when the thickness t and the Young's modulus E are predetermined values, peeling of the frame can be suppressed by setting the value of the adhesion width higher than the curve in FIG. 5. As shown by the curve in FIG. 5, as the corrected curvature radius R' increases, the adhesion width at which peeling can be suppressed can be reduced, and when the corrected curvature radius R' is equal to or larger than a certain value R'0, the adhesion width at which peeling can be suppressed is constant.

As shown in the graph of FIG. 5, when $C_2$ is equal to or smaller than 0, the adhesion width at which peeling can be suppressed is constant. That is, $C_2$ in the formula (5) is an index value for determining whether the adhesion width at which peeling can be suppressed is constant, and the formula (7) can be said to be a formula that defines the adhesion width at which peeling can be suppressed in the case where the adhesion width at which peeling can be suppressed is constant. That is, in the case in the case where $C_2$ is equal to or smaller than 0, peeling can be suppressed by designing the curved portion 20 such that the formula (7) is satisfied. In other words, peeling can be suppressed by setting the corrected curvature radius R', the thickness t, the peripheral length L, the area $A_1$, and the area $A_2$ such that $C_2$ is equal to or smaller than 0, and setting the peripheral length L, the area $A_1$, and the area $A_2$ such that the formula (7) is satisfied.

On the other hand, as shown in the graph of FIG. 5, in the case where $C_2$ is larger than 0, the adhesion width at which peeling can be suppressed changes in accordance with the corrected curvature radius R' and the like. The formula (6) can be said to be a formula that defines parameters such as the adhesion width at which peeling can be suppressed in the case where the adhesion width at which peeling can be suppressed changes. That is, in the case where $C_2$ is larger than 0, peeling can be suppressed by designing the curved portion 20 such that the formula (6) is satisfied. In other words, peeling can be suppressed by setting the corrected curvature radius R', the thickness t, the peripheral length L, the area $A_1$, and the area $A_2$ such that $C_2$ is larger than 0, and setting the corrected curvature radius R', the thickness t, the Young's modulus E, the peripheral length L, the area $A_1$, and the area $A_2$ such that the formula (6) is satisfied. $Et^2$ in the formula (6) is a parameter indicating the rigidity of the cover glass 12, and E(t/R') is a parameter indicating the bending stress.

(Case being Convex Toward Main Surface 12B Side)

The case where the curved portion 20 is curved to be convex toward the main surface 12B side will be described. In the case where the curved portion 20 is curved to be convex toward the main surface 12B side, when $C_1$ is set to a value represented by the following formula (2), the curved portion 20 satisfies the following formula (3) in the case where $C_1$ is larger than 0 ($C_1$>0), and the curved portion 20 satisfies the following formula (4) in the case where $C_1$ is equal to or smaller than 0 ($C_1 \leq 0$). In the formulae (2) to (4), $A_2$ is zero in the case where the second adhesion region is not provided, and $A_1$ is zero in the case where the first adhesion region is not provided.

[Math. 13]

$$C_1 = 1000/R' - 7.76t^2 + 19.5t - 12.7 + \left(1 - 0.90t^{0.5}\right)\left(A_2/(A_1+A_2)\right) \quad (2)$$

[Math. 14]

$$0.2 - \frac{\left(0.45Et^2 + 280E(t/R') - 45.36\right)^2}{\frac{245.6}{L}(2.44A_1 + A_2) + 9.41} \quad (3)$$

[Math. 15]

$$(A_1 + A_2)/L > 2.4 \quad (4)$$

As shown in the graph of FIG. 5, in the case where $C_1$ is equal to or smaller than 0, the adhesion width at which peeling can be suppressed is constant. $C_1$ in the formula (2) is an index value for determining whether the adhesion width at which peeling can be suppressed is constant, and the formula (4) can be said to be a formula that defines the adhesion width at which peeling can be suppressed in the case where the adhesion width at which peeling can be suppressed is constant. That is, in the case where $C_1$ is equal to or smaller than 0, peeling can be suppressed by designing the curved portion 20 such that the formula (4) is satisfied. In other words, peeling can be suppressed by setting the corrected curvature radius R', the thickness t, the peripheral length L, the area $A_1$, and the area $A_2$ such that $C_1$ is equal to or smaller than 0, and setting the peripheral length L, the area $A_1$, and the area $A_2$ such that the formula (4) is satisfied.

On the other hand, as shown in the graph of FIG. 5, in the case where $C_1$ is larger than 0, the adhesion width at which peeling can be suppressed changes in accordance with the corrected curvature radius R' and the like. The formula (3) can be said to be a formula that defines parameters such as the adhesion width at which peeling can be suppressed in the case where the adhesion width at which peeling can be suppressed changes. That is, in the case where $C_1$ is larger than 0, peeling can be suppressed by designing the curved portion 20 such that the formula (3) is satisfied. In other words, peeling can be suppressed by setting the corrected curvature radius R', the thickness t, the peripheral length L, the area $A_1$, and the area $A_2$ such that $C_1$ is larger than 0, and setting the corrected curvature radius R', the thickness t, the Young's modulus E, the peripheral length L, the area $A_1$, and the area $A_2$ such that the formula (3) is satisfied.

In the case where $C_1$ is larger than 0 ($C_1$>0), the curved portion 20 preferably further satisfies the following formula (6). Also in the formula (6), $A_2$ is zero in the case where the second adhesion region is not provided, and $A_1$ is zero in the case where the first adhesion region is not provided.

In the case where the curved portion 20 satisfies the formula (6), the cover glass 12 is more firmly adhered to the frame 14, and therefore, peeling is more reliably suppressed even in the case of being affected by a high temperature, a heat cycle, mechanical vibration and impact, ultraviolet rays, or the like for a long period of time.

Figure 13:
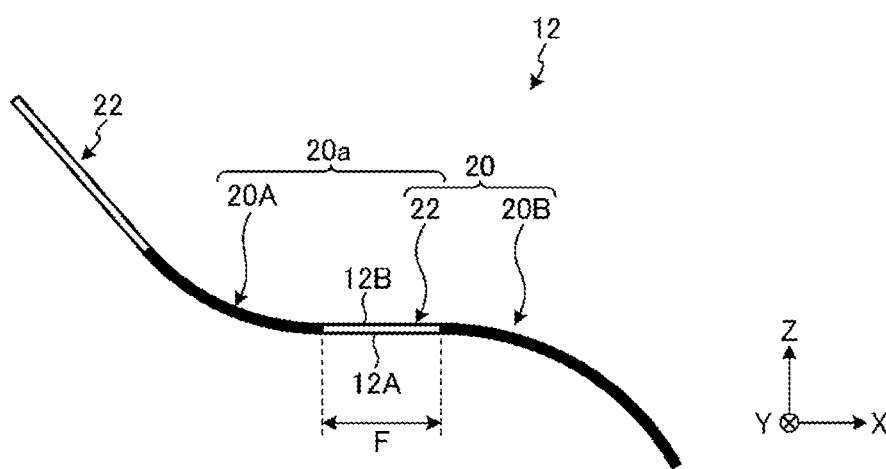
FIG. 13 is a schematic diagram of a cover glass according to another example of the present embodiment.

In addition, when the curved portion 20 satisfies the formula (6), in the case where a curved portion convex toward the main surface 12A side is further provided in addition to a curved portion convex toward the main surface 12B side as in FIG. 13, the peeling can be suppressed even when the adhesion width with the frame is the same in both the curved portions, and therefore, there is an advantage that the design is excellent.

[Math. 16]

$$0.2 - \frac{\left(0.659Et^2 + 705.5E(t/R') - \frac{0.3869}{L}(2.44A_1 + A_2) - 72.05\right)^2}{\frac{245.6}{L}(2.44A_1 + A_2) + 9.41} > 0 \quad (6)$$

As described above, the glass article 10 according to the present embodiment includes the cover glass 12 including the main surface 12A (first main surface) and the main surface 12B (second main surface), and the frame 14 adhered to the main surface 12B side of the cover glass 12 via the adhesive layer 16. The cover glass 12 is provided with the curved portion 20 that is convex toward the main surface 12A, and the adhesive layer 16 includes at least one of the first adhesive layer having an elastic modulus of 5

MPa or more in the indentation elastic modulus test and the second adhesive layer having an elastic modulus of less than 5 MPa in the indentation elastic modulus test. When R' is represented by the formula (1) and $C_2$ is represented by the formula (5), the curved portion 20 satisfies the formula (6) in the case where $C_2 > 0$ and satisfies the formula (7) in the case where $C_2 \leq 0$. In the glass article 10 according to the present embodiment, since the curved portion 20 satisfies the formula (6) or the formula (7), peeling from the frame 14 can be suppressed.

As described above, the glass article 10 according to the present embodiment includes the cover glass 12 including the main surface 12A (first main surface) and the main surface 12B (second main surface), and the frame 14 adhered to the main surface 12B side of the cover glass 12 via the adhesive layer 16. The cover glass 12 is provided with the curved portion 20 that is convex toward the main surface 12B, and the adhesive layer 16 includes at least one of the first adhesive layer having an elastic modulus of 5 MPa or more in the indentation elastic modulus test and the second adhesive layer having an elastic modulus of less than 5 MPa in the indentation elastic modulus test. When R' is represented by the formula (1) and $C_1$ is represented by the formula (2), the curved portion 20 satisfies the formula (3) in the case where $C_1 > 0$ and satisfies the formula (4) in the case where $C_1 \leq 0$. In the glass article 10 according to the present embodiment, since the curved portion 20 satisfies the formula (3) or the formula (4), peeling from the frame 14 can be suppressed. Further, the curved portion 20 preferably satisfies the formula (6) in the case where $C_1 > 0$.

$(A_1 + A_2)/L$ is preferably 80 mm or less. In the case where $(A_1 + A_2)/L$ falls within this range, it is possible to suppress narrowing of the area AR0, improve designability, and suppress a screen on which an image is displayed from being reduced in size. In addition, in the case where $(A_1 + A_2)/L$ falls within this range, it is possible to reduce the adhesion area, facilitate the bonding, and improve the positional accuracy. In addition, $(A_1 + A_2)/L$ is more preferably 60 mm or less. In the case where $(A_1 + A_2)/L$ falls within this range, adhesion can be performed with few adhesion defects and high reliability, gas release can be promoted, and the adhesive can be appropriately spread over the entire adhesion region.

The adhesive layer 16 may include both the first adhesive layer and the second adhesive layer, and the first adhesive layer and the second adhesive layer may be formed of different adhesives. By including both the first adhesive layer and the second adhesive layer, the cover glass 12 and the frame 14 can be appropriately adhered. For example, the cover glass 12 and the frame 14 can be adhered to each other with high positional accuracy and a sufficient adhesive force by providing adhesive layers having different characteristics, such as providing a second adhesive layer having a low adhesive force but exhibiting the adhesive force immediately after bonding, such as a double-sided tape, and a first adhesive layer having a high final adhesive strength but requiring time to exhibit the strength, such as a moisture-curable adhesive.

Figure 6:
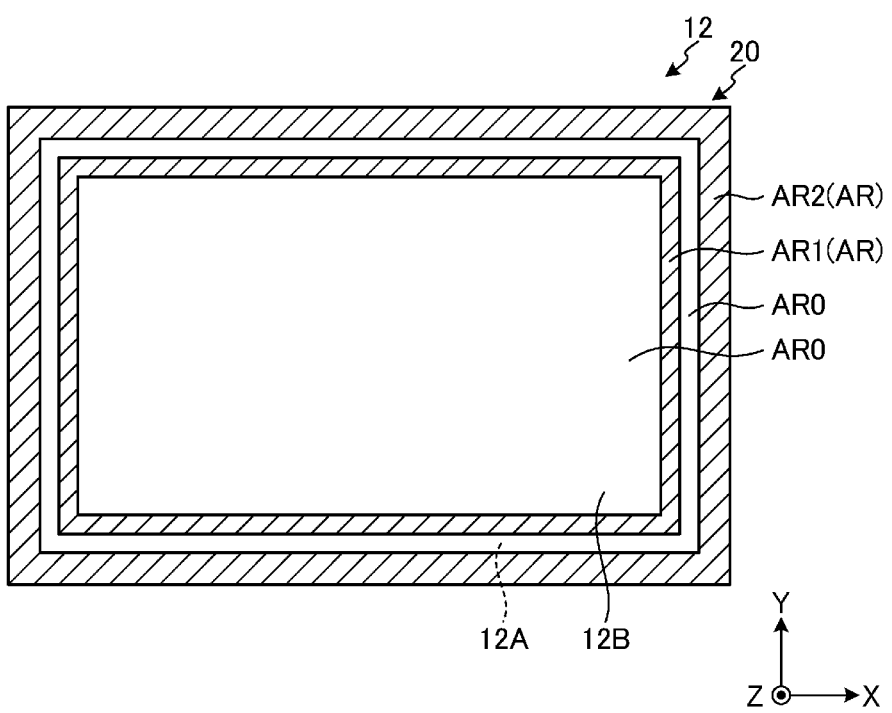
FIG. 6 is a diagram illustrating an example in which both a first adhesive layer and a second adhesive layer are provided.

FIG. 6 is a diagram illustrating an example in which both the first adhesive layer and the second adhesive layer are provided. In the case where both the first adhesive layer and the second adhesive layer are provided, it is preferable to provide the second adhesive layer AR2 on a radially outer side of the first adhesive layer AR1. By providing the second adhesive region having a low adhesive force on the outer side, for example, the second adhesion region (for example, a double-sided tape) functions as a bank of the adhesive of the first adhesion region, and it is possible to suppress the adhesive of the first adhesion region before curing from protruding to the outer side.

In the example of FIG. 6, the second adhesive layer AR2 is provided on the radially outer side of the first adhesive layer AR1 in a state where an outer peripheral edge of the first adhesive layer AR1 is separated from an inner peripheral edge of the second adhesive layer AR2. However, FIG. 6 is merely an example, and in the case where both the first adhesive layer and the second adhesive layer are provided, a position of the first adhesive layer and a position of the second adhesive layer may be freely set.

The thickness t of the cover glass 12 is preferably 0.3 mm or more and less than 3.0 mm. By setting the thickness t within this range, peeling from the frame 14 can be suitably suppressed.

The curvature radius R of the curved portion 20 is preferably 50 mm or more and 10,000 mm or less. By setting the curvature radius R within this range, peeling from the frame 14 can be suitably suppressed while improving designability.

The Young's modulus E of the cover glass 12 is preferably 60 GPa or more and 90 GPa or less. By setting the Young's modulus E within this range, peeling from the frame 14 can be suitably suppressed.

The on-vehicle display device 2 according to the present embodiment includes the display 3 and the glass article 10 provided on a surface (front surface) of the display 3. The on-vehicle display device 2 can suppress peeling of the frame 14 from the cover glass 12.

Other Examples

Hereinafter, other examples of the shape of the cover glass 12 will be described.

(Example of Spline Shape)

Figure 7:
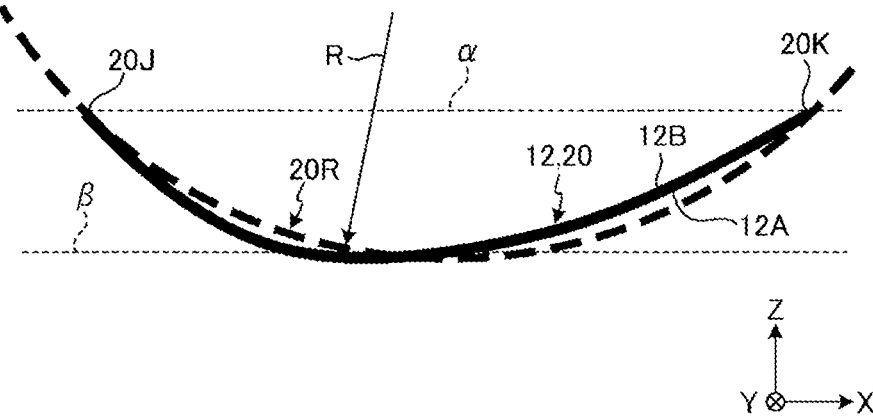
FIG. 7 is a schematic diagram of a cover glass according to another example of the present embodiment.

FIG. 7 is a schematic diagram of a cover glass according to another example of the present embodiment. In the above-described embodiment, the curved portion 20 is described as a portion bent with the same curvature radius R, but may be bent in the X direction in a spline curve shape of which the curvature radius is not constant. In this case, the entire portion bent in the X direction in the spline curve shape is treated as the curved portion 20.

In the description of the above-described embodiment, a region in which the change in the curvature radius R measured at each position from an end point on one side to an end point on the other side in the X direction of a region bent with the Y direction as a bending axis on the main surface 12B is 5% or less is treated as one curved portion 20 having the same curvature radius.

On the other hand, in the present example, a region in which the change in the curvature radius R at each position in a section having a length of 50 mm or less from an end point on one side toward an end point on the other side in the X direction of a region bent with the Y direction as a bending axis on the main surface 12B is larger than 5% is treated as one curved portion 20 having a spline shape. Further, as illustrated in FIG. 7, the curved portion 20 having a spline shape is approximated to a shape curved at a constant curvature radius, and a curvature radius approximated to the shape curved at the constant curvature radius is treated as the curvature radius R of the curved portion 20.

Specifically, one end point in the X direction of the main surface 12B of the curved portion 20 having a spline shape is defined as an end point 20J, the other end point is defined as an end point 20K, and a plane connecting the end point 20J and the end point 20K and extending along the X direction and the Y direction (that is, an XY plane passing through the end points 20J and 20K) is defined as a plane α. Further, when a plane obtained by translating the plane α in the Z direction so as to come into contact with the main surface 12B is defined as a plane β, a curvature radius of an arc 20R passing through the end point 20J and the end point 20K and coming into contact with the plane β is defined as the curvature radius R of the curved portion 20.

(Example Provided with Flat Portion)

Figure 8:
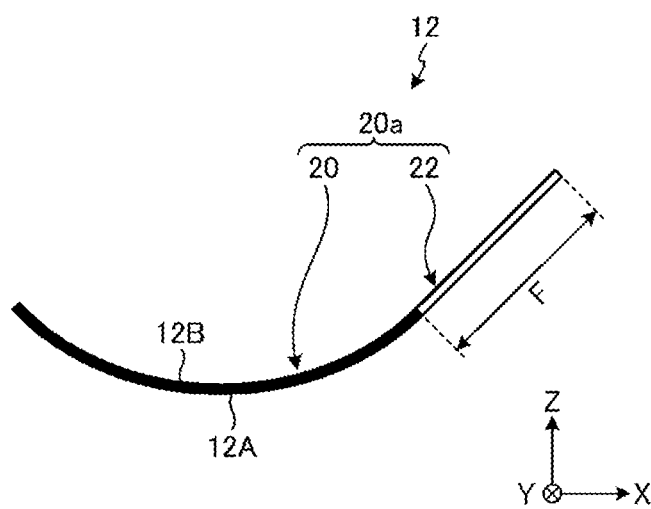
FIG. 8 is a schematic diagram of a cover glass according to another example of the present embodiment.
Figure 9:
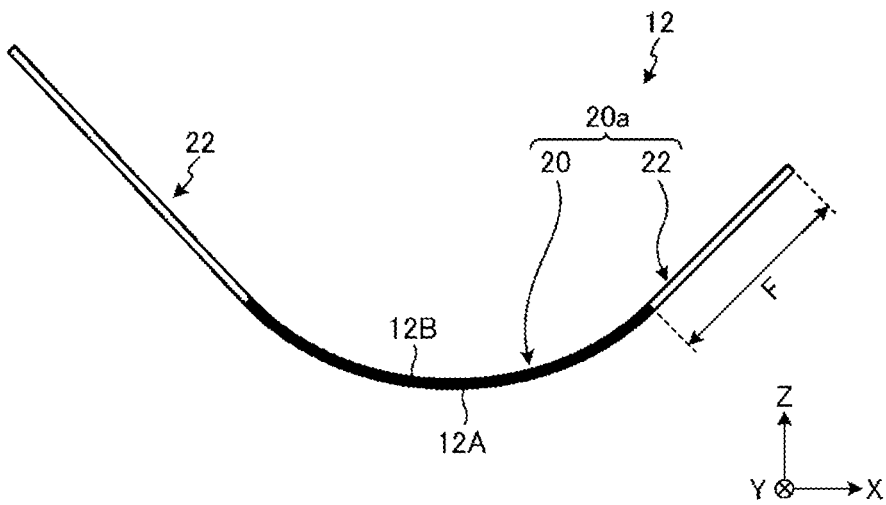
FIG. 9 is a schematic diagram of a cover glass according to another example of the present embodiment.

FIG. 8 and FIG. 9 are schematic diagrams of a cover glass according to another example of the present embodiment. A flat portion 22 may be connected to the curved portion 20 in the X direction. The flat portion 22 is connected to the curved portion 20 such that the main surface 12B is continuous (not discontinuous) with the curved portion 20. FIG. 8 illustrates an example in the case where the flat portion 22 is connected to one direction side (one side) of the curved portion 20 in the X direction. The flat portion 22 is a portion having a flat shape which is connected to an end portion of the curved portion 20 in the X direction, in the entire cover glass 12. The expression that the flat portion 22 has a flat shape is not limited to the case where the curvature radius is infinite, and may include the case where the curvature radius is larger than 10,000 mm.

In the case where the flat portion 22 is connected to the curved portion 20, the curved portion 20 and the flat portion 22 are treated as one curved portion 20a in the application of the formulae (1) to (7). For example, in the case where the flat portion 22 is provided on one side of the curved portion 20 in the X direction and the flat portion 22 is not provided on the other side in the X direction as illustrated in FIG. 8, the length of the curved portion 20a in the X direction, which is the bending direction (sum of the length of the curved portion 20 and the length F of the flat portion 22 in the X direction), is treated as the peripheral length L.

In addition, the area of a region overlapping the first adhesive layer on the main surface 12B of the curved portion 20a (sum of the area of the region overlapping the first adhesive layer on the main surface 12B of the curved portion 20 and the area of a region overlapping the first adhesive layer on the main surface 12B of the flat portion 22) is treated as the area $A_1$. In addition, the area of a region overlapping the second adhesive layer on the main surface 12B of the curved portion 20a (sum of the area of the region overlapping the second adhesive layer on the main surface 12B of the curved portion 20 and the area of a region overlapping the second adhesive layer on the main surface 12B of the flat portion 22) is treated as the area $A_2$.

However, in the case where the flat portion 22 is provided on one side of the curved portion 20 in the X direction and the flat portion 22 is not provided on the other side in the X direction, the length F in the formula (1) is treated as zero as in the case where the flat portion 22 is not provided. In other words, in the case where the curved portion 20 is provided only on one side, the corrected curvature radius R' has the same value as the curvature radius R.

As illustrated in FIG. 9, the flat portion 22 may be provided to be connected to both sides in the X direction (one direction side and the other direction side in the X direction) of the curved portion 20.

As illustrated in FIG. 9, in the case where the lengths along the main surface 12B of the flat portion 22 on one side of the curved portion 20 in the X direction and the flat portion 22 on the other side are different, the curved portion 20 and the flat portion 22 having a shorter length along the main surface 12B are treated as one curved portion 20a. That is, the length of the shorter flat portion 22 along the main surface 12B is treated as the length F in the formula (1), and the length of the curved portion 20a in the X direction (sum of the length of the curved portion 20 and the length F of the shorter flat portion 22) is treated as the peripheral length L.

In addition, the area of a region overlapping the first adhesive layer on the main surface 12B of the curved portion 20a (sum of the area of the region overlapping the first adhesive layer on the main surface 12B of the curved portion 20 and the area of a region overlapping the first adhesive layer on the main surface 12B of the shorter flat portion 22) is treated as the area $A_1$.

In addition, the area of a region overlapping the second adhesive layer on the main surface 12B of the curved portion 20a (sum of the area of the region overlapping the second adhesive layer on the main surface 12B of the curved portion 20 and the area of a region overlapping the second adhesive layer on the main surface 12B of the shorter flat portion 22) is treated as the area $A_2$. In the case where the lengths along the main surface 12B of the flat portion 22 on one side of the curved portion 20 in the X direction and the flat portion 22 on the other side are the same, the curved portion 20 and one of the flat portions 22 are treated as one curved portion 20a.

(Example of Case where there are Plurality of Curved Portions)

Figure 10:
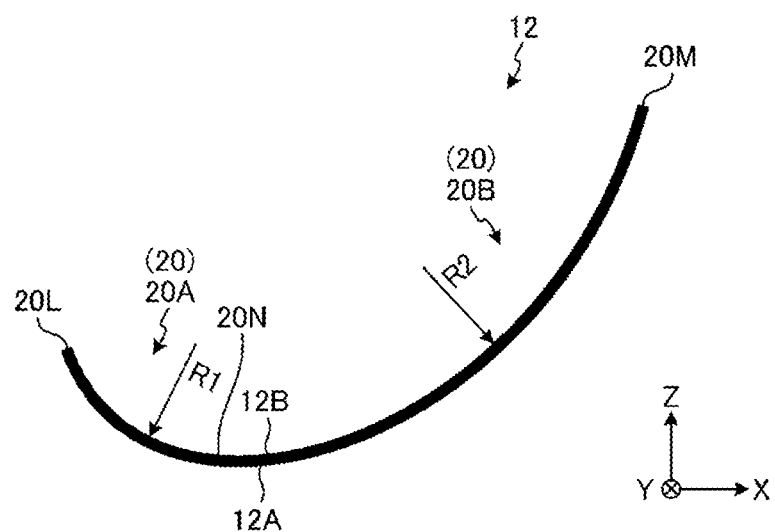
FIG. 10 is a schematic diagram of a cover glass according to another example of the present embodiment.
Figure 11:
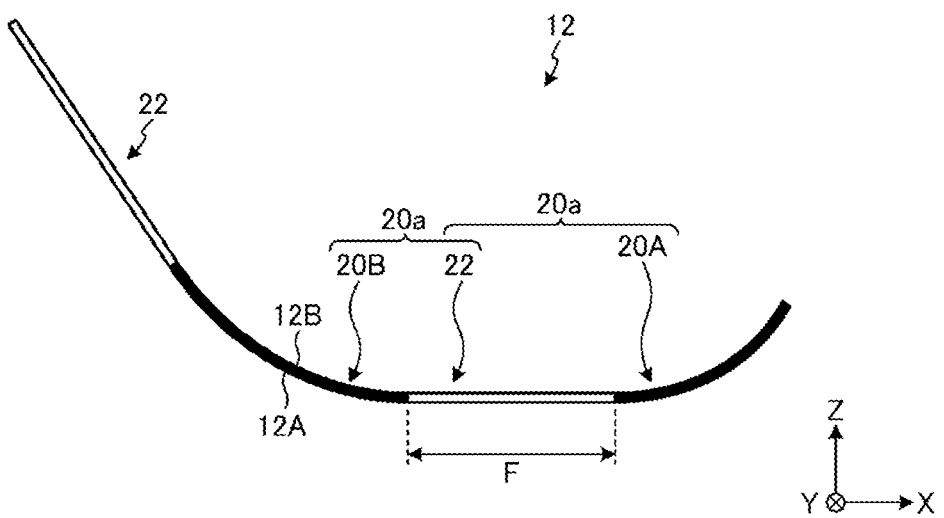
FIG. 11 is a schematic diagram of a cover glass according to another example of the present embodiment.

FIG. 10 and FIG. 11 are schematic diagrams of a cover glass according to another example of the present embodiment. A plurality of curved portions 20 may be provided, in other words, a plurality of curved portions 20 having different curvature radii R may be formed in the cover glass 12. In this case, the respective curved portions 20 are bent with the Y direction, which is the same direction, as the respective bending axes.

Whether there are a plurality of curved portions 20 can be determined as follows. That is, in a region in which the change in the curvature radius R at each position in a section longer than 50 mm from an end point on one side toward an end point on the other side in the X direction of a region bent with the Y direction as a bending axis on the main surface 12B is higher than 5%, it is determined that a plurality of curved portions 20 having different curvature radii R are formed. That is, in a region bent with the Y direction as a bending axis on the main surface 12B, in the case where the change in the curvature radius R is 5% or less in a section having a length of 50 mm or less from an end point on one side toward an end point on the other side in the X direction but the change in the curvature radius R exceeds 5% in a section longer than 50 mm from the end point on one side toward the end point on the other side, it is determined that a plurality of curved portions are formed instead of one curved portion having a spline shape.

In this case, as illustrated in the example of FIG. 10, in a region bent with the Y direction as a bending axis on the main surface 12B, a region in which the change in the curvature radius R at each position of a section from an end point 20L on one side toward an end point 20M on the other side in the X direction of the region is 5% or less is set as one curved portion 20A in which the curvature radius R is the same. The curved portion 20A is a region from the end point 20L on one side to a position 20N where the change in the curvature radius R is larger than 5%. Further, a region in which the change in the curvature radius R at each position of a section from the position 20N toward the end point 20M on the other side is 5% or less is set as another curved portion 20B.

In the example of FIG. 10, since the change in the curvature radius in the section from the position 20N to the end point 20M is 5% or less, the region from the position 20N to the end point 20M is treated as the curved portion 20B. However, for example, in the case where there is a position where the change in the curvature radius R is larger than 5% between the position 20N and the end point 20M, a region from the position 20N to the position where the change in the curvature radius R is larger than 5% becomes one curved portion 20B. In this case, there are three or more curved portions 20.

In the case where a plurality of curved portions 20 are formed in this manner, the formula (1) to the formula (7) are applied to each curved portion 20. That is, for the curved portions 20 convex toward the main surface 12A side, the formula (6) or the formula (7) is satisfied, and for the curved portions 20 convex toward the main surface 12B side, the formula (3) or the formula (4) is satisfied. FIG. 10 illustrates an example in which the curved portion 20A having a curvature radius R1 and the curved portion 20B having a curvature radius R2 are formed. In the example of FIG. 10, both of the curved portions 20A and 20B are convex toward the main surface 12A side, but without being limited thereto, both of the curved portions 20A and 20B may be convex toward the main surface 12B side. In addition, the number of the curved portions 20 is not limited to two, and may be three or more.

FIG. 11 illustrates an example in which the flat portion 22 is connected to the plurality of curved portions 20. In the case where the flat portion 22 is connected to the plurality of curved portions 20, one of the curved portions 20 and the flat portion 22 connected to this curved portion 20 are treated as one curved portion 20a in the application of the formula (1) to the formula (7).

In the example of FIG. 11, a longer flat portion 22 is connected to one side of a curved portion 20A in the X direction, a shorter flat portion 22 is connected to the other side of the curved portion 20A in the X direction, and a curved portion 20B is connected to a side of the shorter flat portion 22 opposite to the curved portion 20A. In this case, the curved portion 20A and the shorter flat portion 22 are treated as one curved portion 20a, and the curved portion 20B and the shorter flat portion 22 are treated as another curved portion 20a. A method of calculating the length F, the peripheral length L, the area $A_1$, and the area $A_2$ of the curved portion 20a is the same as that in the case where the flat portion 22 is connected to one curved portion 20, and thus the description thereof will be omitted. In the example of FIG. 11, the flat portion 22 is connected to only one side of the curved portion 20A, and therefore, the length F in the formula (1) for the curved portion 20A is treated as zero.

Figure 12:
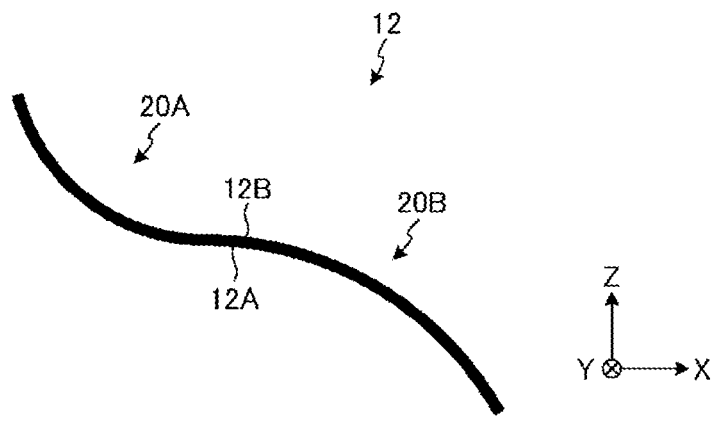
FIG. 12 is a schematic diagram of a cover glass according to another example of the present embodiment.

FIG. 12 and FIG. 13 are schematic diagrams of a cover glass according to another example of the present embodiment. In the above description, the plurality of curved portions 20 are convex in the same direction, but may be convex in different directions. For example, as illustrated in FIG. 12, the curved portion 20A may be convex toward the main surface 12A side, and the curved portion 20B may be convex toward the main surface 12B side.

In addition, in the example of FIG. 13, the longer flat portion 22 is connected to one side of the curved portion 20A in the X direction, the shorter flat portion 22 is connected to the other side of the curved portion 20A in the X direction, and the curved portion 20B is connected to a side of the shorter flat portion 22 opposite to the curved portion 20A. In this case, the curved portion 20A and the shorter flat portion 22 are treated as one curved portion 20a, and the curved portion 20B and the shorter flat portion 22 are treated as another curved portion 20. A method of calculating the length F, the peripheral length L, the area $A_1$, and the area $A_2$ of the curved portion 20a is the same as that in the case where the flat portion 22 is connected to one curved portion 20, and thus the description thereof will be omitted. In addition, the formula (1) to the formula (7) are applied to the respective curved portions. That is, since the curved portion 20A is convex toward the main surface 12A side, the formula (6) or the formula (7) is satisfied, and since the curved portion 20B is convex toward the main surface 12B side, the formula (3) or the formula (4) is satisfied.

FIG. 14 to FIG. 17 are schematic diagrams of a cover glass according to another example of the present embodiment. In the above description of the embodiment, a rectangular glass plate is bent in the X direction to form the cover glass 12, and therefore, the length of the cover glass 12 in the X direction is constant at each position, but the length of the cover glass 12 in the X direction may be different for each position depending on the shape. The peripheral length L in such a case will be described below.

Figure 14:
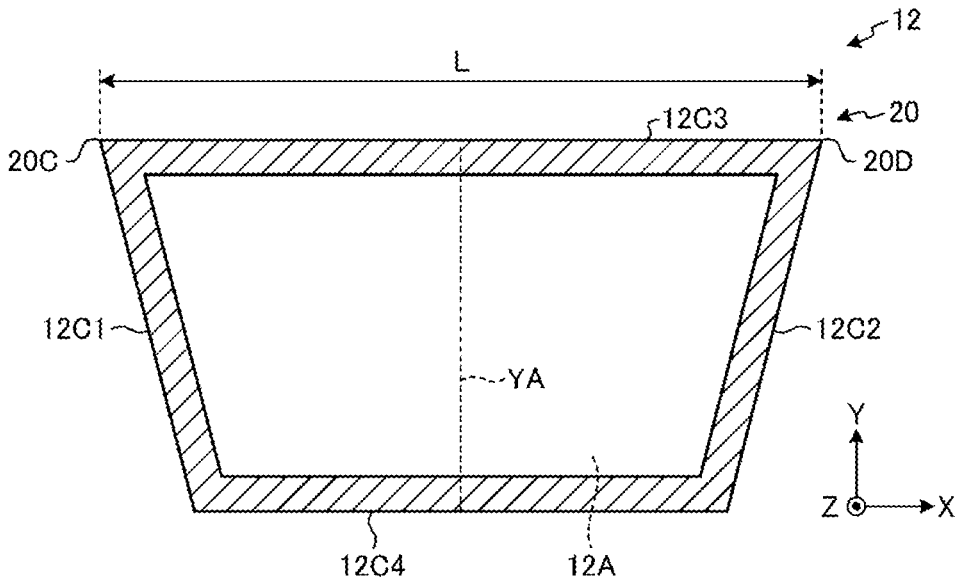
FIG. 14 is a schematic diagram of a cover glass according to another example of the present embodiment.

As described above, the peripheral length L indicates the length of a line extending in the X direction on the main surface 12B and connecting from a position on the most one side of the curved portion 20 in the X direction with respect to a bending axis YA along the direction Y to a position on the most other side of the curved portion 20 in the X direction with respect to the bending axis YA. Therefore, for example, as illustrated in FIG. 14, in the case where a trapezoidal glass plate is bent with the Y direction as a bending axis to form the cover glass 12, two end points of the side surface 12C3, which is a long side of the trapezoid, are a position 20C on the most one side and a position 20D on the most other side of the curved portion 20 in the X direction with respect to the bending axis YA, and the length of a line connecting the position 20C and the position 20D and extending in the X direction on the main surface 12B is the peripheral length L.

Figure 15:
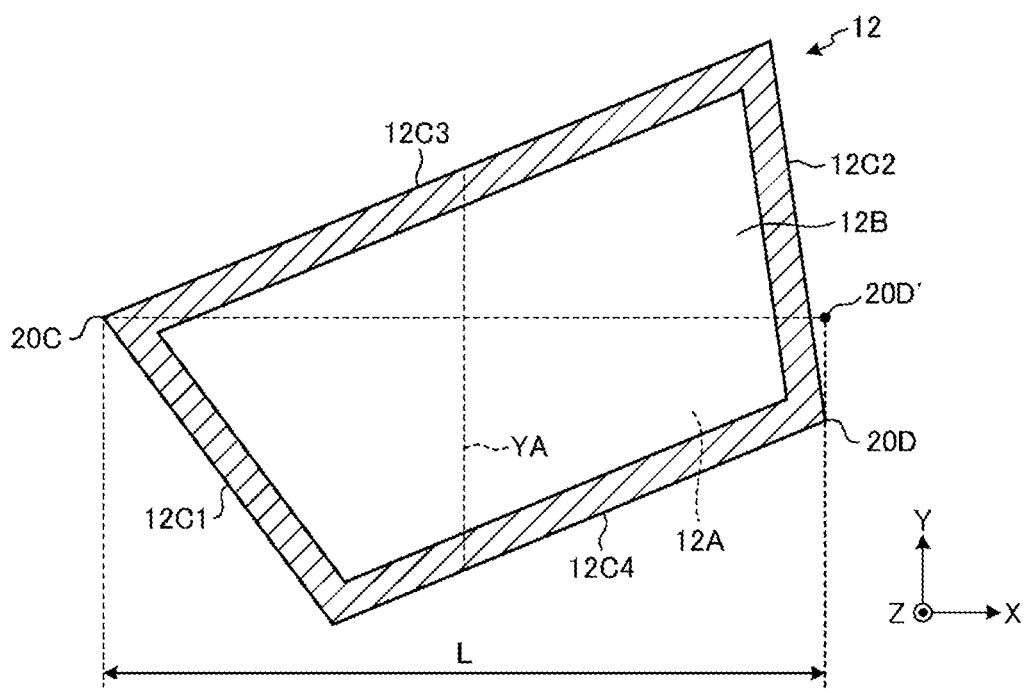
FIG. 15 is a schematic diagram of a cover glass according to another example of the present embodiment.

In addition, in the above description, the X direction orthogonal to the bending axis is along the side surfaces 12C3 and 12C4 which are sides in a lateral direction of the flat plate-shaped cover glass 12 before bending, but without being limited thereto, the X direction orthogonal to the bending axis may be shifted (may intersect) with respect to the side of the flat plate-like cover glass 12 before bending. FIG. 15 illustrates an example in which the X direction intersects with the side surfaces 12C3 and 12C4 of the flat plate-shaped cover glass 12 before bending. In the example of FIG. 15, one end point of the side surface 12C3 which is a long side of the trapezoid is the position 20C, and the other end point of the side surface 12C4 which is a short side of the trapezoid is the position 20D. In addition, in the example of FIG. 15, since positions of the position 20C and the position 20D in the Y direction are not aligned, the length of a line extending in the X direction on a surface along the main surface 12B and connecting the position 20C and a position 20D' obtained by shifting the position 20D in the Y direction is defined as the peripheral length L. That is, in the example of FIG. 15, the length of a curve connecting the position 20C and the position 20D' and having the curvature radius R is the peripheral length L. The position 20D' is a position obtained by shifting the position 20D in the Y direction so that a position of the position 20D' in the Y direction is aligned with a position of the position 20C in the Y direction. In this manner, in the case where the positions of the position 20C and the position 20D in the Y direction are not aligned, the length of a line traveling in the X direction on a surface along the main surface 12B from the position 20C to the position 20D' of which the positions in the Y direction are aligned is defined as the peripheral length L.

Figure 16:
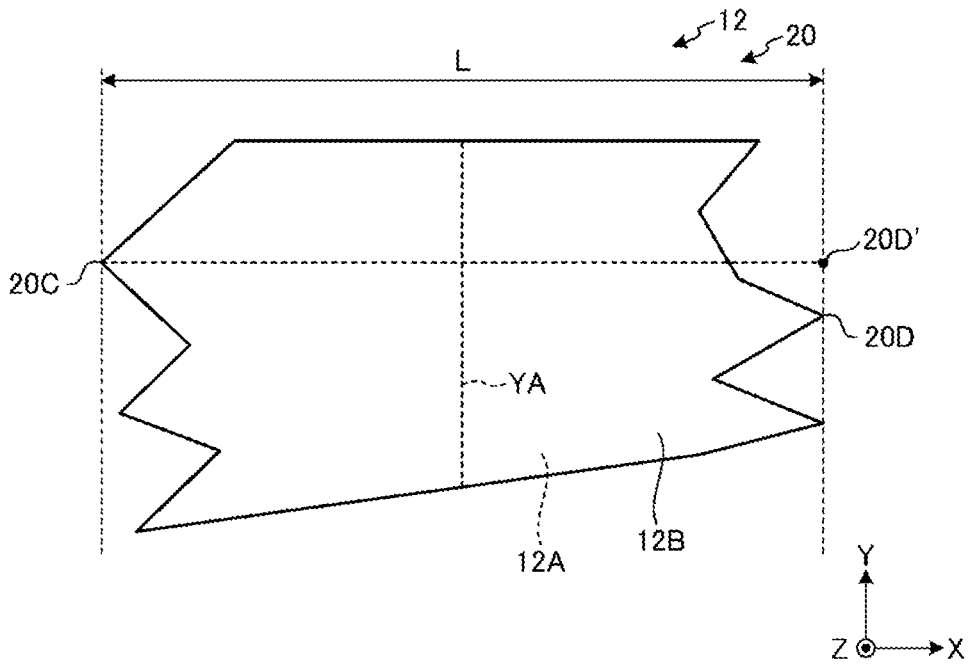
FIG. 16 is a schematic diagram of a cover glass according to another example of the present embodiment.

FIG. 16 illustrates an example in which a polygonal glass plate is curved with a line segment YA along the direction Y as a bending axis to form the cover glass 12. Also in the example of FIG. 16, the positions in the Y direction of the position 20C and the position 20D, which are points on the most one side and the other side of the curved portion 20 in the X direction with respect to the bending axis YA along the direction Y, are not aligned with each other, and therefore, the length of a line connecting the position 20D' and the position 20C and extending in the X direction on a surface along the main surface 12B is the peripheral length L.

Figure 17:
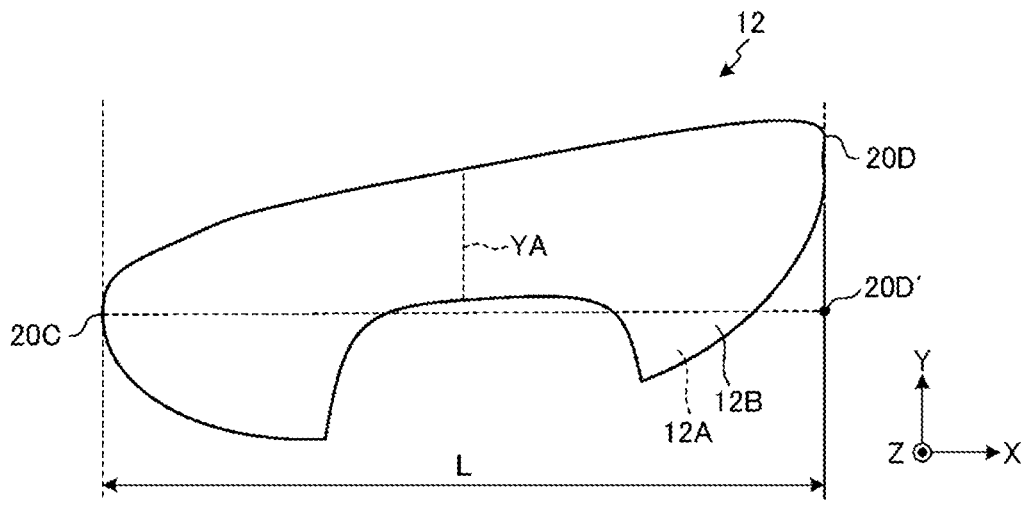
FIG. 17 is a schematic diagram of a cover glass according to another example of the present embodiment.

FIG. 17 illustrates an example in which a glass plate of which an outer periphery has a curved shape is curved with the line segment YA along the direction Y as a bending axis to form the cover glass 12. Also in the example of FIG. 17, the positions in the Y direction of the position 20C and the position 20D, which are points on the most one side and the other side of the curved portion 20 in the X direction with respect to the bending axis YA along the direction Y, are not aligned with each other, and therefore, the length of a line connecting the position 20D' and the position 20C and extending in the X direction on a surface along the main surface 12B is the peripheral length L.

Figure 18:
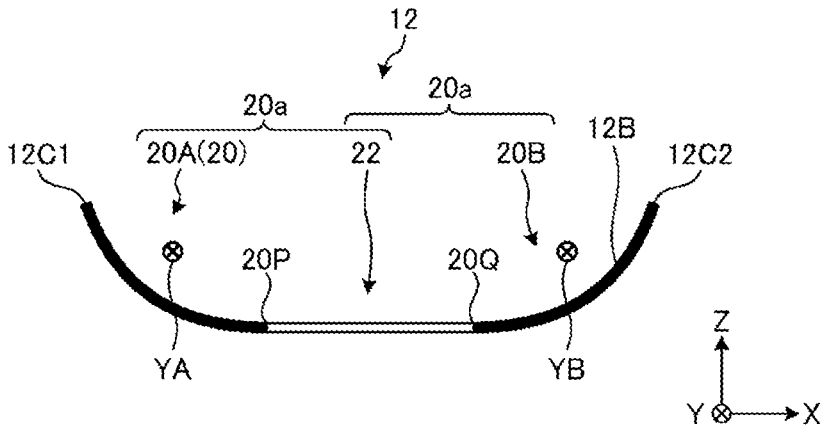
FIG. 18 is a schematic diagram of a cover glass according to another example of the present embodiment.
Figure 19:
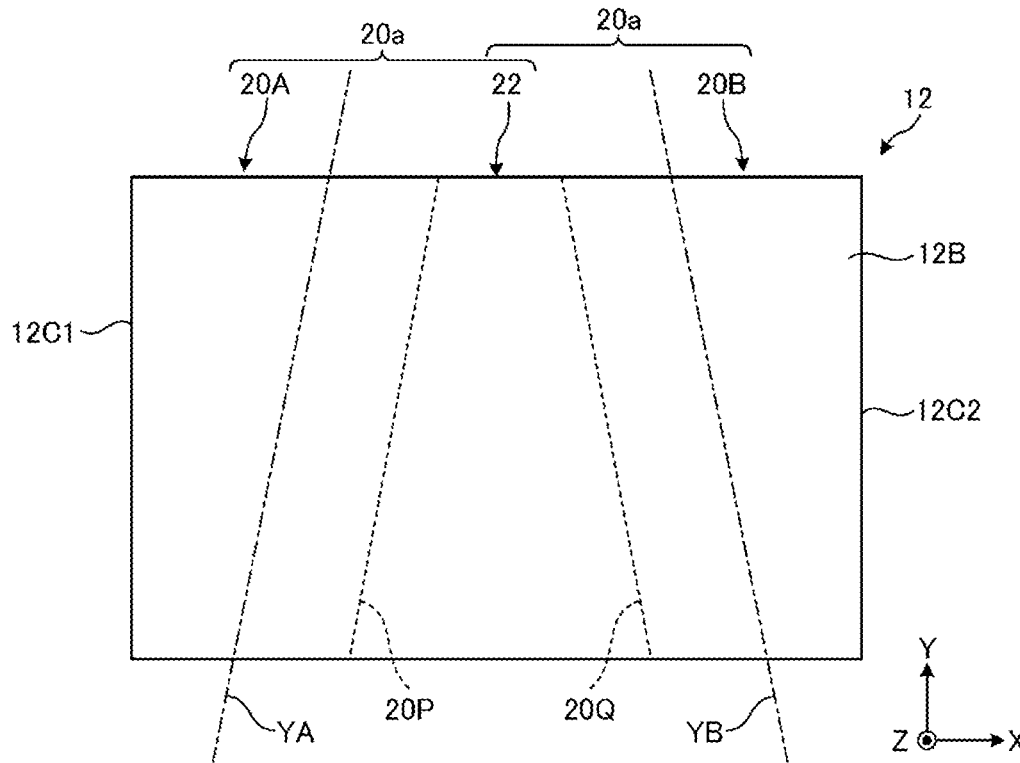
FIG. 19 is a schematic diagram of a cover glass according to another example of the present embodiment.
Figure 20:
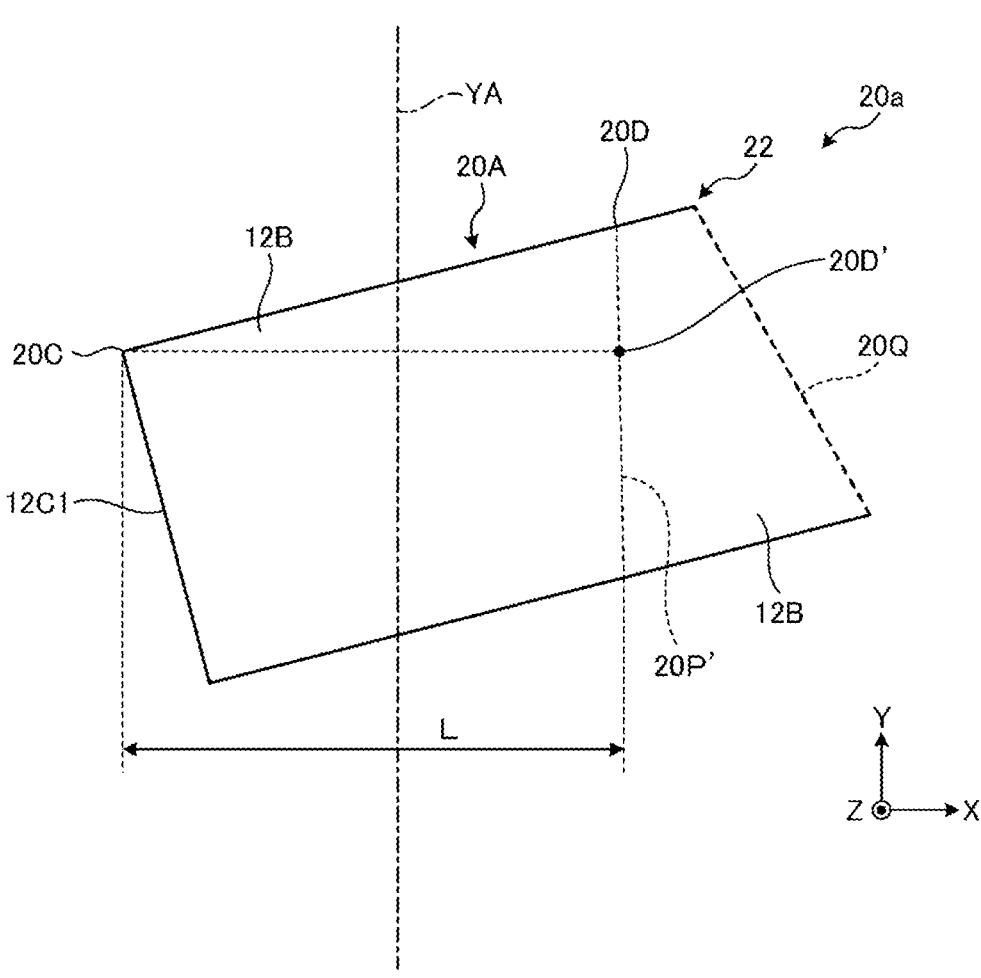
FIG. 20 is a schematic diagram of a cover glass according to another example of the present embodiment.

FIG. 18 to FIG. 20 are schematic diagrams of a cover glass according to another example of the present embodiment. In the above description, the plurality of curved portions 20 are bent in the same direction with the Y direction as the bending axes, but the directions of the bending axes of the plurality of curved portions 20 may be different. In this case, the bending axes of the respective curved portions 20 do not intersect with one another on the main surface 12A of the cover glass 12, but intersect with one another at a point where the bending axes of the respective curved portions 20 are extended outward from the main surface 12A. In the case where the directions of the bending axes of the curved portions 20 are different from one another, the bending axes do not intersect with one another on the main surface 12A, whereby planar development of the cover glass 12 becomes possible, and cold forming can be appropriately performed.

FIG. 18 and FIG. 19 illustrate examples of schematic diagrams of the cover glass 12 in which the directions of the bending axes of the plurality of curved portions 20 are different. In the example of FIG. 18, the curved portion 20A is connected to one side of the flat portion 22 in the X direction, and the curved portion 20B is connected to the other side of the flat portion 22 in the X direction.

The curved portion 20A is bent with the bending axis YA as a bending axis from the side surface 12C1, which is an end side on one side in the X direction, to an end side 20P on the other side. That is, the curved portion 20A is a region bent with the bending axis YA as a bending axis so that the change in the curvature radius at each position in the X direction from the side surface 12C1 to the end side 20P is 5% or less.

The curved portion 20B is bent with a bending axis YB as a bending axis from an end side 20Q on one side in the X direction to the side surface 12C2 which is an end side on the other side. That is, the curved portion 20B is a region bent with the bending axis YB as a bending axis so that the change in the curvature radius at each position in the X direction from the end side 20Q to the side surface 12C2 is 5% or less. The flat portion 22 is a flat region from the end side 20P to the end side 20Q in the X direction.

The bending axis YA of the curved portion 20A and the bending axis YB of the curved portion 20B extend in different directions, but do not intersect with each other on the main surface 12A of the cover glass 12, and intersect with each other at a point where the bending axes YA and YB extend outward from the main surface 12A. FIG. 18 is illustrated as a figure in which the Y direction is defined as the bending axis, that is, the bending axes YA and YB are in the same direction for convenience of description, but actually, the bending axes YA and YB of the curved portions 20A and 20B extend in different directions.

In the case where the flat portion 22 is connected to the plurality of curved portions 20 of which the directions of bending axes are different, one of the curved portions 20 and the flat portion 22 connected to the curved portion 20 are treated as one curved portion 20a in the application of the formula (1) to the formula (7).

In the example of FIG. 19, the flat portion 22 is connected to the other side of the curved portion 20A in the X direction, and the flat portion 22 is connected to one side of the curved portion 20B in the X direction. In this case, the curved portion 20A and the flat portion 22 are treated as one curved portion 20a, and the curved portion 20B and the flat portion 22 are treated as another curved portion 20a. A method of calculating the length F, the area $A_1$, and the area $A_2$ of the curved portion 20a is the same as that in the case where the flat portion 22 is connected to one curved portion 20, and thus the description thereof will be omitted. In the example of FIG. 19, since the flat portion 22 is connected to only one side of the curved portions 20A and 20B, the length F in the formula (1) for the curved portions 20A and 20B is treated as zero.

A method of calculating the peripheral length L of the plurality of curved portions 20 of which directions of bending axes are different will be described with reference to FIG. 20. FIG. 20 is a diagram in which the curved portion 20a including the curved portion 20A and the flat portion 22 is extracted for convenience of description. In the example of FIG. 20, an end point of the side surface 12C1 on the most one side in the X direction is the position 20C of the curved portion 20a, and an end point of an end side 20P' on the most other side in the X direction is the position 20D of the curved portion 20a.

In addition, in the example of FIG. 20, since positions of the position 20C and the position 20D in the Y direction are not aligned, the length of a line connecting the position 20C and the position 20D' obtained by shifting the position 20D in the Y direction and extending in the X direction on a surface along the main surface 12B is defined as the peripheral length L of the curved portion 20a. That is, in the example of FIG. 20, the length of a curve connecting the position 20C and the position 20D' and having the curvature radius R is the peripheral length L. The peripheral length L is obtained in the same manner for the curved portion 20a including the curved portion 20B and the flat portion 22, and description thereof is omitted.

EXAMPLES

Next, Examples will be described. The embodiments may be modified as long as the effect of the invention is exerted. In each Example, either an actual test or a simulation test was performed. In Tables 1 to 10 to be described later, an actual test was performed in the case where "Yes" is described in a column of the actual test, and simulation was performed in the case of a blank column. In addition, among plots in FIG. 21 to FIG. 42 to be described later, those surrounded by circles are results of the actual test.

(Simulation)

For the simulation, impact/collision analysis software using a finite element method (PAM-CRASH, manufactured by Japan ESI Corporation) was used. In the simulation, COS3D (Material Type 305) capable of setting an adhesion fracture energy was used as an adhesive layer, and an adhesion fracture energy EFRSn was set to match the actual test. In the simulation, first, an elastic energy for bending (accumulated as stress on glass) is applied to a glass plate.

Next, a frame is bonded to the bent glass plate via the adhesive layer. Since the adhesive layer and the frame are deformed by the elastic energy of the glass and an element of the adhesive layer of which the adhesive energy exceeds the adhesion fracture energy disappears, a phenomenon in which the glass is peeled off from the frame can be expressed by simulation. It has been confirmed that there is no divergence between a simulation result and an actual test result. In addition, an adhesion fracture energy of a weak adhesive layer in the simulation was set based on an actual test result of the weak adhesive layer.

(Simulation Conditions)

A model corresponding to the actual test was created under the following physical properties and the conditions described in each Example, and whether peeling occurred was determined. The case where peeling did not occur was evaluated as A (bonding possible), and the case where peeling occurred in 2 msec was evaluated as B (bonding impossible).

Young's modulus of glass plate: 70 GPa (G=29.17, K=38.89), 74 GPa (G=30.08, K=45.68), 77 GPa (G=31.56, K=45.83)

Young's modulus of frame: 206 GPa (G=79.231, K=171.667)

Here, G is a shear modulus and K is a bulk modulus.

(Actual Test)

In the actual test, a glass plate made of aluminosilicate (product name: Dragontrail) manufactured by AGC Inc. was used as the glass plate. This glass plate was bent in a lateral direction (X direction) to be convex toward a side not adhered to a frame (first main surface side) or convex toward a side adhered to the frame (second main surface side), thereby forming a cover glass curved in the X direction, and the cover glass was adhered to a frame-shaped frame via an adhesive layer so that an end portion on a peripheral edge side did not protrude from the frame. As the frame, a frame made of a rolled steel material SS400 was used, and as the adhesive layer, 1539 manufactured by ThreeBond Co., Ltd., which is a strong adhesive layer (first adhesive layer), or VHX-1701-04 manufactured by 3M Company, which is a weak adhesive layer (second adhesive layer), was used.

In the actual test, whether the cover glass was peeled off from the frame was evaluated in an appearance inspection after 200 hours. The case where peeling did not occur after 200 hours was evaluated as A (bonding possible), and the case where peeling occurred after 200 hours was evaluated as B (bonding impossible).

TABLE 1

| | CG thickness t (mm) | CG Young's modulus (GPa) | Curvature radius (mm) Curvature radius R | Curvature radius (mm) Corrected curvature radius R' | Adhesion area $A_1$ (mm$^2$) Curved portion | Adhesion area $A_1$ (mm$^2$) Shorter flat portion | Adhesion area $A_2$ (mm$^2$) Curved portion | Adhesion area $A_2$ (mm$^2$) Shorter flat portion |
|---|---|---|---|---|---|---|---|---|
| Ex. 1 | 1.1 | 74 | 400 | 400 | 4,420 | 0 | 0 | 0 |
| | 1.1 | 74 | 400 | 400 | 3,481 | 0 | 0 | 0 |
| | 1.1 | 74 | 400 | 400 | 2,370 | 0 | 0 | 0 |
| | 1.1 | 74 | 600 | 600 | 1,538 | 0 | 0 | 0 |
| | 1.1 | 74 | 600 | 600 | 1,538 | 0 | 0 | 0 |
| | 1.1 | 74 | 800 | 800 | 939 | 0 | 0 | 0 |
| | 1.1 | 74 | 800 | 800 | 316 | 0 | 0 | 0 |
| | 1.1 | 74 | 600 | 600 | 1,538 | 0 | 0 | 0 |
| | 1.1 | 74 | 600 | 600 | 1,538 | 0 | 0 | 0 |
| Ex. 2 | 1.1 | 74 | 400 | 400 | 6,355 | 0 | 0 | 0 |
| | 1.1 | 74 | 600 | 600 | 4,481 | 0 | 0 | 0 |
| | 1.1 | 74 | 600 | 600 | 3,067 | 0 | 0 | 0 |
| | 1.1 | 74 | 1,200 | 1,200 | 1,620 | 0 | 0 | 0 |
| | 1.1 | 74 | 1,000 | 1,000 | 1,620 | 0 | 0 | 0 |
| | 1.1 | 74 | 800 | 800 | 1,550 | 0 | 0 | 0 |

| | Peripheral length L (mm) Curved portion | Peripheral length L (mm) Longer flat portion | F of shorter flat portion | Adhesion area/peripheral length (mm) | Whether bonding is possible | Satisfy formula (6) | Actual test |
|---|---|---|---|---|---|---|---|
| Ex. 1 | 250 | 0 | 0 | 18 | B | | |
| | 250 | 0 | 0 | 14 | B | | |
| | 250 | 0 | 0 | 9 | B | | |
| | 250 | 0 | 0 | 6 | B | | |
| | 250 | 0 | 0 | 6 | B | | |
| | 250 | 0 | 0 | 4 | B | | |
| | 250 | 0 | 0 | 1 | B | | |
| | 250 | 100 | 0 | 6 | B | | |
| | 250 | 150 | 0 | 6 | B | | |
| Ex. 2 | 250 | 0 | 0 | 25 | A | | |
| | 250 | 0 | 0 | 18 | A | | |
| | 250 | 0 | 0 | 12 | A | | |
| | 250 | 0 | 0 | 6 | A | | Yes |
| | 250 | 0 | 0 | 6 | A | | Yes |
| | 250 | 0 | 0 | 6 | A | | |

Examples 1 and 2

Figure 21:
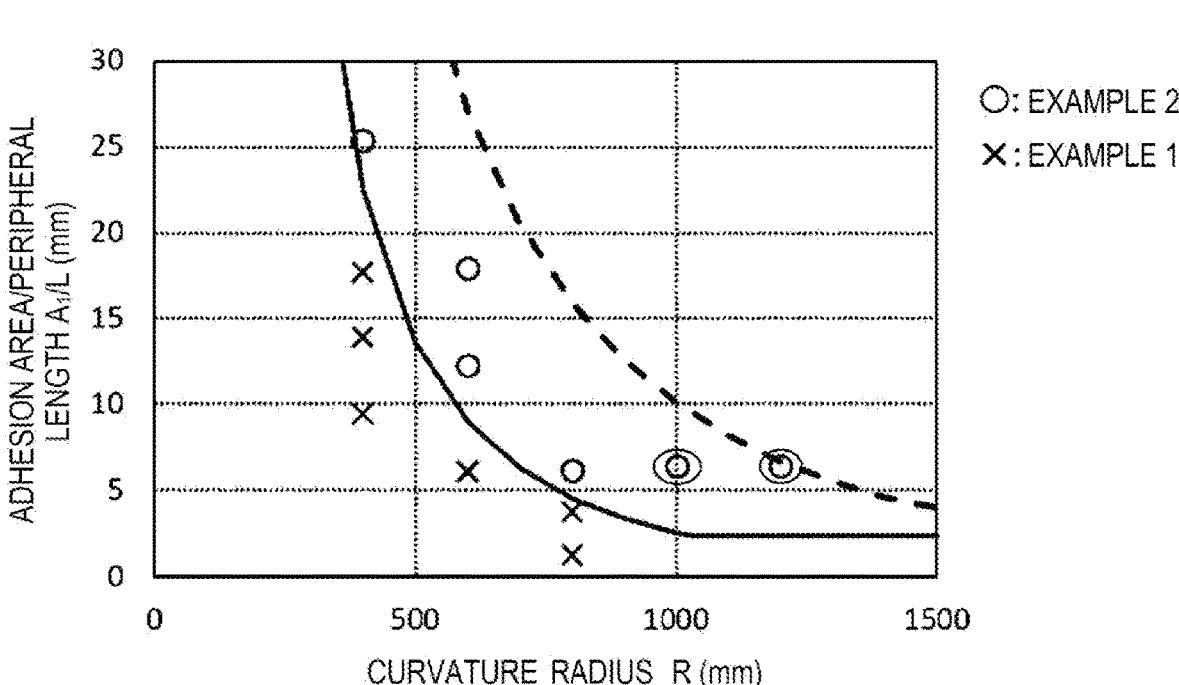
FIG. 21 is a graph showing evaluation results of cover glasses according to Examples 1 and 2.

Table 1 is a table showing properties of cover glasses according to Examples 1 and 2. FIG. 21 is a graph showing evaluation results of the cover glasses according to Examples 1 and 2.

In each of Examples 1 and 2, a rectangular glass plate having a thickness t of 1.1 mm, a longitudinal (Y direction) length of 150 mm, and a lateral (X direction) length of 250 mm was prepared. The Young's modulus of the glass plate was 74 GPa, and a glass plate made of aluminosilicate (product name: Dangontrail) manufactured by AGC Inc. was assumed.

In Examples 1 and 2, the cover glass is entirely curved by being bent in the lateral direction (X direction) so as to be convex toward a side adhered to the frame (second main surface side), and therefore, a flat portion is not formed, and the entire cover glass serves as one curved portion. As an adhesive layer, an adhesive (adhesive 1539, manufactured by ThreeBond Co., Ltd.) corresponding to the first adhesive layer was assumed. As the frame, a frame made of a rolled steel material SS400 was assumed. In Examples 1 and 2, a plurality of samples having different curvature radii R, areas $A_1$, and peripheral lengths L as shown in Table 1 were prepared.

FIG. 21 is a graph plotting a relation between the curvature radius R and a value (adhesion width) obtained by dividing the area of an adhesion region (here, area $A_1$ of a first adhesion region) by the peripheral length L of each of samples according to Examples 1 and 2. The solid line in FIG. 21 is a line serving as a boundary indicating whether the formula (3) or the formula (4) is satisfied, and it can be said that a sample of which the value of the vertical axis is equal to or larger than the solid line satisfies the formula (3) or the formula (4).

The dotted line in FIG. 21 is a line serving as a boundary that satisfies the formula (6), and a sample of which the value of the vertical axis is equal to or larger than the dotted line satisfies the formula (6).

Example 1, which is a Comparative Example, does not satisfy the formula (3) or the formula (4), and it is understood that the cover glass is peeled off from the frame. Example 2, which is an Inventive Example, satisfies the formula (3) or the formula (4), and it is understood that peeling of the cover glass from the frame can be suppressed.

TABLE 2

| | CG | CG | Curvature radius (mm) | | Adhesion area $A_1$ (mm$^2$) | | Adhesion area $A_2$ (mm$^2$) | |
|---|---|---|---|---|---|---|---|---|
| | thickness t (mm) | Young's modulus (GPa) | Curvature radius R | Corrected curvature radius R' | Curved portion | Shorter flat portion | Curved portion | Shorter flat portion |
| Ex. 3 | 1.1 | 74 | 400 | 655 | 1,246 | 347 | 0 | 0 |
| | 1.1 | 74 | 600 | 702 | 953 | 48 | 0 | 0 |
| | 1.1 | 74 | 600 | 855 | 953 | 121 | 0 | 0 |
| | 1.1 | 74 | 600 | 855 | 953 | 121 | 0 | 0 |
| | 1.1 | 74 | 400 | 655 | 581 | 296 | 0 | 0 |
| | 1.1 | 74 | 600 | 1,110 | 370 | 56 | 0 | 0 |
| Ex. 4 | 1.1 | 74 | 400 | 655 | 6,166 | 560 | 0 | 0 |
| | 1.1 | 74 | 400 | 910 | 6,166 | 1,341 | 0 | 0 |
| | 1.1 | 74 | 400 | 1,165 | 6,166 | 2,122 | 0 | 0 |
| | 1.1 | 74 | 400 | 655 | 2,909 | 555 | 0 | 0 |
| | 1.1 | 74 | 400 | 910 | 2,909 | 1,016 | 0 | 0 |
| | 1.1 | 74 | 400 | 1,165 | 2,909 | 1,393 | 0 | 0 |
| | 1.1 | 74 | 400 | 655 | 2,370 | 346 | 0 | 0 |
| | 1.1 | 74 | 600 | 855 | 2,146 | 298 | 0 | 0 |
| | 1.1 | 74 | 600 | 1,110 | 1,538 | 420 | 0 | 0 |
| | 1.1 | 74 | 600 | 1,110 | 953 | 241 | 0 | 0 |
| | 1.1 | 74 | 600 | 1,365 | 953 | 362 | 0 | 0 |

| | Peripheral length L (mm) | | | Adhesion | | | | |
|---|---|---|---|---|---|---|---|---|
| | Curved portion | Longer flat portion | F of shorter flat portion | area/peripheral length (mm) | Whether bonding is possible | Satisfy formula (6) | Actual test | |
| Ex. 3 | 250 | 50 | 50 | 5 | B | | | |
| | 250 | 20 | 20 | 4 | B | | | |
| | 250 | 50 | 50 | 4 | B | | | |
| | 250 | 100 | 50 | 4 | B | | | |
| | 250 | 50 | 50 | 3 | B | | | |
| | 250 | 100 | 100 | 1 | B | | | |
| Ex. 4 | 250 | 50 | 50 | 22 | A | | | |
| | 250 | 100 | 100 | 21 | A | Satisfy | | |
| | 250 | 150 | 150 | 21 | A | Satisfy | | |
| | 250 | 50 | 50 | 12 | A | | | |
| | 250 | 100 | 100 | 11 | A | | | |
| | 250 | 150 | 150 | 11 | A | Satisfy | | |
| | 250 | 50 | 50 | 9 | A | | | |
| | 250 | 50 | 50 | 8 | A | | | |
| | 250 | 100 | 100 | 6 | A | | | |
| | 250 | 100 | 100 | 3 | A | | | |
| | 250 | 150 | 150 | 3 | A | | | |

Examples 3 and 4

Figure 22:
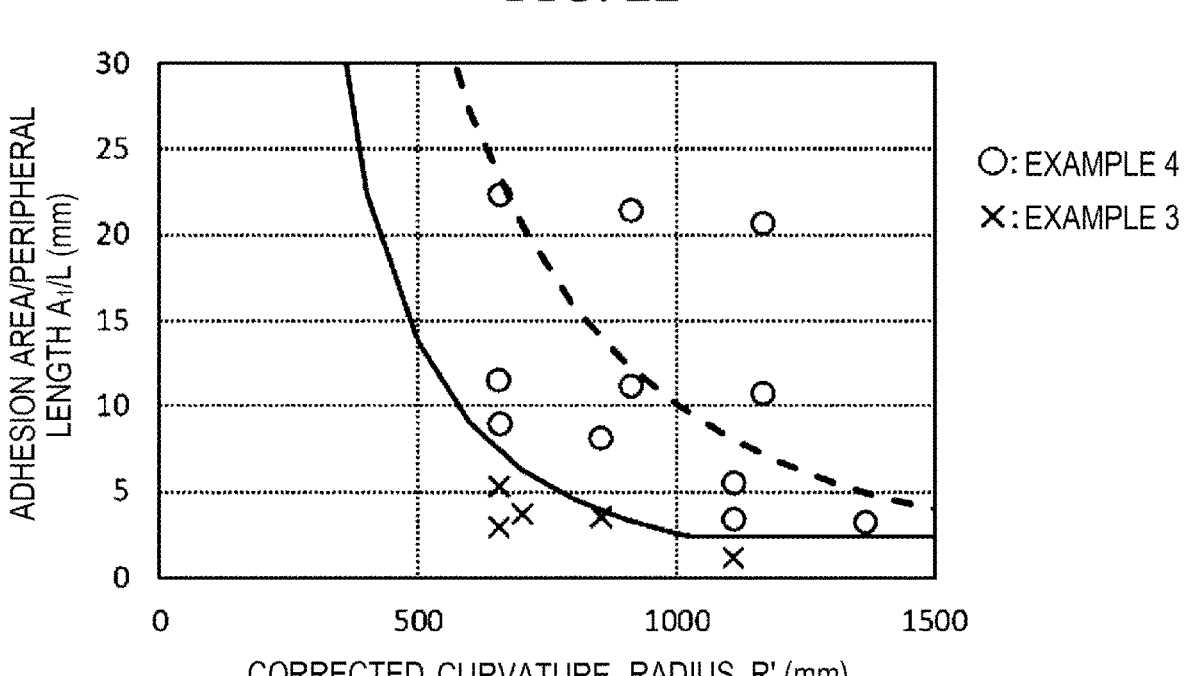
FIG. 22 is a graph showing evaluation results of cover glasses according to Examples 3 and 4.

Table 2 is a table showing properties of cover glasses according to Examples 3 and 4. FIG. 22 is a graph showing evaluation results of the cover glasses according to Examples 3 and 4.

In Examples 3 and 4, a part of the cover glass was curved to form flat portions on both sides of the curved portion. In Examples 3 and 4, a plurality of samples having different curvature radii R, areas $A_1$, and peripheral lengths L as shown in Table 2 were prepared. Other points were the same as those in Examples 1 and 2.

As shown in Table 2 and FIG. 22, Example 3, which is a Comparative Example, does not satisfy the formula (3) or the formula (4), and it is understood that the cover glass is peeled off from the frame. Example 4, which is an Inventive Example, satisfies the formula (3) or the formula (4), and it is understood that peeling of the cover glass from the frame can be suppressed. In addition, some samples of Example 4 further satisfied the formula (6).

As shown in Table 3 and FIG. 23, Example 5, which is a Comparative Example, does not satisfy the formula (3) or the formula (4), and it is understood that the cover glass is peeled off from the frame. Example 6, which is an Inventive Example, satisfies the formula (3) or the formula (4), and it is understood that peeling of the cover glass from the frame can be suppressed. In addition, some samples of Example 6 further satisfied the formula (6).

Examples 7 and 8

FIG. 24 is a graph showing evaluation results of cover glasses according to Examples 7 and 8.

Examples 7 and 8 were the same as Examples 5 and 6 except that a part of the cover glass was curved to form flat portions on both sides of the curved portion, and the curvature radius R, the area $A_1$, and the peripheral length L were as shown in Table 3.

As shown in Table 3 and FIG. 24, Example 7, which is a Comparative Example, does not satisfy the formula (3) or

TABLE 3

| | CG thickness t (mm) | CG Young's modulus (GPa) | Curvature radius R | Corrected curvature radius R' | Adhesion area $A_1$ (mm²) Curved portion | Adhesion area $A_1$ (mm²) Shorter flat portion | Adhesion area $A_2$ (mm²) Curved portion | Adhesion area $A_2$ (mm²) Shorter flat portion |
|---|---|---|---|---|---|---|---|---|
| Ex. 5 | 0.7 | 74 | 200 | 200 | 1,365 | 0 | 0 | 0 |
| | 0.7 | 74 | 200 | 200 | 1,428 | 0 | 0 | 0 |
| | 0.7 | 74 | 200 | 200 | 2,669 | 0 | 0 | 0 |
| Ex. 6 | 0.7 | 74 | 400 | 400 | 1,599 | 0 | 0 | 0 |
| | 0.7 | 74 | 400 | 400 | 3,116 | 0 | 0 | 0 |
| | 0.7 | 74 | 200 | 200 | 4,301 | 0 | 0 | 0 |
| | 0.7 | 74 | 200 | 200 | 5,334 | 0 | 0 | 0 |
| Ex. 7 | 0.7 | 74 | 200 | 262 | 1,428 | 65 | 0 | 0 |
| Ex. 8 | 0.7 | 74 | 200 | 290 | 1,428 | 95 | 0 | 0 |
| | 0.7 | 74 | 200 | 340 | 1,806 | 127 | 0 | 0 |
| Ex. 9 | 0.5 | 74 | 200 | 200 | 291.1 | 0 | 0 | 0 |
| Ex. 10 | 0.5 | 74 | 200 | 200 | 1,365.3 | 0 | 0 | 0 |
| | 0.5 | 74 | 200 | 200 | 2,669.1 | 0 | 0 | 0 |

| | Peripheral length L (mm) Curved portion | Longer flat portion | F of shorter flat portion | Adhesion area/peripheral length (mm) | Whether bonding is possible | Satisfy formula (6) | Actual test |
|---|---|---|---|---|---|---|---|
| Ex. 5 | 250 | 0 | 0 | 5 | B | | |
| | 250 | 0 | 0 | 6 | B | | |
| | 250 | 0 | 0 | 11 | B | | |
| Ex. 6 | 250 | 0 | 0 | 6 | A | | |
| | 250 | 0 | 0 | 12 | A | Satisfy | |
| | 250 | 0 | 0 | 17 | A | | |
| | 250 | 0 | 0 | 21 | A | | |
| Ex. 7 | 250 | 20 | 20 | 6 | B | | |
| Ex. 8 | 250 | 29 | 29 | 5 | A | | |
| | 250 | 45 | 45 | 7 | A | | |
| Ex. 9 | 250 | 0 | 0 | 1 | B | | |
| Ex. 10 | 250 | 0 | 0 | 5 | A | | |
| | 250 | 0 | 0 | 11 | A | | |

Examples 5 and 6

Table 3 is a table showing properties of cover glasses according to Examples 5 to 10. FIG. 23 is a graph showing evaluation results of the cover glasses according to Examples 5 and 6.

Examples 5 and 6 were the same as Examples 1 and 2 except that the thickness of the cover glass was 0.7 mm, and the curvature radius R, the area $A_1$, and the peripheral length L were as shown in Table 3.

the formula (4), and it is understood that the cover glass is peeled off from the frame. Example 8, which is an Inventive Example, satisfies the formula (3) or the formula (4), and it is understood that peeling of the cover glass from the frame can be suppressed.

Examples 9 and 10

FIG. 25 is a graph showing evaluation results of cover glasses according to Examples 9 and 10.

Examples 9 and 10 were the same as Examples 1 and 2 except that the thickness of the cover glass was 0.5 mm, and the curvature radius R, the area $A_1$, and the peripheral length L were as shown in Table 3.

As shown in Table 3 and FIG. 25, Example 9, which is a Comparative Example, does not satisfy the formula (3) or the formula (4), and it is understood that the cover glass is peeled off from the frame. Example 10, which is an Inventive Example, satisfies the formula (3) or the formula (4), and it is understood that peeling of the cover glass from the frame can be suppressed.

TABLE 4

| | CG thickness t (mm) | CG Young's modulus (GPa) | Curvature radius (mm) | | Adhesion area $A_1$ (mm²) | | Adhesion area $A_2$ (mm²) | |
| --- | --- | --- | --- | --- | --- | --- | --- | --- |
| | | | Curvature radius R | Corrected curvature radius R' | Curved portion | Shorter flat portion | Curved portion | Shorter flat portion |
| Ex. 11 | 1.1 | 74 | 1,200 | 1,200 | 0 | 0 | 3,950 | 0 |
| | 1.1 | 74 | 1,000 | 1,000 | 0 | 0 | 3,950 | 0 |
| | 1.1 | 74 | 800 | 800 | 0 | 0 | 3,750 | 0 |
| | 1.1 | 74 | 600 | 600 | 0 | 0 | 10,930 | 0 |
| | 1.1 | 74 | 600 | 600 | 0 | 0 | 7,480 | 0 |
| | 1.1 | 74 | 400 | 400 | 0 | 0 | 15,500 | 0 |
| Ex. 12 | 1.1 | 74 | 800 | 800 | 0 | 0 | 2,290 | 0 |
| | 1.1 | 74 | 800 | 800 | 0 | 0 | 770 | 0 |
| | 1.1 | 74 | 600 | 600 | 0 | 0 | 3,750 | 0 |
| | 1.1 | 74 | 400 | 400 | 0 | 0 | 10,780 | 0 |
| | 1.1 | 74 | 400 | 400 | 0 | 0 | 8,490 | 0 |
| | 1.1 | 74 | 400 | 400 | 0 | 0 | 7,500 | 0 |
| | 1.1 | 74 | 400 | 400 | 0 | 0 | 5,780 | 0 |
| | 1.1 | 74 | 600 | 600 | 0 | 0 | 3,750 | 0 |
| | 1.1 | 74 | 600 | 600 | 0 | 0 | 3,750 | 0 |

| | Peripheral length L (mm) | | | Adhesion area/peripheral length (mm) | Whether bonding is possible | Satisfy formula (6) | Actual test |
| --- | --- | --- | --- | --- | --- | --- | --- |
| | Curved portion | Longer flat portion | F of shorter flat portion | | | | |
| Ex. 11 | 250 | 0 | 0 | 15.8 | A | | |
| | 250 | 0 | 0 | 15.8 | A | | |
| | 250 | 0 | 0 | 15.1 | A | | Yes |
| | 250 | 0 | 0 | 43.7 | A | | |
| | 250 | 0 | 0 | 29.9 | A | | Yes |
| | 250 | 0 | 0 | 62.0 | A | | |
| Ex. 12 | 250 | 0 | 0 | 9.2 | B | | |
| | 250 | 0 | 0 | 3.1 | B | | |
| | 250 | 0 | 0 | 15.0 | B | | Yes |
| | 250 | 0 | 0 | 43.1 | B | | |
| | 250 | 0 | 0 | 34.0 | B | | |
| | 250 | 0 | 0 | 30.0 | B | | Yes |
| | 250 | 0 | 0 | 23.1 | B | | |
| | 250 | 100 | 0 | 15.0 | B | | Yes |
| | 250 | 150 | 0 | 15.0 | B | | |

Examples 11 and 12

Table 4 is a table showing properties of cover glasses according to Examples 11 and 12. FIG. 26 is a graph showing evaluation results of the cover glasses according to Examples 11 and 12.

Examples 11 and 12 were the same as Examples 1 and 2 except that as an adhesive layer, an adhesive (double-sided tape VHX-1701-04, manufactured by 3M Company) corresponding to the second adhesive layer was used, and the curvature radius R, the area $A_2$, and the peripheral length L were as shown in Table 4.

As shown in Table 4 and FIG. 26, Example 12, which is a Comparative Example, does not satisfy the formula (3) or the formula (4), and it is understood that the cover glass is peeled off from the frame. Example 11, which is an Inventive Example, satisfies the formula (3) or the formula (4), and it is understood that peeling of the cover glass from the frame can be suppressed.

TABLE 5

| | CG thickness t (mm) | CG Young's modulus (GPa) | Curvature radius (mm) | | Adhesion area A$_1$ (mm$^2$) | | Adhesion area A$_2$ (mm$^2$) | |
|---|---|---|---|---|---|---|---|---|
| | | | Curvature radius R | Corrected curvature radius R' | Curved portion | Shorter flat portion | Curved portion | Shorter flat portion |
| Ex. 13 | 1.1 | 74 | 600 | 702 | 0 | 0 | 2,325 | 118 |
| | 1.1 | 74 | 600 | 855 | 0 | 0 | 2,325 | 295 |
| | 1.1 | 74 | 400 | 655 | 0 | 0 | 3,039 | 845.5 |
| | 1.1 | 74 | 400 | 655 | 0 | 0 | 1,417 | 721.5 |
| | 1.1 | 74 | 600 | 855 | 0 | 0 | 2,325 | 295 |
| | 1.1 | 74 | 600 | 1,110 | 0 | 0 | 902 | 136.5 |
| Ex. 14 | 1.1 | 74 | 600 | 855 | 0 | 0 | 5,234 | 728 |
| | 1.1 | 74 | 400 | 655 | 0 | 0 | 15,038 | 1,366 |
| | 1.1 | 74 | 400 | 655 | 0 | 0 | 7,094 | 1,353 |
| | 1.1 | 74 | 400 | 655 | 0 | 0 | 5,780 | 845 |
| | 1.1 | 74 | 600 | 1,110 | 0 | 0 | 3,750 | 1,025 |
| | 1.1 | 74 | 600 | 1,110 | 0 | 0 | 2,325 | 588 |
| | 1.1 | 74 | 400 | 910 | 0 | 0 | 15,038 | 3,271 |
| | 1.1 | 74 | 400 | 910 | 0 | 0 | 7,094 | 2,478 |
| | 1.1 | 74 | 600 | 1,365 | 0 | 0 | 2,325 | 883 |
| | 1.1 | 74 | 400 | 1,165 | 0 | 0 | 15,038 | 5,176 |
| | 1.1 | 74 | 400 | 1,165 | 0 | 0 | 7,094 | 3,398 |

| | Peripheral length L (mm) | | F of shorter flat portion | Adhesion area/peripheral length (mm) | Whether bonding is possible | Satisfy formula (6) | Actual test |
|---|---|---|---|---|---|---|---|
| | Curved portion | Longer flat portion | | | | | |
| Ex. 13 | 250 | 20 | 20 | 9.0 | B | | |
| | 250 | 50 | 50 | 8.7 | B | | |
| | 250 | 50 | 50 | 12.9 | B | | Yes |
| | 250 | 50 | 50 | 7.1 | B | | |
| | 250 | 100 | 50 | 8.7 | B | | |
| | 250 | 100 | 100 | 3.0 | B | | |
| Ex. 14 | 250 | 50 | 50 | 19.9 | A | | |
| | 250 | 50 | 50 | 54.7 | A | | |
| | 250 | 50 | 50 | 28.2 | A | | Yes |
| | 250 | 50 | 50 | 22.1 | A | | |
| | 250 | 100 | 100 | 13.6 | A | | |
| | 250 | 100 | 100 | 8.3 | A | | |
| | 250 | 100 | 100 | 52.3 | A | Satisfy | |
| | 250 | 100 | 100 | 27.3 | A | | |
| | 250 | 150 | 150 | 8.0 | A | | |
| | 250 | 150 | 150 | 50.5 | A | Satisfy | |
| | 250 | 150 | 150 | 26.2 | A | Satisfy | |

Examples 13 and 14

Table 5 is a table showing properties of cover glasses according to Examples 13 and 14. FIG. 27 is a graph showing evaluation results of the cover glasses according to Examples 13 and 14.

Examples 13 and 14 were the same as Examples 1 and 12 except that a part of the cover glass was curved to form flat portions on both sides of the curved portion, and the curvature radius R, the area A$_2$, and the peripheral length L were as shown in Table 5.

As shown in Table 5 and FIG. 27, Example 13, which is a Comparative Example, does not satisfy the formula (3) or the formula (4), and it is understood that the cover glass is peeled off from the frame. Example 14, which is an Inventive Example, satisfies the formula (3) or the formula (4), and it is understood that peeling of the cover glass from the frame can be suppressed.

In addition, some samples of Example 14 further satisfied the formula (6).

TABLE 6

| | CG thickness t (mm) | CG Young's modulus (GPa) | Curvature radius (mm) | | Adhesion area A$_1$ (mm$^2$) | | Adhesion area A$_2$ (mm$^2$) | |
|---|---|---|---|---|---|---|---|---|
| | | | Curvature radius R | Corrected curvature radius R' | Curved portion | Shorter flat portion | Curved portion | Shorter flat portion |
| Ex. 15 | 0.7 | 74 | 200 | 200 | 0 | 0 | 6,510 | 0 |
| | 0.7 | 74 | 200 | 200 | 0 | 0 | 3,482 | 0 |
| Ex. 16 | 0.7 | 74 | 400 | 400 | 0 | 0 | 7,600 | 0 |
| | 0.7 | 74 | 400 | 400 | 0 | 0 | 3,900 | 0 |
| | 0.7 | 74 | 200 | 200 | 0 | 0 | 13,010 | 0 |
| | 0.7 | 74 | 200 | 200 | 0 | 0 | 10,490 | 0 |
| Ex. 17 | 0.7 | 74 | 200 | 262 | 0 | 0 | 3,482 | 159 |

TABLE 6-continued

| Ex. 18 | 0.7 | 74 | 200 | 290 | 0 | 0 | 3,482 | 231 |
|---|---|---|---|---|---|---|---|---|
|  | 0.7 | 74 | 200 | 340 | 0 | 0 | 4,404 | 310 |
| Ex. 19 | 0.5 | 74 | 200 | 200 | 0 | 0 | 710 | 0 |
| Ex. 20 | 0.5 | 74 | 400 | 400 | 0 | 0 | 796 | 0 |
|  | 0.5 | 74 | 200 | 200 | 0 | 0 | 6,510 | 0 |
|  | 0.5 | 74 | 200 | 200 | 0 | 0 | 3,330 | 0 |
| Ex. 41 | 1.1 | 70 | 600 | 600 | 0 | 0 | 4,500 | 0 |
| Ex. 42 | 1.1 | 70 | 600 | 600 | 0 | 0 | 2,328 | 0 |
| Ex. 43 | 1.1 | 77 | 600 | 600 | 0 | 0 | 7,000 | 0 |
| Ex. 44 | 1.1 | 77 | 600 | 600 | 0 | 0 | 3,750 | 0 |

| | Peripheral length L (mm) | | | Adhesion area/peripheral length (mm) | Whether bonding is possible | Satisfy formula (6) | Actual test |
|---|---|---|---|---|---|---|---|
| | Curved portion | Longer flat portion | F of shorter flat portion | | | | |
| Ex. 15 | 250 | 0 | 0 | 26.0 | B | | Yes |
|  | 250 | 0 | 0 | 13.9 | B | | |
| Ex. 16 | 250 | 0 | 0 | 30.4 | A | Satisfy | |
|  | 250 | 0 | 0 | 15.6 | A | | |
|  | 250 | 0 | 0 | 52.0 | A | | |
|  | 250 | 0 | 0 | 42.0 | A | | |
| Ex. 17 | 250 | 20 | 20 | 13.5 | B | | |
| Ex. 18 | 250 | 29 | 29 | 13.3 | A | | |
|  | 250 | 45 | 45 | 16.0 | A | | |
| Ex. 19 | 250 | 0 | 0 | 2.8 | B | | |
| Ex. 20 | 250 | 0 | 0 | 3.2 | A | Satisfy | |
|  | 250 | 0 | 0 | 26.0 | A | | |
|  | 250 | 0 | 0 | 13.3 | A | | |
| Ex. 41 | 250 | 0 | 0 | 18.0 | A | | |
| Ex. 42 | 250 | 0 | 0 | 9.3 | B | | |
| Ex. 43 | 250 | 0 | 0 | 28.0 | A | | |
| Ex. 44 | 250 | 0 | 0 | 15.0 | B | | |

Examples 15 and 16

Table 6 is a table showing properties of cover glasses according to Examples 15 to 20 and Examples 41 to 44. FIG. 28 is a graph showing evaluation results of the cover glasses according to Examples 15 and 16.

Examples 15 and 16 were the same as Examples 11 and 12 except that the thickness of the cover glass was 0.7 mm, and the curvature radius R, the area $A_2$, and the peripheral length L were as shown in Table 6.

As shown in Table 6 and FIG. 28, Example 15, which is a Comparative Example, does not satisfy the formula (3) or the formula (4), and it is understood that the cover glass is peeled off from the frame. Example 16, which is an Inventive Example, satisfies the formula (3) or the formula (4), and it is understood that peeling of the cover glass from the frame can be suppressed.

In addition, some samples of Example 16 further satisfied the formula (6).

Examples 17 and 18

FIG. 29 is a graph showing evaluation results of cover glasses according to Examples 17 and 18.

Examples 17 and 18 were the same as Examples 15 and 16 except that a part of the cover glass was curved to form flat portions on both sides of the curved portion, and the curvature radius R, the area $A_2$, and the peripheral length L were as shown in Table 6.

As shown in Table 6 and FIG. 29, Example 17, which is a Comparative Example, does not satisfy the formula (3) or the formula (4), and it is understood that the cover glass is peeled off from the frame. Example 18, which is an Inventive Example, satisfies the formula (3) or the formula (4), and it is understood that peeling of the cover glass from the frame can be suppressed.

Examples 19 and 20

FIG. 30 is a graph showing evaluation results of cover glasses according to Examples 19 and 20.

Examples 19 and 20 were the same as Examples 11 and 12 except that the thickness of the cover glass was 0.5 mm, and the curvature radius R, the area $A_2$, and the peripheral length L were as shown in Table 6.

As shown in Table 6 and FIG. 30, Example 19, which is a Comparative Example, does not satisfy the formula (3) or the formula (4), and it is understood that the cover glass is peeled off from the frame. Example 20, which is an Inventive Example, satisfies the formula (3) or the formula (4), and it is understood that peeling of the cover glass from the frame can be suppressed.

In addition, some samples of Example 20 further satisfied the formula (6).

Examples 41 to 44

FIG. 41 and FIG. 42 are graphs showing evaluation results of the cover glasses according to Examples 41 to 44.

Examples 41 to 44 were the same as Examples 11 and 12 except that the Young's modulus of the glass plate was 70 GPa or 77 GPa, and the curvature radius R, the area $A_2$, and the peripheral length L were shown in Table 6.

As shown in Table 6, FIG. 41 and FIG. 42, Examples 42 and 44, which are Comparative Examples, do not satisfy the formula (3) or the formula (4), and it is understood that the cover glass is peeled off from the frame. Examples 41 and 43, which are Inventive Examples, satisfy the formula (3) or the formula (4), and it is understood that peeling of the cover glass from the frame can be suppressed.

TABLE 7

| | CG thickness t (mm) | Curvature radius (mm) | | Adhesion area A$_1$ (mm$^2$) | | Adhesion area A$_2$ (mm$^2$) | | Peripheral length (mm) | | | Adhesion area/peripheral length (mm) | Whether bonding is possible | Actual test |
|---|---|---|---|---|---|---|---|---|---|---|---|---|---|
| | | Curvature radius R | Corrected curvature radius R' | Curved portion | Shorter flat portion | Curved portion | Shorter flat portion | Bent portion | Longer flat portion | F of shorter flat portion | | | |
| Ex. 21 | 1.1 | 600 | 600 | 5,806 | 0 | 0.0 | 0.0 | 250 | 0 | 0 | 23.2 | B | |
| | 1.1 | 600 | 600 | 4,424 | 0 | 0.0 | 0.0 | 250 | 0 | 0 | 17.7 | B | |
| | 1.1 | 800 | 800 | 3,079 | 0.0 | 0.0 | 0.0 | 250 | 0 | 0 | 12.3 | B | |
| | 1.1 | 600 | 600 | 2,784 | 0 | 0.0 | 0.0 | 250 | 0 | 0 | 11.1 | B | |
| | 1.1 | 1,000 | 1,000 | 1,599 | 0.0 | 0.0 | 0.0 | 250 | 0 | 0 | 6.4 | B | |
| | 1.1 | 800 | 800 | 1,579 | 0.0 | 0.0 | 0.0 | 250 | 0 | 0 | 6.3 | B | |
| | 1.1 | 800 | 800 | 640 | 0.0 | 0.0 | 0.0 | 250 | 0 | 0 | 2.6 | B | |
| Ex. 22 | 1.1 | 800 | 800 | 4,498 | 0.0 | 0.0 | 0.0 | 250 | 0 | 0 | 18.0 | A | |
| | 1.1 | 1,000 | 1,000 | 3,116 | 0.0 | 0.0 | 0.0 | 250 | 0 | 0 | 12.5 | A | |
| Ex. 23 | 1.1 | 1,000 | 1,000 | 0 | 0 | 7,600 | 0.0 | 250 | 0 | 0 | 30.4 | A | |
| | 1.1 | 800 | 800 | 0 | 0 | 10,970 | 0.0 | 250 | 0 | 0 | 43.9 | A | |
| Ex. 24 | 1.1 | 1,000 | 1,000 | 0 | 0 | 3,900 | 0.0 | 250 | 0 | 0 | 15.6 | B | Yes |
| | 1.1 | 800 | 800 | 0 | 0 | 7,510 | 0.0 | 250 | 0 | 0 | 30.0 | B | Yes |
| | 1.1 | 800 | 800 | 0 | 0 | 3,850 | 0.0 | 250 | 0 | 0 | 15.4 | B | Yes |
| | 1.1 | 800 | 800 | 0 | 0 | 1,560 | 0.0 | 250 | 0 | 0 | 6.2 | B | |
| | 1.1 | 600 | 600 | 0 | 0 | 14,160 | 0 | 250 | 0 | 0 | 56.6 | B | |
| | 1.1 | 600 | 600 | 0 | 0 | 10,790 | 0 | 250 | 0 | 0 | 43.2 | B | |
| | 1.1 | 600 | 600 | 0 | 0 | 6,790 | 0 | 250 | 0 | 0 | 27.2 | B | Yes |

Example 21 and Example 22

Table 7 is a table showing properties of cover glasses according to Examples 21 to 24. FIG. 31 is a graph showing evaluation results of the cover glasses according to Examples 21 and 22.

Example 21 and Example 22 were the same as Example 1 and Example 2 except that the glass plate was bent in the lateral direction (X direction) to be convex toward a side not adhered to the frame (first main surface side), and the curvature radius R, the area A$_1$, and the peripheral length L were as shown in Table 7.

As shown in Table 7 and FIG. 31, Example 21, which is a Comparative Example, does not satisfy the formula (6) or the formula (7), and it is understood that the cover glass is peeled off from the frame. Example 22, which is an Inventive Example, satisfies the formula (6) or the formula (7), and it is understood that peeling of the cover glass from the frame can be suppressed.

Examples 23 and 24

FIG. 32 is a graph showing evaluation results of the cover glasses according to Examples 23 and 24.

Examples 23 and 24 were the same as Examples 21 and 22 except that as an adhesive layer, an adhesive (double-sided tape VHX-1701-04, manufactured by 3M Company) corresponding to the second adhesive layer was used, and the curvature radius R, the area A$_2$, and the peripheral length L were as shown in Table 7.

As shown in Table 7 and FIG. 32, Example 24, which is a Comparative Example, does not satisfy the formula (6) or the formula (7), and it is understood that the cover glass is peeled off from the frame. Example 23, which is an Inventive Example, satisfies the formula (6) or the formula (7), and it is understood that peeling of the cover glass from the frame can be suppressed.

TABLE 8

| | CG thickness t (mm) | Curvature radius (mm) | | Adhesion area A$_1$ (mm$^2$) | | Adhesion area A$_2$ (mm$^2$) | | Peripheral length (mm) | | | Adhesion area/peripheral length (mm) | Whether bonding is possible | Actual test |
|---|---|---|---|---|---|---|---|---|---|---|---|---|---|
| | | Curvature radius R | Corrected curvature radius R' | Curved portion | Shorter flat portion | Curved portion | Shorter flat portion | Bent portion | Longer flat portion | F of shorter flat portion | | | |
| Ex. 25 | 1.1 | 600 | 702 | 0 | 0 | 6,790 | 585 | 250 | 20 | 20 | 27.3 | B | |
| | 1.1 | 600 | 855 | 0 | 0 | 5,421 | 1,065 | 250 | 50 | 50 | 21.6 | B | |
| | 1.1 | 600 | 855 | 0 | 0 | 3,210 | 785 | 250 | 50 | 50 | 13.3 | B | |
| | 1.1 | 600 | 1,110 | 0 | 0 | 999 | 661 | 250 | 100 | 100 | 4.7 | B | |
| Ex. 26 | 1.1 | 600 | 855 | 0 | 0 | 10,790 | 1,485 | 250 | 50 | 50 | 40.9 | A | Yes |
| | 1.1 | 600 | 1,110 | 0 | 0 | 6,790 | 1,975 | 250 | 100 | 100 | 25.0 | A | |
| | 1.1 | 600 | 1,365 | 0 | 0 | 6,790 | 3,220 | 250 | 150 | 150 | 25.0 | A | |
| | 1.1 | 600 | 1,365 | 0 | 0 | 3,210 | 1,750 | 250 | 150 | 150 | 12.4 | A | |
| Ex. 27 | 1.1 | 600 | 1,110 | 410 | 271 | 0.0 | 0.0 | 250 | 100 | 100 | 1.9 | B | |
| | 1.1 | 600 | 855 | 1,316 | 322 | 0.0 | 0.0 | 250 | 50 | 50 | 5.5 | B | |
| | 1.1 | 600 | 855 | 2,223 | 436 | 0.0 | 0.0 | 250 | 50 | 50 | 8.9 | B | |
| | 1.1 | 600 | 702 | 2,784 | 240 | 0.0 | 0.0 | 250 | 20 | 20 | 11.2 | B | |
| Ex. 28 | 1.1 | 600 | 1,365 | 1,316 | 718 | 0.0 | 0.0 | 250 | 150 | 150 | 5.1 | A | |
| | 1.1 | 600 | 1,110 | 2,784 | 810 | 0.0 | 0.0 | 250 | 100 | 100 | 10.3 | A | |
| | 1.1 | 600 | 1,365 | 2,784 | 1,320 | 0.0 | 0.0 | 250 | 150 | 150 | 10.3 | A | |
| | 1.1 | 600 | 855 | 4,424 | 609 | 0.0 | 0.0 | 250 | 50 | 50 | 16.8 | A | |

Examples 25 and 26

Table 8 is a table showing properties of cover glasses according to Examples 25 to 28. FIG. 33 is a graph showing evaluation results of the cover glasses according to Examples 25 and 26.

Examples 25 and 26 were the same as Examples 23 and 24 except that a part of the cover glass was curved to form flat portions on both sides of the curved portion, and the curvature radius R, the area A$_2$, and the peripheral length L were as shown in Table 8.

As shown in Table 8 and FIG. 33, Example 25, which is a Comparative Example, does not satisfy the formula (6) or the formula (7), and it is understood that the cover glass is peeled off from the frame. Example 26, which is an Inventive Example, satisfies the formula (6) or the formula (7), and it is understood that peeling of the cover glass from the frame can be suppressed.

Examples 27 and 28

FIG. 34 is a graph showing evaluation results of the cover glasses according to Examples 27 and 28.

Examples 27 and 28 were the same as Examples 21 and 22 except that a part of the cover glass was curved to form flat portions on both sides of the curved portion, and the curvature radius R, the area A$_1$, and the peripheral length L were as shown in Table 8.

As shown in Table 8 and FIG. 34, Example 27, which is a Comparative Example, does not satisfy the formula (6) or the formula (7), and it is understood that the cover glass is peeled off from the frame. Example 28, which is an Inventive Example, satisfies the formula (6) or the formula (7), and it is understood that peeling of the cover glass from the frame can be suppressed.

TABLE 9

| | CG thickness t (mm) | Curvature radius (mm) | | Adhesion area $A_1$ (mm²) | | Adhesion area $A_2$ (mm²) | |
|---|---|---|---|---|---|---|---|
| | | Curvature radius R | Corrected curvature radius R' | Curved portion | Shorter flat portion | Curved portion | Shorter flat portion |
| Ex. 29 | 0.7 | 400 | 400 | 0 | 0 | 3,770 | 0 |
| | 0.7 | 400 | 400 | 0 | 0 | 1,530 | 0 |
| | 0.7 | 200 | 200 | 0 | 0 | 12,970 | 0 |
| Ex. 30 | 0.7 | 400 | 400 | 0 | 0 | 13,970 | 0 |
| | 0.7 | 400 | 400 | 0 | 0 | 10,760 | 0 |
| | 0.7 | 400 | 400 | 0 | 0 | 7,360 | 0 |
| Ex. 31 | 0.7 | 200 | 262 | 0 | 0 | 3,242 | 274 |
| Ex. 32 | 0.7 | 200 | 355 | 0 | 0 | 11,980 | 685 |
| Ex. 33 | 0.7 | 400 | 400 | 627 | 0 | 0.0 | 0.0 |
| | 0.7 | 400 | 400 | 1,546 | 0 | 0.0 | 0.0 |
| | 0.7 | 200 | 200 | 5,318 | 0 | 0.0 | 0.0 |
| Ex. 34 | 0.7 | 400 | 400 | 3,018 | 0 | 0.0 | 0.0 |
| | 0.7 | 400 | 400 | 4,412 | 0 | 0.0 | 0.0 |
| | 0.7 | 400 | 400 | 5,728 | 0 | 0.0 | 0.0 |
| Ex. 35 | 0.7 | 200 | 262 | 1,329 | 112 | 0.0 | 0.0 |
| Ex. 36 | 0.7 | 200 | 355 | 4,912 | 281 | 0.0 | 0.0 |

| | Peripheral length (mm) | | | Adhesion area/peripheral length (mm) | Whether bonding is possible | Actual test |
|---|---|---|---|---|---|---|
| | Bent portion | Longer flat portion | F of shorter flat portion | | | |
| Ex. 29 | 250 | 0 | 0 | 15.1 | B | Yes |
| | 250 | 0 | 0 | 6.1 | B | |
| | 250 | 0 | 0 | 51.9 | B | |
| Ex. 30 | 250 | 0 | 0 | 55.9 | A | |
| | 250 | 0 | 0 | 43.0 | A | |
| | 250 | 0 | 0 | 29.4 | A | Yes |
| Ex. 31 | 250 | 20 | 20 | 13.0 | B | |
| Ex. 32 | 250 | 50 | 50 | 42.2 | A | |
| Ex. 33 | 250 | 0 | 0 | 2.5 | B | |
| | 250 | 0 | 0 | 6.2 | B | |
| | 250 | 0 | 0 | 21.3 | B | |
| Ex. 34 | 250 | 0 | 0 | 12.1 | A | |
| | 250 | 0 | 0 | 17.6 | A | |
| | 250 | 0 | 0 | 22.9 | A | |
| Ex. 35 | 250 | 20 | 20 | 5.3 | B | |
| Ex. 36 | 250 | 50 | 50 | 17.3 | A | |

Examples 29 and 30

Table 9 is a table showing properties of cover glasses according to Examples 29 to 36. FIG. 35 is a graph showing evaluation results of the cover glasses according to Examples 29 and 30.

Examples 29 and 30 were the same as Examples 23 and 24 except that the thickness of the cover glass was 0.7 mm, and the curvature radius R, the area $A_2$, and the peripheral length L were as shown in Table 9.

As shown in Table 9 and FIG. 35, Example 29, which is a Comparative Example, does not satisfy the formula (6) or the formula (7), and it is understood that the cover glass is peeled off from the frame. Example 30, which is an Inventive Example, satisfies the formula (6) or the formula (7), and it is understood that peeling of the cover glass from the frame can be suppressed.

Examples 31 and 32

FIG. 36 is a graph showing evaluation results of the cover glasses according to Examples 31 and 32.

Examples 31 and 32 were the same as Examples 29 and 30 except that a part of the cover glass was curved to form flat portions on both sides of the curved portion, and the curvature radius R, the area $A_2$, and the peripheral length L were as shown in Table 9.

As shown in Table 9 and FIG. 36, Example 31, which is a Comparative Example, does not satisfy the formula (6) or the formula (7), and it is understood that the cover glass is peeled off from the frame. Example 32, which is an Inventive Example, satisfies the formula (6) or the formula (7), and it is understood that peeling of the cover glass from the frame can be suppressed.

Examples 33 and 34

FIG. 37 is a graph showing evaluation results of the cover glasses according to Examples 33 and 34.

Examples 33 and 34 were the same as Examples 21 and 22 except that the thickness of the cover glass was 0.7 mm, and the curvature radius R, the area $A_1$, and the peripheral length L were as shown in Table 9.

As shown in Table 9 and FIG. 37, Example 33, which is a Comparative Example, does not satisfy the formula (6) or the formula (7), and it is understood that the cover glass is peeled off from the frame. Example 34, which is an Inventive Example, satisfies the formula (6) or the formula (7), and it is understood that peeling of the cover glass from the frame can be suppressed.

Examples 35 and 36

FIG. 38 is a graph showing evaluation results of the cover glasses according to Examples 35 and 36.

Examples 35 and 36 were the same as Examples 33 and 34 except that a part of the cover glass was curved to form flat portions on both sides of the curved portion, and the curvature radius R, the area $A_1$, and the peripheral length L were as shown in Table 9.

As shown in Table 9 and FIG. 38, Example 35, which is a Comparative Example, does not satisfy the formula (6) or the formula (7), and it is understood that the cover glass is peeled off from the frame. Example 36, which is an Inventive Example, satisfies the formula (6) or the formula (7), and it is understood that peeling of the cover glass from the frame can be suppressed.

44 tive Example, satisfies the formula (6) or the formula (7), and it is understood that peeling of the cover glass from the frame can be suppressed.

Examples 39 and 40

FIG. 40 is a graph showing evaluation results of the cover glasses according to Examples 39 and 40.

Examples 39 and 40 were the same as Examples 21 and 22 except that the thickness of the cover glass was 0.5 mm, and the curvature radius R, the area $A_1$, and the peripheral length L were as shown in Table 10.

TABLE 10

|  | CG thickness t (mm) | Curvature radius (mm) | | Adhesion area $A_1$ (mm²) | | Adhesion area $A_2$ (mm²) | |
|  |  | Curvature radius R | Corrected curvature radius R' | Curved portion | Shorter flat portion | Curved portion | Shorter flat portion |
|---|---|---|---|---|---|---|---|
| Ex. 37 | 0.5 | 200 | 200 | 0 | 0 | 9,960 | 0 |
|  | 0.5 | 200 | 200 | 0 | 0 | 6,790 | 0 |
|  | 0.5 | 200 | 200 | 0 | 0 | 3,470 | 0 |
| Ex. 38 | 0.5 | 400 | 400 | 0 | 0 | 13,970 | 0 |
|  | 0.5 | 400 | 400 | 0 | 0 | 10,530 | 0 |
|  | 0.5 | 400 | 400 | 0 | 0 | 7,020 | 0 |
|  | 0.5 | 400 | 400 | 0 | 0 | 3,610 | 0 |
|  | 0.5 | 200 | 200 | 0 | 0 | 13,970 | 0 |
| Ex. 39 | 0.5 | 200 | 200 | 1,423 | 0 | 0.0 | 0.0 |
|  | 0.5 | 200 | 200 | 2,784 | 0 | 0.0 | 0.0 |
|  | 0.5 | 200 | 200 | 4,084 | 0 | 0.0 | 0.0 |
| Ex. 40 | 0.5 | 400 | 400 | 1,480 | 0 | 0.0 | 0.0 |
|  | 0.5 | 400 | 400 | 2,878 | 0 | 0.0 | 0.0 |
|  | 0.5 | 400 | 400 | 4,317 | 0 | 0.0 | 0.0 |
|  | 0.5 | 400 | 400 | 5,728 | 0 | 0.0 | 0.0 |
|  | 0.5 | 200 | 200 | 5,728 | 0 | 0.0 | 0.0 |

|  | Peripheral length (mm) | | | Adhesion area/peripheral length (mm) | Whether bonding is possible | Actual test |
|  | Bent portion | Longer flat portion | F of shorter flat portion |  |  |  |
|---|---|---|---|---|---|---|
| Ex. 37 | 250 | 0 | 0 | 39.84 | B |  |
|  | 250 | 0 | 0 | 27.16 | B |  |
|  | 250 | 0 | 0 | 13.88 | B |  |
| Ex. 38 | 250 | 0 | 0 | 55.88 | A |  |
|  | 250 | 0 | 0 | 42.12 | A |  |
|  | 250 | 0 | 0 | 28.08 | A |  |
|  | 250 | 0 | 0 | 14.44 | A |  |
|  | 250 | 0 | 0 | 55.88 | A |  |
| Ex. 39 | 250 | 0 | 0 | 5.7 | B |  |
|  | 250 | 0 | 0 | 11.1 | B |  |
|  | 250 | 0 | 0 | 16.3 | B |  |
| Ex. 40 | 250 | 0 | 0 | 5.9 | A |  |
|  | 250 | 0 | 0 | 11.5 | A |  |
|  | 250 | 0 | 0 | 17.3 | A |  |
|  | 250 | 0 | 0 | 22.9 | A |  |
|  | 250 | 0 | 0 | 22.9 | A |  |

Examples 37 and 38

Table 10 is a table showing properties of cover glasses according to Examples 37 to 40. FIG. 39 is a graph showing evaluation results of the cover glasses according to Examples 37 and 38.

Examples 37 and 38 were the same as Examples 23 and 24 except that the thickness of the cover glass was 0.5 mm, and the curvature radius R, the area $A_2$, and the peripheral length L were as shown in Table 10.

As shown in Table 10 and FIG. 39, Example 37, which is a Comparative Example, does not satisfy the formula (6) or the formula (7), and it is understood that the cover glass is peeled off from the frame. Example 38, which is an Inventive Example, satisfies the formula (6) or the formula (7), and it is understood that peeling of the cover glass from the frame can be suppressed.

As shown in Table 10 and FIG. 40, Example 39, which is a Comparative Example, does not satisfy the formula (6) or the formula (7), and it is understood that the cover glass is peeled off from the frame. Example 40, which is an Inventive Example, satisfies the formula (6) or the formula (7), and it is understood that peeling of the cover glass from the frame can be suppressed.

Although the embodiments of the present invention have been described above, the embodiments are not limited to the contents of these embodiments. In addition, the components described above should include those that can be easily conceived by a person skilled in the art, those that are substantially the same, and those within a so-called equivalent range. Further, the components described above can be appropriately combined. Further, various omissions, substitutions, or modifications of the components can be made without departing from the gist of the embodiments described above.

Although the present invention has been described in detail with reference to specific embodiments, it is obvious to those skilled in the art that various changes and modifications can be made without departing from the spirit and scope of the present invention.

REFERENCE SIGNS LIST

2: on-vehicle display device
10: glass article
12: cover glass
12A and 12B: main surface
14: frame
16: adhesive layer
20: curved portion
$A_1$ and $A_2$: area
F: length
R: curvature radius
R': corrected curvature radius
t: thickness

The invention claimed is:

1. A glass article comprising:

a cover glass including a first main surface and a second main surface; and a frame adhered to a second main surface side of the cover glass via an adhesive layer, wherein the cover glass is provided with a curved portion having a convex shape toward a direction of the second main surface, the adhesive layer includes at least one of a first adhesive layer having an elastic modulus of 5 MPa or more in an indentation elastic modulus test and a second adhesive layer having an elastic modulus of less than 5 MPa in the indentation elastic modulus test, and when R' is represented by the following formula (1) and $C_1$ is represented by the following formula (2), the curved portion satisfies the following formula (3) in a case of $C_1 > 0$ and satisfies the following formula (4) in a case of $C_1 \leq 0$:

[Math. 1]

$$R' = R + F(5t - 0.4) \tag{1}$$

[Math. 2]

$$C_1 = 1000/R' - 7.76t^2 + 19.5t - 12.7 + (1 - 0.90t^{0.5})(A_2/(A_1 + A_2)) \tag{2}$$

[Math. 3]

$$0.2 - \frac{(0.45Et^2 + 280E(t/R') - 45.36)^2}{\frac{245.6}{L}(2.44A_1 + A_2) + 9.41} \tag{3}$$

[Math. 4]

$$(A_1 + A_2)/L > 2.4 \tag{4}$$

here,

R indicates a curvature radius (mm) of the curved portion, F indicates a length of a flat region having a flat shape in a first direction orthogonal to a bending axis of the curved portion when the cover glass is provided with the flat region adjacent to the curved portion in the first direction, t indicates a thickness (mm) of the cover glass, $A_1$ indicates an area (mm²) of the first adhesive layer in the curved portion, $A_2$ indicates an area (mm²) of the second adhesive layer in the curved portion, E indicates a Young's modulus (GPa) of the cover glass, and L indicates a length (mm) of the curved portion in the first direction.

2. The glass article according to claim 1, wherein the curved portion having a convex shape toward the direction of the second main surface further satisfies the following formula (6) in the case of $C_1 > 0$.

[Math. 5]

$$0.2 - \frac{\left(0.659Et^2 + 705.5E(t/R') - \frac{0.3869}{L}(2.44A_1 + A_2) - 72.05\right)^2}{\frac{245.6}{L}(2.44A_1 + A_2) + 9.41} > 0. \tag{6}$$

3. The glass article according to claim 1, wherein the cover glass is also provided with a curved portion having a convex shape toward a direction of the first main surface, and when $C_2$ is represented by the following formula (5), the curved portion having a convex shape toward the direction of the first main surface satisfies the following formula (6) in a case of $C_2 > 0$, and satisfies the following formula (7) in a case of $C_2 \leq 0$,

[Math. 6]

$$C_2 = 1000/R' - 4.54t^2 + 11.37t - 7.58 + (0.586 - 0.44t^{0.5})(A_2/(A_1 + A_2)) \tag{5}$$

[Math. 7]

$$0.2 - \frac{\left(0.659Et^2 + 705.5E(t/R') - \frac{0.3869}{L}(2.44A_1 + A_2) - 72.05\right)^2}{\frac{245.6}{L}(2.44A_1 + A_2) + 9.41} > 0 \tag{6}$$

[Math. 8]

$$(A_1 + A_2)/L > 2.4. \tag{7}$$

4. A glass article comprising:

a cover glass including a first main surface and a second main surface; and a frame adhered to a second main surface side of the cover glass via an adhesive layer, wherein the cover glass is provided with a curved portion having a convex shape toward a direction of the first main surface, the adhesive layer includes at least one of a first adhesive layer having an elastic modulus of 5 MPa or more in an indentation elastic modulus test and a second adhesive layer having an elastic modulus of less than 5 MPa in the indentation elastic modulus test, and when R' is represented by the following formula (1) and $C_2$ is represented by the following formula (5), the curved portion satisfies the following formula (6) in a case of $C_2 > 0$ and satisfies the following formula (7) in a case of $C_2 \leq 0$:

[Math. 9]

$$R' = R + F(5t - 0.4) \tag{1}$$

[Math. 10]

$$C_2 = \tag{5}$$
$$1000 / R' - 4.54t^2 + 11.37t - 7.58 + \left(0.586 - 0.44t^{0.5}\right)\left(A_2 / (A_1 + A_2)\right)$$

[Math. 11]

$$0.2 - \frac{\left(0.659Et^2 + 705.5E(t/R') - \dfrac{0.3869}{L}(2.44A_1 + A_2) - 72.05\right)^2}{\dfrac{245.6}{L}(2.44A_1 + A_2) + 9.41} > 0 \tag{6}$$

[Math. 12]

$$(A_1 + A_2) / L > 2.4 \tag{7}$$

here,

R indicates a curvature radius (mm) of the curved portion,

F indicates a length of a flat region having a flat shape in a first direction orthogonal to a bending axis of the curved portion when the cover glass is provided with the flat region adjacent to the curved portion in the first direction, t indicates a thickness (mm) of the cover glass, $A_1$ indicates an area (mm²) of the first adhesive layer in the curved portion, $A_2$ indicates an area (mm²) of the second adhesive layer in the curved portion, E indicates a Young's modulus (GPa) of the cover glass, and L indicates a length (mm) of the curved portion in the first direction.

5. The glass article according to claim 1, wherein the flat region is provided on both sides of the curved portion in the first direction.

6. The glass article according to claim 1, wherein $(A_1 + A_2)/L$ is 80 mm or less.

7. The glass article according to claim 1, wherein the adhesive layer includes both the first adhesive layer and the second adhesive layer, and the first adhesive layer and the second adhesive layer are formed of different adhesive members.

8. The glass article according to claim 1, wherein the cover glass has a thickness t of 0.3 mm or more and 3.0 mm or less.

9. The glass article according to claim 1, wherein the curved portion has a curvature radius R of 50 mm or more and 10,000 mm or less.

10. The glass article according to claim 1, wherein the cover glass has a Young's modulus E of 60 GPa or more and 90 GPa or less.

11. An on-vehicle display device comprising:

a display; and the glass article according to claim 1 provided on a surface of the display.

12. The glass article according to claim 4, wherein the flat region is provided on both sides of the curved portion in the first direction.

13. The glass article according to claim 4, wherein $(A_1 + A_2)/L$ is 80 mm or less.

14. The glass article according to claim 4, wherein the adhesive layer includes both the first adhesive layer and the second adhesive layer, and the first adhesive layer and the second adhesive layer are formed of different adhesive members.

15. The glass article according to claim 4, wherein the cover glass has a thickness t of 0.3 mm or more and 3.0 mm or less.

16. The glass article according to claim 4, wherein the curved portion has a curvature radius R of 50 mm or more and 10,000 mm or less.

17. The glass article according to claim 4, wherein the cover glass has a Young's modulus E of 60 GPa or more and 90 GPa or less.

18. An on-vehicle display device comprising:

a display; and the glass article according to claim 4 provided on a surface of the display.

19. The glass article according to claim 1, wherein $(A_1 + A_2)/L$ is 60 mm or less.

20. The glass article according to claim 4, wherein $(A_1 + A_2)/L$ is 60 mm or less.

* * * * *